US010574692B2

(12) United States Patent
Drake

(10) Patent No.: US 10,574,692 B2
(45) Date of Patent: Feb. 25, 2020

(54) MUTUAL AUTHENTICATION SECURITY SYSTEM WITH DETECTION AND MITIGATION OF ACTIVE MAN-IN-THE-MIDDLE BROWSER ATTACKS, PHISHING, AND MALWARE AND OTHER SECURITY IMPROVEMENTS

(71) Applicant: Christopher Nathan Tyrwhitt Drake, Noosa (AU)

(72) Inventor: Christopher Nathan Tyrwhitt Drake, Noosa (AU)

( * ) Notice: Subject to any disclaimer, the term of this patent is extended or adjusted under 35 U.S.C. 154(b) by 176 days.

(21) Appl. No.: 15/168,150

(22) Filed: May 30, 2016

(65) Prior Publication Data
US 2017/0346851 A1    Nov. 30, 2017

(51) Int. Cl.
| | | |
|---|---|---|
| H04L 29/06 | (2006.01) |
| H04L 9/30 | (2006.01) |
| H04W 12/06 | (2009.01) |
| G06F 21/36 | (2013.01) |
| G06F 21/60 | (2013.01) |
| H04L 9/08 | (2006.01) |

(Continued)

(52) U.S. Cl.
CPC .......... *H04L 63/1466* (2013.01); *G06F 21/36* (2013.01); *G06F 21/606* (2013.01); *H04L 9/0838* (2013.01); *H04L 9/3226* (2013.01); *H04L 9/3273* (2013.01); *H04L 63/0428* (2013.01); *H04L 63/061* (2013.01); *H04L 63/0853* (2013.01); *H04W 12/02* (2013.01); *H04W 12/06* (2013.01); *H04L 63/18* (2013.01); *H04L 2209/80* (2013.01); *H04W 12/00522* (2019.01)

(58) Field of Classification Search
None
See application file for complete search history.

(56) References Cited

U.S. PATENT DOCUMENTS

| | | | | |
|---|---|---|---|---|
| 7,734,682 B2 * | 6/2010 | Aubry | ................... | G06F 21/604 |
| | | | | 709/203 |
| 8,881,251 B1 * | 11/2014 | Hilger | ................... | H04L 63/083 |
| | | | | 713/183 |

(Continued)

*Primary Examiner* — Kenny S Lin
(74) *Attorney, Agent, or Firm* — McDonnell Boehnen Hulbert & Berghoff LLP

(57) ABSTRACT

A strong, unified and comprehensive new computer security and authentication solution is disclosed. It is ideal for everyday users, and invents faster and easier enrollments, faster usage, easier usage, numerous aspects of stronger security including token based rapid mutual-authentication with protection against phishing, MitM, malware and user carelessness, secure resilience against token loss or theft, continuing protection in harsh situations, non-repudiation benefits, biometric encryption, code self-defenses, improved deployment, lower costs, new revenue opportunities, and more. One aspect's flow, visually-enforced mutual-authentication is: customer visits protected web site's login page, gets identified via Cookies, site displays one random photograph on said page, triggers customer's smartphone to automatically show a grid of random photos, one of which matches the login page photo, and customer taps it to login. Disclosed techniques teach how to block fraudulent sites and activity by preventing these producing any matching photo the customer can tap.

16 Claims, 12 Drawing Sheets

(51) Int. Cl.
  *H04W 12/02* (2009.01)
  *H04L 9/32* (2006.01)
  *H04W 12/00* (2009.01)

(56) References Cited

U.S. PATENT DOCUMENTS

| | | | | |
|---|---|---|---|---|
| 9,037,851 | B2* | 5/2015 | Choi | G06F 21/32 |
| | | | | 713/159 |
| 9,537,847 | B2* | 1/2017 | Aissi | H04L 63/08 |
| 2005/0055557 | A1* | 3/2005 | Yamada | G06F 21/32 |
| | | | | 713/186 |
| 2007/0165911 | A1* | 7/2007 | Baentsch | G06F 21/32 |
| | | | | 382/115 |
| 2008/0148059 | A1* | 6/2008 | Shapiro | G06F 21/32 |
| | | | | 713/186 |
| 2008/0163361 | A1* | 7/2008 | Davis | G06F 21/31 |
| | | | | 726/19 |
| 2008/0201578 | A1* | 8/2008 | Drake | G06F 21/34 |
| | | | | 713/172 |
| 2009/0183008 | A1* | 7/2009 | Jobmann | H04L 9/0866 |
| | | | | 713/186 |
| 2010/0138667 | A1* | 6/2010 | Adams | G06F 21/32 |
| | | | | 713/186 |
| 2010/0228988 | A1* | 9/2010 | Walker | G06Q 20/3415 |
| | | | | 713/184 |
| 2011/0049862 | A1* | 3/2011 | Hill | G07D 7/0047 |
| | | | | 283/70 |
| 2012/0167186 | A1* | 6/2012 | Dietrich | G06F 21/34 |
| | | | | 726/6 |
| 2013/0138968 | A1* | 5/2013 | Yudkin | G06F 21/602 |
| | | | | 713/183 |
| 2014/0359734 | A1* | 12/2014 | Natividad | H04L 63/083 |
| | | | | 726/6 |

* cited by examiner

MUTUAL AUTHENTICATION SECURITY SYSTEM WITH DETECTION AND MITIGATION OF ACTIVE MAN-IN-THE-MIDDLE BROWSER ATTACKS, PHISHING, AND MALWARE AND OTHER SECURITY IMPROVEMENTS

CROSS-REFERENCES TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

BACKGROUND OF THE INVENTION

FIELD OF THE INVENTION

The present invention pertains to the field of computer security and authentication, with parts additionally useful in other fields. It provides strong protection against phishing, malware, active man-in-the-middle attacks, and many other threats, yet is designed to keep ordinary people safe, even if they are unsophisticated or unmotivated. It is well suited to replace legacy two-factor-authentication (2FA) and/or multifactor authentication (MFA).

Existing security and authentication techniques are riddled with oversights and compromises, for example, they suffer tradeoffs for usability (at the expense of security) or tradeoffs for security (at the expense of usability). By accommodating a vast range of technical security improvements to block THREATS, including additional improvements catering to IMPLEMENTATION OBJECTIVES desirable in an ideal security system, and adding new FEATURES to enable additional benefits, the present invention is suitable for protecting users with few or no compromises at all.

Good security is difficult, because the variety of threats and attack vectors is so vast. One reason for the current dismal state in the field of computer and internet security (e.g., a Duke University survey found hackers breached 80% of US Companies in 2015) is its failure to address a sufficient breadth of threats. Everything missed or left out risks being exploited. The present invention solves a very large number of parts of a large and difficult problem, and is thus correspondingly lengthy.

BACKGROUND ART

Computer authentication has traditionally been based on passwords. The proliferation of the internet has brought numerous new services to consumers, the outcome of which is that today, on average, each internet user has 70 different online accounts (e.g. email, social, work, banking, interests, forums, clubs, shopping, selling, auctions, payments, transport, entertainment, games, and so on). Best practice for passwords dictate that they never be used on more than one site, that they be long and unguessable, that they contain combinations of big and little letters, numbers and other symbols, and that they be changed on a regular basis, and not written down anywhere, and only used on secure sites after verifying site security certificate credentials. This is clearly ridiculous, and all that effort is ineffective anyway, with the advent of modern attack methods like phishing, malware, active MitM, and more, which happily steal or bypass whatever passwords are used. Most users defy best practice, using short or easy passwords, re-using them, recording or writing them down, and rarely, if ever, checking site security certificate credentials first.

Many years before the World Wide Web was even invented, the theft of passwords was still a concern, and the idea of time-based one-time passwords (TOTP or just OTP) was introduced. These are pseudo-random codes that change every minute or so, and are typically valid only for a few minutes maximum (usually far longer than the amount of time they show for, to mitigate clock skew and user typing speed issues), which before the days of the web was a useful way to mitigate the problems of compromised passwords, mostly because back then, it was infeasible to use stolen credentials in real-time.

One-time passwords (OTP) typically require a user to be in possession of something physical which holds, generates, or receives the OTP, which has been given the term "factor", and owing to the user's password being also a factor required to authenticate, the term "Two Factor Authentication" (2FA) now most commonly describes the mechanism of using a password factor and a second OTP factor to authenticate. Some folk use the term "Multi Factor Authentication" (MFA) and still others use "Two-Step", but all in general refer to the same concept; something the user knows (their password) and something they have (the factor supplying the OTP code) are both required to authenticate. In today's real-time connected world, the legacy techniques of 2FA provide little security benefit owing to their numerous different flaws, some example flaws include: their codes are easily stolen and used while still valid; users can be manipulated (e.g. via phishing, spoof sites, etc.) into authenticating a malicious machine, rather than their own intended one; OTP codes can be reproduced after stealing the keys that make them; and OTP codes sent via SMS Text message over phone networks are easy to intercept and eavesdrop. Other major drawbacks with 2FA are that these techniques are usually slow and cumbersome, often do not scale, are complicated to understand, usually difficult and time-consuming to set up, are susceptible to social-engineering attacks against both the user or the provider support staff, are expensive to deploy and use, and have no secure resistance to loss or theft.

Biometrics is sometimes also called a "factor" in authentication, but has numerous drawbacks, including the obvious fact that this information cannot be changed if stolen, and many third parties have access to it, such as authorities like government, immigration, law, education, and so on, who enforce biometrics collection on all or some users. Biometrics are usually extremely easy to steal or emulate, they are unreliable and approximate, may encourage perceived or real kidnapping and physical coercion dangers that place users in heightened stress or danger, have severe privacy-reducing drawbacks, and many states and countries restrict or ban the use or collection or exchange of biometrics from all or part of their populations and in some or all situations. Numerous catastrophic government breaches in recent years have resulted in many millions of people's biometrics being stolen. The most expensive hacker attack in history caused one trillion dollars damage after hackers stole fingerprints and other data of all US government employees. As a result, people fiercely oppose their use.

Biometric techniques usually make use of "feature sets" which, if stolen, can be used to emulate a real user's biometrics. Sometimes this sensitive feature-set information is stored within devices that support biometric operations, and for some implementations that elect to be responsible (many do not), this necessitates expensive protected storage and physical anti-extraction defenses, most of which are regularly compromised anyhow. It would be an advantage to find a way to use biometrics, which is impervious to feature extraction. Most vendors of biometrics technologies do not paint an honest picture of their tech, the most infamous example being Apple's TouchID, which was hacked within 24 hours of release, despite their sub-dermal super-resolution and other misleading claims; almost all other biometrics are also trivially hacked, with face-rendering and videos defeating face-recognition, voice-morphing software defeating voice biometrics, and so on. For every vendor who claims "secure!" there's usually a dozen or more hackers poking fun at them with examples demonstrating the opposite.

Because almost all existing supposed security-enhancing techniques and implementations are failing so spectacularly to effectively prevent modern break-ins, and in particular on account of the vast majority of them recycling OTP-based ideas from the 1980's, I refer to this existing technology as "legacy", whether or not it's literally old or new.

Despite the ineffectiveness of OTP or the danger of Biometrics, many providers nevertheless have started using this technology in efforts to protect their resources; they have little choice: they get broken into, there's public outcry that they "do something", and there's little else currently available that they can do, besides importing 1980's tech!

Adding OTP typically involves a difficult and time-consuming integration process with adjustments, sometimes major ones, to the flow and logic of their systems. It would be an advantage if adding new security to an existing system were easier.

One major casualty of providers' ineffectual efforts to improve security, has been user privacy. Most OTP solutions make use of indelible device identifiers or other trackable techniques, and of course, biometrics don't change. It would be advantageous if security systems could protect users while still allowing them to effectively separate personas they may wish to maintain, such as a separation between worklife and homelife for example.

Major server break-ins are a frequent occurrence nowadays, with hackers stealing entire databases of user information, including passwords, or hashes that are dictionary-attacked to recover passwords, personal and other details, biometrics, OTP keys, and more. Reputable security analysts estimate that 60%-80% of businesses with online presence are hacked into annually, some famous recent ones including British Airways, US Office of Personnel Management (OPM), Anthem, Sony Pictures, JP Morgan Chase, Gmail, Home Depot, Dominios Pizzas (France), MacRumours, AshelyMadison, LexisNexis, AOL, Target, Ebay, Adobe, European Central Bank, UPS, NASDAQ, SnapChat, South Africa police, Washington State court system, Nintendo, Twitter, Apple, Scribd, Drupal, Dun & Bradstreet, Ubuntu, Evernote, Living Social, UbiSoft, OVH, Medicaid, Dropbox, Blizzard, Citigroup, Washington Post, Sega, Steam, Sony PSN, AT&T, Ohio State University, Network Solutions, RBS Worldpay, TK/TJ Maxx, and many more, every one of these listed here was a hack that began with a phishing attack, and the use of legacy 2FA/OTP (obviously) did not prevent the data thefts. Mitigating dataloss and preventing break-ins would be advantageous to say the least.

There are many different ways to breach computer security. Computer-related crime causes enormous damage to victims, steals vast sums of money and valuable data, and the perpetrators' risk of capture is relatively low. Individuals, organized groups, governments, armies, nation states, hackers, and others, often participate in violating user security (hereafter "Criminals" or "malicious" intruders or "attacker", whether or not the perpetrator or violation is literally criminal or malicious or attacking). Millions of people earn their living from committing or defending against this crime. Criminals adapt; if one hole or exploit gets closed, they will move to another one; if one victim becomes protected, they will again move to another one. Computer crime today is rarely being prevented; it's merely being shifted to different victims. Attacks against the United States (US) Information and communications technology (ICT) industry cause hundreds of billions of dollars in loss and damage annually, as of 2015. This same industry accounts for 33% of GDP, and provides 28% of all US Jobs. To help safeguard all that, modern security therefore needs to be comprehensive, and ubiquitous. Contemporary security is failing to work against today's enormous variety of threats; it's failing to work everywhere, and/or for everyone, and/or at all times.

Improvements to technical security are useless if they are not used, so arguably even more important than the security itself, is the implementation of it. If any situation exists where any user, or group of users, who must access a resource are unable to do so using the improved security solution, then a compromise will need to be made to facilitate their access to the resource, thus the compromise bypasses the improved security, and becomes another attack vector for Criminals. Almost all existing security includes such compromises, like, for example, the ability to log in without knowing your password, by simply requesting a new password, or the ability to log in without using a biometric fingerprint, by instead using a PIN number or passcode. Such compromises, even when only a fraction of users may ever need them, are typically implemented for all users, weakening the entire authentication system for everyone, merely to allow access to a minority of otherwise disenfranchised individuals.

Many difficulties exist that prevent the easy removal of such compromises: If the improved security does not continue to function securely in the event of loss, theft, or user forgetfulness, compromises will be needed still. If it is too hard to understand, many users will be unable to use it. If it is too slow to use, many users will not want to use it. If it depends on expensive components, many users will be unable to afford to use it. If it does not scale (e.g. can be used in hundreds of different places, like web sites, or by large numbers of different users), it will be impractical for users to use or providers to offer. If it is inconvenient (e.g. requires the carriage of bulky physical devices), users will resist it. If it is banned (e.g. requires physical connection to a work computer, in violation of a work policy not to attach devices to workstations, or uses biometrics on children or even adults in certain states or countries), it will be impossible or illegal to use. If it requires physical connection but doesn't accommodate every different kind of connector or is needed on machines without connectors, it will be unusable in numerous circumstances. If it cannot work without an internet connection (e.g. requires a mobile device data connection, but device owner has no internet credit remaining), it will not work frequently enough to be reliable. Similarly, if it cannot work internationally, relies on batteries, or expires after some interval, those will all disenfranchise users. If it "gets it wrong" sometimes (e.g. biometrics, especially fingerprints after swimming, faces in the dark, and voices when ill), a potentially security-weakening alternative will be needed. If users are scared of it, or it "creeps users out", or users philosophically oppose it, they will refuse to use it (e.g. biometrics). If it can be lost, forgotten, or changes, and no secure mitigation for this exists, it will need a bypass. If the implementation (without a compromise) necessitates additional support costs, it may be impossible on uneconomic to deploy. If it's too hard for a user to set up, or too hard for a provider to deploy, or requires physical delivery, or could be subject to unreliable delivery, or is of a prohibitive cost to be economically sensible to deploy, or deployment relies on information which users are unwilling to disclose (e.g. addresses, phone numbers, birthdays, personal information, biometrics, etc.), or any other reason exists that prevents it achieving full user coverage, then it will be impossible to avoid compromising the technology.

It is therefore advantageous to solve and/or mitigate as many of these problems as possible, which is one object of this present invention.

That's a lot of problems, which is why this patent is lengthy.

BRIEF SUMMARY OF THE INVENTION

The present invention delivers improvements to authentication, techniques to resist phishing attacks, techniques to neutralize the effects of malware, and numerous related computer security improvements, as well as providing user-experience improvements including increased speed of authentication, enrolment, integration, and other operational aspects, and greater ease of use, convenience, ability to scale and other improvements. In general, the present invention makes the use of computing equipment significantly safer and more secure, as well as faster and easier for users, particularly improving most aspects of initial authentication procedures.

An improved security system needs to work against an enormous variety of threats, and it needs to be able to work everywhere, for everyone, at all times. It is important that an improved security solution be fast, easy to use, easy to set up, easy to install, non-controversial, and convenient. Additional benefits, such as making authentication fun, using psychological techniques to improve user happiness or mental wellbeing, or improving other aspects of a user's life, may also benefit security, especially in commercial situations where the decision to activate the improved security is left for the user to make.

The present invention teaches a unified and comprehensive security system, a part of one mode including the establishment of a secure end-to-end connection between a user and a server without allowing any unwanted in-the-middle attackers to insert themselves while still supporting wanted intermediaries such as deep packet inspection firewalls; it teaches fast and convenient real-time mutual authenticating using as little as one single user tap action; and secure verification of out-of-band action requests with non-repudiation; and provision of security tokens consisting of amalgamated visual and cryptographic and other elements in physical or virtual form; and simplified and fast enrolment and user pairing for security or other purposes; and a password management system to help users manage login personas; and secure user logins that are both fast as well as easy; and biometric key generation for protection of user login details or other uses; and inter-software communication methods to ease and accelerate user logins or other purposes; and enhanced-security server provision and deployment and operation; and numerous supporting improvements for at least the security, speed, and usability of applications wishing to take advantage of these and other features.

An aspect of one protective technology disclosed herein is summarized as follows; to establish a secure channel between a user and a Server (operated by a Provider) that is resistant to in-the-middle attack, the Server machine uses secrets known only to itself and the User or their device, and the User uses secrets known only to themselves or their device and the Server, and those secrets are employed via communication over a possibly insecure channel as part of a visual mutual-authentication process in such a way that unwanted interference with the communication will break the mutual authentication.

In other words, the Server causes a random photo to be shown to the User which is visually identical to one that exists on a security token that the User already has, and the User is required to match this pair of same photos to login, however, interference by man-in-the-middle attack will cause a wrong photo to be shown—one which does not exist on this User's pre-enrolled token, thus preventing the attack on account of the User being unable to find a working match to authenticate.

Cryptography is used to prevent the in-the-middle attacker from discerning the correct photo. Users are not required to learn or remember these photos. It will be appreciated by one skilled in the art that asymmetric cryptography may be used in place of secrets to accomplish equivalent ends.

Most of the security is automatic and invisible, but the User themselves plays a role in the establishment of the security. From the point of view of a User of this security, their experience is as follows:

During a login, they will see one first random photo appear (for example, on their PC, or on the top half of their mobile phone screen), and at the same time, a small selection of assorted random photos will also appear (for example, on their phone's screen, refer FIG. 5, or just part of it, e.g. the bottom half, refer FIG. 1), and the user completes their login by finding the single photo in the assortment that matches the first one that appeared, and taping on it, this entire process taking usually mere seconds to complete. The step getting the user to match photos is mutual-authentication, and the tap is the multifactor code provision trigger, and forcing the user to do this extends the security out of the hardware itself, and into the brain of the human. The assorted photos can be protected by encrypting them, such as with passwords or biometrically-derived or secured keys which reduces risk of unauthorized usage.

A more detailed summary of this aspect is as follows:

The user has an access device, such as a PC, laptop, tablet, smartphone or similar capable of connecting to a Server. This device contains a custom security agent. The user additionally has a token, such as a printed grid of random photos each with an associated random code (e.g. refer FIG. 4), or an app in a computing device (not necessarily the same as their access device) itself containing one or more random photos (e.g. refer FIG. 5) each with an associated random code (e.g. refer FIG. 2 item 213 or FIG. 4 item 428), and possibly means to encrypt same with passwords or with keys derived from or protected by biometrics (tokens, their provision, and maintenance is disclosed later in this specification). The user makes a connection to the server using their access device, and identifies themselves (such as by entering a username) or is automatically identified (such as by device Cookie). The connection uses a public key cryptosystem (PKI) or similar, over a secure protocol like SSL or TLS or similar. At the protocol level (of SSL/TLS/etc.), the users' access device attempts to identify and verify the server using certificates for the server along with stored certificate-authority ("CA") certificates using asymmetric cryptography, and negotiates with the server to establish a symmetric "session" key to be used for subsequent traffic encryption (for example, the "master-secret" per RFC 5246). When the server obtains the identity of the user, it (or usually a security appliance it communicates with) selects one of the random photos that it (or the appliance) knows is present on the user's token, takes the file name of the photo, and generates a photo-identifier based on the file name (or other identifying characteristic) and the session symmetric key, and communicates this photo-identifier to the user's access device.

The custom security agent in the user's access device accepts the incoming photo-identifier, and uses its local symmetric session key (usually the one from a web browser in the device) along with the supplied photo-identifier to locate (locally or by safe remote means such as MitM-resistant cryptography) the selected random photo for display to the user. The user matches the displayed photo with the same one on their token to find the associated random code, and supplies this to establish their login (or in the case of an app, matches the photo with a tap, the tap triggering the app to automatically supply the code).

It can be seen that in the event of an unwanted imposter attempting to be in-the-middle of this exchange, that no correct photo will be displayed (because the session key mismatch causes the agent to show a wrong or missing photo) and thus the user will be blocked from authenticating over the compromised channel (because owing to the wrong or missing photo there will be no associated random code they can find to establish a login). This works because both the client and the server participate in the construction of the symmetric session key (through, for example, the shared random values and pre-master-secret techniques as per RFC5246 or other encrypted session establishment protocols like SSL or TLS etc., or in general, any means by which a communication channel cipher key can be negotiated between two endpoints that deprives an intermediary point of eavesdropping access), but neither has the opportunity to dictate the entirety of this key and the protocol (SSL/TLS or similar) itself already protects this key from disclosure to eavesdroppers, and it is these properties that prevent the in-the-middle attack (MitM) from tricking the user's device into using the same symmetric key as the server or stealing this key, and it is this difference in secret keys at the real server and real user's device that prevents the display of the correct photo. Note that the custom security agent on the user's PC participates in the photo display using cryptography; thus, the correct photo itself is not available for theft by the in-the-middle attacker. Note also that the supply of the associated random code is protected from disclosure to the in-the-middle-attacker by either said code being itself protected by the agent's encryption before transmission, or by the software which manages tokens having been programmed to encrypt them and/or supply them only to legitimate endpoints and preferably using a different communications channel to the original request (for example, from smartphone to security Appliance over cellular data, when original request was from PC to Provider over DSL).

In the event that a wanted in-the-middle device needs to be allowed, for example a deep-packet-inspection firewall or corporate content scanner, the user is prompted to permit this, or the agent programmed to accept this device's keys, and the server and agent adjust to use both their own symmetric key as well as their peer's symmetric key which is in use on the opposite side of the connection. In one preferred implementation of present invention, new keys are securely generated based on the session key(s) and used in place of them for MitM attack prevention, rather than using the actual symmetric key(s), in order to reduce possible vulnerabilities that might lead to unintended revelation of the session key.

To prevent screen-scraping style imposters, the agent is programmed to establish its own key with its peer on the server using the user's identifier, and this key additionally used on the photo-identifier. In the preferred method, this key is long-lived, and upon initial establishment, the user is prompted to approve the new agent using techniques that are dependent on local-machine-access (impervious to a remote screen-scrape attack), like for example proving access to a local machine username and display card/adapter. An imposter attempting to present its own agent as that of the user will be prevented on account of the agent key mismatch, and an imposter attempting to initialize a new agent on behalf of the user will be prevented on account of said imposter agent not having access to user's real local machine (for example accessing normally forbidden information like the real user's logged in PC username, and performing normally forbidden operations like establishing elevated privileges and/or drawing user-interface components on the screen and outside the context of the user's web browser). This invention introduces additional privacy preservation when required, by deriving these keys in a non-repeating manner, so as not to leak user-identification opportunities to servers, and new unique keys are preferably used for each new server and/or user combination.

When technical or user limitations exist and mitigation against some styles of attack are chosen to be omitted, it is possible to use some, but not all, of these aspects to nevertheless produce a vastly improved (over existing techniques) authentication solution. For example, a simplified operation that does not provide active MitM prevention, but still blocks phishing or spoofing, is still possible with a similar user experience as follows; when the user commences login to a server, it shows them a random photo, and when the user enters the codes corresponding to the matching photo on their token (e.g. by tapping it on their phone, which auto-provides them, and preferably to a predefined endpoint out of reach of any in-the-middle attack), the server then grants access. Also disclosed later herein are alternative mitigation techniques that nevertheless still thwart an active MitM attack in the event some protections are omitted.

Many other aspects of this invention are useful in many other fields as well, not just for authentication or security. For example, when mobile device software needs to automatically recognize users to automate device pairing, or needs to share screen resources with other software on the same device, or needs to generate encryption keys from biometrics or other sensor data, or needs to auto-provision servers, these aspects are valuable alone and in their own right.

Technical Problem

Threats

Selected threats addressed by the present invention include:

1. Man in the Middle (MitM)

There are now (Q2, 2015) approximately 50 million public Wifi hotspots worldwide. It is easy for a malicious third party to operate a public Wifi, and thus record and/or modify all traffic through it. Other opportunities also exist for malicious intruders to get "in the middle" of a legitimate user and the resource they wish to use, such as phishing tricks, social engineering deceptions, server hacking, IMSI-catchers, cellular SS7 re-routing, typo-squatting, and the like. Malicious individuals who operate their own cellular data towers and micro cell networks (thus access end user mobile-phone data in real time) are relatively common, and rouge employees in existing internet providers have been discovered interfering with traffic as well, as do most spy agencies.

Phone company employees and scamming social engineers both commonly clone or redirect victim cellular traffic, while many subscribers and especially international travelers regularly swap their own phone SIM cards too, an act that plays havoc with some security systems.

Free software-defined-radio (SDR) open-source exists capable of re-purposing common $10 PC TV tuner adapters as micro-cell phone networks and data-stealing scanners.

Technical tricks like DNS attacks also exist, as do zero-day exploits, malware, and taking advantage of end-user configuration problems like poor DNS server selection, inappropriate VPN fallback settings, and so on.

Security researchers regularly publish proof-of-concept attacks in efforts to encourage the industry to fix them, and these regularly get cloned by Criminals and put to work against victims before fixes (if any) are made.

Some technical protections against a small subset of these MitM-style attacks has existed for about 5 years now, like HTTP Strict Transport Security (HSTS), or Public Key Pinning (e.g. HPKP), however as of writing, only 1% of the top 10,000 worldwide banks online (arguably the most important sites needing protection) have chosen to deploy any working HSTS solution, and only 3 of them use pinning, and HSTS itself in the form of supercookies has been exploited to invade user privacy recently, putting the future and efficacy of HSTS at risk.

Neither HSTS or HPKP caters for content inspection devices and the pinning standard itself recommends situations where it be disabled, which attackers can invoke.

In general, certificate protection mechanisms such as the foregoing rely heavily on trusted Certificate Authority (CA) infrastructure, however, break-ins to CA's are so common that every few months on average, another trusted CA root certificate is found to have been compromised and undergoes revocation. More than a third of the trusted certificates in your web browser are revoked ones (e.g. because they got hacked/stolen), yet Certificate Authorities are supposedly the most heavily protected and secure parts of today's internet infrastructure, as well as the most critical.

In short—the array of attacks that can be mounted that give a malicious in-the-middle operator the ability to dupe an end user is vast, staggering, possible almost everywhere today, and in many cases, trivially easy.

Unfortunately, a technology broadly named "two factor authentication" (2FA) or sometimes "two-step" or "one-time password"/OTP/TOTP or MFA or "multi factor authentication" (collectively hereafter 2FA) is today's most common "extra layer" of security ("extra layer" is a misnomer; it's called this by vendors and industry, but is in reality no such thing). This is 30-year-old technology based on a 6 or 8 digit code number that changes every minute or so, and was designed to prevent key loggers back in the days when password theft/guessing was the main concern. Stolen 2FA codes were useless to attackers back then, because the codes have only a short life span (minutes), and were typically no longer useful when the stolen codes were later retrieved from the victim (the modern internet did not exist back then, so real-time code theft/interception was not a threat). 2FA is useless against active man-in-the-middle attacks, since the 2FA code can be stolen and used immediately nowadays by the man in the middle, or the victim can be tricked into using their code to surreptitiously authenticate the man-in-the-middle attacker's machine rather than their own. 2FA is also powerless to block active man-in-the-middle attacks.

Malware is computer code that is used to assist Criminals. It is often installed via phishing emails or drive-by web attacks or infected downloads, and often takes advantage of "zero day exploits" which are unfixed mistakes that are present in existing software used by victims, which can be exploited to facilitate installation. About 225,000 new malware strains are detected every day, as at Q1 2015. The front-line defense against malware is our computer anti-virus industry, and their principal technique for preventing malware is scanning to detect it. SSL and/or TLS (sometimes called HTTPS) is a security protocol for privacy (and other purposes) that prevents anything scanning what you do over your web connection, so most businesses nowadays deploy what is called a "deep inspection firewall" or "corporate content scanner". This is equipment that manipulates SSL certificates and connections in order to facilitate scanning SSL traffic to (among other things) protect employees against malware coming in through it, or prevent confidential information leaking out, by deliberately operating as a (good) man-in-the-middle (MitM) intercept. Or to put it another way, sometimes you want a MitM intermediary to keep you safe, and other-times you need to avoid malicious MitM attacks.

It is therefore desirable that a solution be found that can protect an end user when unwanted interception is taking place, but still operate and protect them when deliberate or desirable interceptions are wanted too. Different kinds of protection are possible using present invention, such as preventing the user from accessing a protected resource over a compromised connection, or permitting a "decoy" access when interception is detected (e.g. to facilitate tracking attackers), or allowing limited access that denies dangerous actions over the compromised connection, and in any of these cases, facilitating real-time attempts to locate and capture the attacker or remove the detected attacking infrastructure.

The present invention discloses multiple different techniques to defeat MitM attacks, including at least secure and genuine mutual authentication using images, agents on servers and workstations, out of band (OOB) actioning, and others.

2. Malware

Malware is code that runs on a victim's computer, and usually has total control over it. It can steal and change anything they see, and steal and change anything they enter. The Criminals known as "Boleto Bandits" use their malware to change recipients on victim money orders in Brazil (the malware hides from the sender the fact that it has secretly changed an intended recipient of funds, to a bank account owned by the malware gang at one of their 30 participating banks). At last count (Mid 2014) they had stolen $3.75 billion USD this way. They are uncaptured, and all still operating. Other malware criminals have also stolen more than $1bn USD as well, and financial crime malware is common.

Out of all popular anti-virus scanners in use, about half of all new malware is not detected on its first day of release. After two weeks, still 40% remains undetected, and 10% still is never found after one year. Nobody knows, of course, how much malware exists that is never detected at all, but the quantity is sufficiently vast that the term "Advanced Persistent Threat" (APT) was originally coined to name it. It is therefore desirable that a solution be found that can enable potential victims of malware to block malicious transactions, alterations or actions made by it. This present invention teaches secure out-of-band actioning (OOBA) to neutralize the effects of malware, for example, by requesting transactions etc. originating from one endpoint to be verified and signed approval for them generated on a different endpoint by one or more responsible users.

3. Phishing.

Phishing is the number one successful attack vector that exists today. Reputable surveys exist showing that just over 90% of all break-ins that succeed, were facilitated by phishing.

There are all kinds of different attacks that take place that get labelled "phishing". The most basic is when an email is sent to a potential victim encouraging them to visit a look-alike web site which is designed to steal their login information. Variant web sites exist which use architecture similar to MitM attacks in order to function properly in the presence of 2FA. Other phishing emails deliver a malware payload directly to the potential victim, often encouraging them to install software or open malicious attachments. Still other phishing emails entice potential victims to visit a web site, where the web site is actually a delivery mechanism for malware, using zero-day-exploit techniques to automatically install the malware, or deception/social-engineering to entice the user to install the malware. In short, anytime a Criminal can gain from communicating first with their victim, these attacks are labelled Phishing.

About 150,000 new phishing/malware sites are discovered every month. Since so many successful attacks have already taken place, the stolen email addresses of victims and information about them exist in the archives of many different Criminals. The use of social networking and business contact services make research against potential victims very easy to do. When Criminals combine knowledge of the intended victim in order to disguise their attack, these attacks succeed significantly more often, and have their own name: "Spear Phishing". Half of everyone online gets a phishing email every day.

It is therefore desirable that a solution be found that protects users against phishing and/or its effects. This present invention teaches the use of genuine mutual authentication using images (aka photos) that greatly reduces the opportunity for phishing to succeed against victims.

4. Vishing and Smishing

When potential victims are lured by phone calls (Voice) instead of emails, this is called Vishing, instead of Phishing. Similarly, phishing via SMS text messaging is sometimes called Smishing. Roughly the same goals apply, with the added security difficulty of the attacker being in real-time contact with the potential victim to help socially engineer the malicious outcome that is planned. It is desirable to find a solution to protect these potential victims. This present invention uses images and out-of-band actioning and mutual authentication, making Vishing or Smishing attacks extremely difficult against victims.

5. Keyloggers

Malware designed to exfiltrate credentials as they get typed in is called a "keylogger". This is the traditional threat that 2FA addresses with its one-time idea, by enabling security based on one time or short-lived authentication codes, usually delivered or generated out-of-band, such as with a hardware number generator, network SMS message, paper list, or the like. These access codes are normally called "Time-based One Time Passwords" (TOTP) or "Event-based One Time Passwords" (EOTP), or just OTP, and are usually easily stolen by phishing.

It is perhaps ironic that when 2FA was invented 30 years ago, keyloggers were the top threat it fought, but since the advent of the internet, modern keyloggers, and in particular almost all online banking targeted ones, are now specifically programmed to steal and use, or bypass, or defeat 2FA entirely. In almost all modern situations, 2FA is now useless against the principal threat it was designed to defeat.

It is therefore desirable to find a solution to prevent access codes being stolen or other ways to prevent keyloggers. The present invention teaches communication of one time codes using networking mechanisms outside the reach of keyloggers, along with other techniques useful to mitigate this risk.

6. Spoof Sites

One common attack technique is web sites which mimic others in order to steal credentials (i.e. usernames, passwords, certificates, Cookies, addresses, authentication codes, 2FA, OTP, SMS, emails, phone numbers, or other identity and/or authentication information). 10,000 new malicious (phishing, spoof, imposter, and/or malware) web sites were discovered on average every day in 2013. Numerous different kinds exist, including plain look-alike sites that store stolen details, look-alikes that "proxy" a live site to both steal credentials and use them in real time, and semi-low-tech (hybrid) sites which steal data that is used in near-real-time by a human Criminal operator. Preventing these is therefore desirable. This present invention teaches how to perform fool-proof mutual authentication using images, where it is impossible for a User to accidentally or otherwise provide a spoof site with a useable set of credentials, along with other techniques additionally effective at minimizing this risk.

7. Social Engineering

It is often easier to steal someone's credentials, or bypass the need for them, by trickery in a different context. Many humans are naturally trusting people, and fall prey to scams which take advantage of their trust. Criminals learn and adapt, using stolen or researched personal information, psychological coercion techniques, and lateral thinking to attack unsuspecting victims. Finding new ways to stop social engineering succeeding is desirable. The present invention includes many provisions to thwart social engineering, including the use of images during authentication making it difficult for social engineers to ask for credentials, the use of mutual authentication preventing social engineers from knowing how to ask for credentials, the use of out-of-band actioning to prevent social engineers from secretly performing unwanted actions on behalf of the user and/or to warn users of known or detected scams in real time, a secure-channel contact system to put users and provider staff safely in touch, and others.

8. Man in the Browser (MitB)

One specific form of malware has its own name owing to the uniquely challenging problem it presents to authentication: MitB. Since most authentications take place inside a web browser, any malware that is itself present in the web browser software has easy access to the content the victim views, and the information the browser sends out. Most internet banks that have suffered large online losses have done so at the hands of MitB. Examples of this malware transfer victim money out of their account by piggybacking onto the victim's normal internet banking activity. Some MitB is even clever enough to hide the evidence of its attack from the victim, for example, by suppressing the outgoing transfer(s) it makes from being displayed in transaction lists and statements, and faking the display of the victim's account balance to show the original, before-theft, amount. Preventing hidden transactions from taking place in such a situation is desirable. The present invention teaches secure out-of-band actioning with non-repudiation to combat, among other things, MitB attacks.

9. Password Guessing

Computers can guess passwords very fast, and dictionaries of common passwords (and past stolen ones) help make this even faster. Many existing solutions detect these automated attacks and take some form of action, such as by blocking or limiting the account of the victim, effectively denying service to them when they next try to log in, but even so, many modern attacks are still not prevented this way, owing to the scale of the internet being so vast: no longer does a Criminal need to guess thousands of passwords to break into one account, they can instead guess one password for thousands of accounts, and break in that way. 62% of all passwords are now found in modern cracking dictionaries, making these attacks very efficient.

It is desirable to find a way to prevent correctly-guessed passwords from allowing intruder access to accounts, and to prevent the necessity to lock legitimate users out of an account if attackers try guessing their password. This present invention teaches fast and easy mutual multifactor authentication which prevents Criminals who have guessed passwords from successfully logging in with them, helps alert potential victim users that their account is under attack, and mitigates the need for lockouts.

10. Denial of Service (DoS)

One easy way to defeat security is to block it from working. Famously useful in historical wartime, this often works in modern peacetime too: security that is seen to be non-functional is usually just turned off. Imagine, for example, if Google or Gmail locked user accounts if they got their password wrong 3 times in a row. A single automated attack could succeed in quickly locking millions or more accounts (Gmail has 900 million users). Imagine the cost to support of even just one million angry people calling their help desk to get back in? How will they spot the hackers trying to social-engineer help desk staff to get into someone else's account? What if it's higher—like a quarter of a billion angry users?

In short—it is not suitable or effective to block users when they get their password wrong a few times, but failing to do this poses an enormously high risk, because passwords are so easily guessable. It is therefore desirable to find a way to protect users against password guessing attempts, without limiting their access should they be a victim of such an attempt. The present invention teaches visual mutual authentication which hampers automated password guessing, failed login secondary mutual authentication to avoid account lockouts while still maintaining high security, real time actionable password attack alerting, and other techniques to solve DoS problems. (note that DoS and DDoS are different things).

11. Serverside Break-In

Ask any vendor of security equipment about the current state of their craft, and they will agree that suffering a break-in is not a matter of "if", but "when". More than half of all businesses believe they will get hacked into each year, which is optimistic, because 61% of them admitted they had already been penetrated by attackers last year in a recent survey.

Many break-ins subsequently succeed in stealing user authentication data en masse, like entire databases of usernames, passwords or password hashes, multifactor keys, email addresses and personal information, sometimes also including biometrics and other critically sensitive data. A thriving underground trade exists to share this illegally collected data, and for the last 2 year running, it has been the topmost valuable asset sought and taken by hackers, beating even cash thefts from banks, to rank as the number-1 attacked resource worldwide.

Offline cracking and dictionary attacks on password hashes is extremely effective, with more than 60% of users choosing passwords that are extracted from a hash in mere days or less on modest equipment, and most OTP is based on techniques that are defeated by a serverside break-in, such as storing "secrets" in the server database, or using master keys to generate token codes, or supporting bypass codes also present in the database or based on keys, the theft of these granting Criminals the ability to recreate or bypass OTP codes at will. By ironic example, the world's most famous OTP security vendor, RSA, itself suffered a server break-in from a phishing attack, and the resulting stolen RSA keys gave attackers the ability to defeat RSA security used by their customers, a problem that RSA only partially cured, at a cost in excess of $65M, and unmeasurable destruction to their reputation.

In general, any OTP that relies on a secret the Provider server knows, is thus defeated if the server is broken into. Biometrics are an especially dangerous factor to store and traffic, on account of the impossibility for users to change these when they become stolen.

It is desirable therefore to find a solution that continues to secure users, even after their credentials have been stolen from a server break-in, or to better prevent the theft in the first place.

One of this present invention's solutions to this problem stores key material on a server separate to any storing user credentials, thus a break-in to the credential server does not expose key material.

Another of this present invention's solutions is to generate keys from biometric sensors, preferably locally in a device without storing or trafficking actual biometric features, thus not putting them in serverside break-in harm's way at all, as well as preventing their local theft too.

Yet another of this present invention's solutions is to generate biometric keys in a way that prevents stolen keys from being engineered back into workable biometric features.

12. Cloud Host Server Break-In

The use of third party machines and services to operate modern online servers (cloud) is convenient, widespread, and growing. Many security risks come along with this convenience, because the hardware and software is created, deployed, and operated by many unknowns, the infrastructure usually shared with many other people, and cloud companies often enforcing sometimes unacceptable (to an operator of a security Appliance) policies like accessing and scanning customer machines. Opportunities exist in abundance for vendors, operators, software authors and others to compromise cloud servers, and numerous co-resident attacks exist that allow one cloud customer to steal data from another. It is desirable to overcome these risks. The present invention teaches headless cloud server auto erasure and re-installation, full disk encryption, and secure remote boot, each of which protects against many risks from the cloud.

13. Password and Credential Theft

Besides the foregoing, many other threats exist to steal user's login credentials, like "shoulder surfing" where the Criminals (or more often friends, family, co-workers or the like) simply observe the entry of the secret details or arrange for cameras to record it, "careless users" who write their passwords down or record them unsafely, "poor user choices" such as re-using the same password on many different places or using easily guessable passwords, or "shared devices" where possibly unintended users can access other people's credentials, and in general, other compromise opportunities presented by unmotivated and/or unskilled users are vast. It is desirable for security to continue to protect even in this environment. This present invention teaches, among other things, physical or virtual security tokens which prevent stolen credentials from being used and also provide the facility to alert the legitimate user when others have attempted to use stolen credentials.

Solution to Problems

Implementation Objectives

Selected improvements facilitated by the present invention include:

1. Fast

Most users do not tolerate delays. Apple's Touch-ID offers the most well-known example. iPhones have passcodes (e.g. 4-digit PIN numbers), but these take time and effort to use, and so unacceptably high numbers of users choose not to have any security at all, because these lock codes are too slow and inconvenient, and their repetitious entry annoying. Apple's solution was Touch-ID—a biometric fingerprint reader that lets you unlock your phone quickly, without needing the slow and repetitive entry of a code.

Technically, this was a vast reduction in the overall security of an iPhone device, because Criminals now have 2 different ways to compromise it: they can lift a fingerprint off the device itself or elsewhere, and use that to fool the biometrics (as hackers infamously demonstrated within 24 hrs of Apple's launch of this technology), and/or they can still ADDITIONALLY guess the passcode that all iPhones still must use as well (biometrics are never 100% accurate, so always need a bypass option, like a passcode).

Apple promoted TouchID technology as an improvement to security, which is in fact true: even though individual users are now less secure than they were without biometrics, overall, more Apple users are choosing to use this (expensive) new feature of their phones (when in the past, they chose to not have any security at all, because it was inconvenient).

This is why "Fast" is so important. Without it, when given a choice, too many users choose "no security" over "slow security" every time. This present invention teaches a method of high-security mutual authentication which operates significantly faster than legacy low-security methods currently do. Users of this present invention get security more comprehensive than available anywhere else, which is also faster and easier to use than anything else as well, by simply matching a pair of similar photos, usually taking just one tap and mere seconds. At a high level, how this works from a user's perspective, is that during their login, they will find themselves "magically" engaged in a fun, momentary action similar to the kids card game "animals" or "snap"— they are shown one photo, and need to tap or click on its matching pair. I say "magically" because significant technical effort (disclosed later herein) goes into making as much as possible automatic for the user (the use of actual magic is not taught in this invention). The fact this action is "fun" also has important significance (disclosed later).

2. Easy

Like speed, ease is important. Cryptographically strong security has existed for decades in the form of client SSL certificates; however, almost nobody ever uses these, because the sheer complication of enrolment, usage, maintenance, renewal and other complicated factors present a near-insurmountable barrier.

40% of the world has internet, that's 3+ billion people of all different languages and competencies. Anything that caters for a general audience needs authentication that this audience can understand and use. This present invention discloses methods which can be easily used by almost everyone in the world, no matter their language, competency or understanding, without those people needing instruction or training or help; this too is a world first for any kind of security system, let alone one, as this is, of the highest possible security protections available. One example of how easy it is to match a pair of photos, being one of this present inventions solutions to improving authentication ease, is the children's card game "snap" or "animals". Humans are naturally adept at quickly recognizing things, it is one of our basic instincts, which is why using photo-matching for authentication is so fast and so easy for us. Many reputable experts in security and cryptography all agree that the aspects of "speed" and "ease" are the top most important aspects of any security system.

3. Self-Service

Scale is important on the internet. For example, a group of friends in a garage can easily build systems which quickly attract many millions of users, so any security they choose to deploy must itself support this scale. Besides scale, internet Users are more and more accustomed to receiving immediate online services, thus any authentication which requires the involvement of parties other than the user themselves will dissuade Users, may be impractical or impossible to deploy or support, and/or will not function to cater for growing business needs. It is desirable therefore to allow Users of a security system to get up-and-running with it all by themselves, and to securely manage their usage, and maintenance thereof. Accomplishing these aspects is taught by this present invention, including through automatic pairing and security token provision, rapid & convenient app deployment, and recovery tokens, at least.

4. Support

The self-service necessity applies to all aspects of authentication. Users need to activate, and enroll themselves. They need to be able to manage their own enrollments, adding or removing protection as needed. They need to be safely able to handle forgetting or losing credentials. Anything that's not automated will require compromise or support intervention, which in large customer bases may be prohibitively expensive.

The more that authentication support is needed, the higher the chances exist that Criminals can use social engineering against support staff or others to bypass authentication. This invention teaches processes and protocols to overcome support drawbacks of existing technology. For example, it teaches the facility to have backup tokens and use multiple devices for token storage each of which facilitate secure self service, support reductions, and social engineering defense opportunities.

5. Two Channel Transport

In-the-middle attacks succeed when they can obtain credentials from victims. It would be advantageous if credentials travel from a potential victim to an authentication system by taking a different path to that of the resource, in order to defeat in-the-middle attacks, or if credentials can be transported safely or with protection over possibly compromised connections.

The present invention teaches use of independent tokens and their capacity to function over a second channel, and use of client side agents programmed to use cryptography and server and client secrets to facilitate secure transport over potentially compromised channels as two of its many solutions.

6. Wide Device Compatibility

Authentication that makes use of a device that a user already owns, necessarily needs to work on that device. Compatibility with a wide range of different manufacturers and device operating system versions, both old and new, both stock and customized, is therefore desired in these situations.

This invention teaches the use of multiplatform app container technology as one way to accomplish diverse device support.

7. No Expiry

Authentication which expires causes multiple problems, and fails at least the speed, ease, support, and self-service requirements of an ideal authentication solution.

The techniques taught in this invention can be safely used without expiry limitations, and the near-immediate update features provide an alternative to any need for expiration.

8. Low Maintenance

Security which requires costly or time-consuming upkeep may be unaffordable or unreasonable to some Providers.

This invention teaches automatic updating techniques and user-self-service methods that minimize the requirement for provider maintenance.

9. Weak-Link Reductions

Normal people sometimes suffer bad luck, like losing things, being victims of theft, forgetting things, plus they can sometimes do unexpected (to a Provider) things like travel internationally, change phones or computers, and so on.

It is best to avoid security which offers "low maintenance" such as allowing users to manage their own unusual circumstances in low-security ways, like letting them get new passwords or tokens or factors when they lose them, letting them bypass the use of factors, or similar, by letting the user employ less-secure means to do this.

For example, if a phone-based 2FA system lets a user disable 2FA when they lose their phone, or lets them bypass security by using mechanisms like confirmation emails, these are weak links that risk being exploited by Criminals.

The use of backup tokens and multiple-device tokens and client agents are some aspects taught by this invention that work to avoid weak links.

10. Mobile

Most users need authentication from more than one device or location (for example, a PC and a phone or tablet, or from work and home, etc.), thus it is desirable that Authentication not be tied to an individual device, or an immobile one.

This invention teaches the use of tokens that are mobile for authentication, and authentication that can use multiple tokens in different devices.

11. TOTP & EOTP

One time passwords (OTP) which change after each use, or event (EOTP) and ones which are valid only for a short period of time (TOTP) can be more secure than static passwords when way to safely exchange them are used. This invention teaches the safe exchange of codes designed to be used one-time-only that are both time limited and event based.

12. Multi-Site Support

Most users have more than one login, the average across all internet users in 2015 is 70 different logins per user, thus it is important that authentication methods support more than one site at once, for example, methods that make use of a single physical TOTP hardware device per user per site become increasingly inconvenient when each new site requires the user to carry around another device just for it. Re-using old-art tokens on multiple sites introduces security and privacy risks.

This invention teaches ways to safely use mobile devices for many different sites (as well as many users and many user personas on one site), while also preserving User privacy.

13. Multiple Identity Support

Similarly, users who wish to maintain more than one identity or persona with one site are ideally supported by authentication which supports all their identities without requiring individual devices for each.

In addition, it is desirable for authentication in this situation to preserve the user's privacy, and not to leak information to the site which may allow it, against the user's wishes, to associate their identities, like for example unique device identifiers or other uniquely associated identifiers delivered to, produced on, or tied to devices or individual users of a device.

This invention teaches the use of tokens which may be used in a device for the purpose of authentication of a user's identity, but in so doing, can properly function without using unique to the user, or unique to a device identifiers, thus preserving privacy while supporting multiple user identities or personas.

14. Works Offline

Authentication devices which cannot function without their own working networking environment are undesirable, e.g. phone-based authentication which will not permit a user's login to a PC when the phone has no working data connection. This invention teaches the use of codes associated with photos or the like which can be communicated by means other than network data, such as typing (e.g. FIG. 2), audio, ultrasonic, camera-based, NFC, device sensors, and others, to facilitate offline use.

15. Works without Internet Access

It is desirable that authentication work reliably, even in the event that a user is for some reason without internet access, e.g., travelling and so without the capacity to receive incoming notifications, for example SMS messages or PUSH notices.

This invention teaches how to provide tokens in both physical or soft (electronic/virtual) form, which can be opened and successfully used without needing direct network input from a Provider or associated components.

16. Loss Mitigation

The loss of authentication devices, like for example ones based on mobile phone technology, should ideally be managed by an authentication solution in a secure way, and ideally without introducing provider overheads or support costs, and especially without introducing opportunities for imposters to falsely claim to be Users who have lost their authentication devices.

Removal or deactivation of lost devices, re-enrolment of new ones, and in general the management of authentication should ideally be performed only by the user, and ideally always in a secure way that is resistant to social engineering and preferably all other attacks that the original authentication system resists. One example of how these aspects are taught by the present invention, is the use of recovery tokens.

17. Strong Entropy

Codes exchanged during the process of authentication should ideally have strong entropy, and resist being cracked or guessed by the power of at least modern computing hardware, but they still need to be readable and easily used by everyday people. This invention teaches how to have codes that exceed the strength of legacy authentication codes, through character set and code length selection which provide easily recognizable unambiguous codes to support high entropy protection.

18. Low Cost

The higher the cost of an authentication mechanism, the fewer the number of Users or Providers that will be able to afford it. In developing nation rural areas or elsewhere, even costs that first-world citizens may find insignificant, may be completely unaffordable, thus it is advantageous to find an authentication solution which has capacity to protect users for little or even no cost, to help ensure the broadest possible protection of a Providers user base. This invention teaches how to distribute physical (hard) and virtual (soft, or electronic) tokens, each of which can cost significantly less than legacy ideas. Ways to let users download or print their own tokens at home are less expensive to a Provider than shipping the user a physical device.

Features

Selected benefits enabled by the present invention include:

1. Transaction Non-Repudiation

Some Providers offer their users fraud guarantees, like banks agreeing to reimburse victims after fraudulent activities cause financial loss. This may sometimes be a sound business decision, for example, when the losses from reimbursing online fraud add up to less than the cost savings from encouraging users to operate online. For example, some banks will pay back their victim customers all or part of their losses in the event that malware or hackers steal money, because the branch-staff cost-savings from encouraging customers to bank online are significant.

Unfortunately, this has led to modern situations where dishonest customers have been fabricating false stories, e.g. stories of hackers or malware or otherwise claims like "It wasn't me.", in order to steal from the bank.

It is advantageous therefore, to find a way to verify transactions that a customer makes, and in so doing, to obtain some certainty that the customer is legitimate and intends to make the transaction in a way that help prevent false customer claims to the contrary (e.g. non-repudiation), so that the opportunity for the customer to falsely dispute having made it is reduced.

This invention teaches the use of sensor equipped mobile platforms and secure communications with asymmetric cryptography and rich two-way customer interaction as one means to both confirm user intent, as well as collect non-repudiation metrics to help combat fraudulent customer claims.

2. Biometrics

Biometrics can be convenient for assorted security-related purposes, although the use thereof is sometime discouraged by experts and/or banned by legislation, because it carries some unique drawbacks, like it usually being easy to observe or steal or emulate, and once compromised, Users cannot change their features. The trafficking (exchange over networks) of biometrics data is banned by law in some states and countries, the use of biometrics on children is also banned by law in some states and countries, as is the movement of biometrics data across borders in some states and countries too.

The convenience factor however, can make the use of biometric techniques suitable in some situations. This present invention teaches how to use biometric feature readings to construct encryption keys so that these keys can be used to protect authentication data but the biometrics features that generated them cannot be easily reconstructed.

This facilitates convenience for users while avoiding legal infringement problems and technical theft risks. For example, in one embodiment of present invention, a user with a smartphone will only be able to perform secure operations after the front-facing device camera has recognized that the legitimate face of the user is present, this action assisted by illuminating the user's face in dark environments through substantially bright-whitening the device display during recognition, all the while using keys that prevent a thief of the device or key from being able to recreate a face image that would regenerate the key.

3. Face-Recognition Unlock

One embodiment of present invention teaches the use of a smart device for authentication and other operations, enabled through the use of an electronic token, typically implemented such that the use of these techniques usually take as little as one single tap from a user, taking mere seconds to perform.

In situations where Providers may like improved assurance that the User of the device is the one intended (and not, for example, their children), it can be convenient to use the device front-facing camera to facilitate this, with the use of biometric techniques also disclosed herein.

For Providers additionally requiring non-repudiation of actions, this present invention teaches the collection and transport of photographs snapped by the front-facing camera, for example, to later enable a Provider to handle customers disputing actions they have taken. It will be appreciated by one skilled in the art, that face biometrics are just one of many possible biometrics that can be used, others including, but not limited to, fingerprints, heart readings, palm vein, eyes, retinal, ecg, typing style, ear-print, voice, and so on.

4. Mutual Authentication

One significant advance introduced by this inventor is the use of pairs of matching photos as a fast, reliable, and easy means for Users to be assured of the legitimacy of servers they authenticate with during the process of authentication, this means being designed such that its success becomes an integral step of the negotiation, for example, it cannot be accidently skipped or overlooked by inattentive or untrained users. This invention teaches an improved version of mutual authentication, because it is a user-to-server protocol, as opposed to a device-to-server one, the latter difference being the opportunity that phishing and scams take advantage of.

5. Idiot-Proof

It is unreasonable to expect that every user of a computer system will never make a mistake and never be tricked by phishing emails, especially as the Criminal art of spear-phishing continues to improve.

The technique of matching a pair of photos is one means by which users can be protected against their own mistakes (if no pair of photos match; the user has made a mistake), plus it is intuitive, easy, and fast, requiring usually no User education to use.

6. Fun and Beneficial

Another way to encourage Users to care about security and adopt it, is to help them want to do this. Games based on matching pairs of similar things are popular and enjoyable with babies and children during the formative years of their life. It is thus found to be satisfying and subconsciously enjoyable when adults participate in this activity.

It is also possible through the selection of the photos that require matching, for example by choosing smiling faces, to make a measurable and positive difference to the mood and outlook of the participant in the matching process, on account of the repetitive nature of the random matching process training the mind of the user to instinctively seek out things which are "happy" in other aspects of their life as well.

Authentication to computers is a task that is often performed by a large number of people many times every day. One aspect of this invention teaches the use of happy photos like smiling faces for the photo pair mutual authentication step to provide additional benefits to Users.

7. Profitable

Unused security protects nobody, thus it is desirable to encourage Providers to want to protect their Users to add security into their systems. Helping them earn money is one such encouragement.

Not all providers are equipped to bill Users, and Users also exist that may be unable to use any billing methods a Provider offers. Thus a solution introduced in this present invention allows for Providers to collect money from Users of the security system through the use of billing, such as by third parties, the Users on their mobile devices for the provision of the security, thus incentivizing and/or enabling the Provider to allow users to adopt improved security.

8. Seedless

Protection that is derived from the use of "seeds" or master keys or asymmetric cryptography can be, and often is, compromised by the single point of failure introduced by these.

One aspect of this patent teaches the use of hardware-generated random numbers (also known as one-time-pads) for code generation and the shared-key storage of same on independent authentication Appliances to overcome single point of failure vulnerabilities. Another aspect is the generation of asymmetric keys by user devices.

Advantageous Effects of Invention

It is desirable that a comprehensive, and ubiquitous solution be found that works against an enormous variety of threats, and is able to work everywhere, for everyone, at all times, on any site. These aspects exist in this present invention.

There are a large number of individual advantages throughout this invention, each is described and best understood in context and are disclosed in the detailed description and throughout. Note that many advantages are useful in other contexts, and disclosure in context herein is non-limiting to said or any particular context.

BRIEF DESCRIPTION OF THE SEVERAL VIEWS OF THE DRAWINGS

Security drawings are dangerous. Drawings in general exist to help simplify and clarify complex systems, by converting abstract notions into visual diagrams and information, however, computers and in particular security is an extremely complex system with enormous numbers of moving parts and the interfaces between components is especially intricate, often relying on complex mathematical constructs and involved protocols, wherein the omission of a single small part can have catastrophic consequences rendering the entire system totally insecure. It's not just "good enough" to get security "almost right". It is this inventor's opinion that the human desire to draw and simplify things is one major contributing factor to the poor state of internet security, since it has almost certainly caused a range of exploitable opportunities for criminals where small parts missed in a drawing are later missed too in an implementation. Security is not a neat organ that can be extracted and pointed at, it is an integrated circulatory system, which is threaded in near inseparable complication with the system it's trying to sustain. It's like the difference between drawing a heart, versus trying to convey in a drawing every possible bodily place that a blood cell could reach. Having, ironically, just said that—analogies too are dangerous for the same reason, and so are simplified examples in some cases.

For this reason, it will be appreciated by one skilled in the art that diagrams alone will never be sufficient to convey a complete understanding of (at least) the security aspects of this invention.

Figure 1:
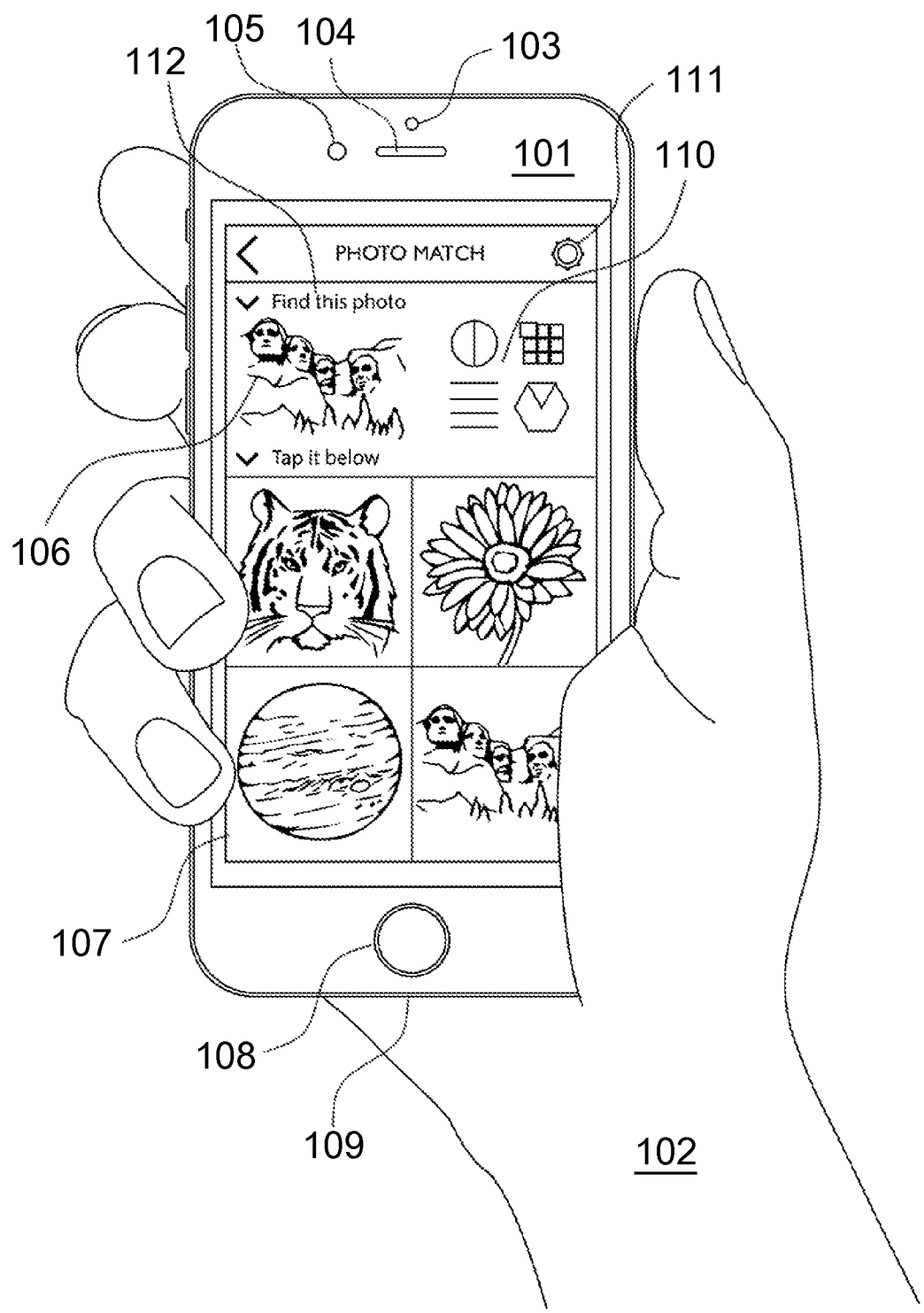

Notwithstanding, the invention will be understood and appreciated more fully from the detailed description taken in conjunction with the appended drawings in which:

FIG. 1 Smart Token Illustration Showing a Mobile Photo Match

This is an example display that a mobile phone user would experience during an authentication step for a resource accessed from the same device. Note that the user forms part of the protocol, which is why they're included in the drawing.

Mobile phone device 101 held in User's hand 102 having a front-facing camera 103 and a speaker 104 and infrared sensor 105, displaying instructions 112 and hint 110 to the user, comprising a server-originated random photograph 106 which exists among an assortment 107 of random photographs of a token stored within token app software on the device, which additionally includes a biometric fingerprint sensor 108 and microphone 109 to pick up spoken voice and setting option 111 for user to manage token.

This screen display on phone 101 typically appears automatically when needed, having been summonsed via PUSH (e.g.: deep link or custom URI the like). The sensors 105 and 109 can receive summons via infrared or sonic/ultrasonic, as can other phone elements, such as its radio, plus users can manually open tokens through apps as well. Tokens encrypted with passwords or biometrics (e.g. refer FIG. 10) require the user to first decrypt them, using the screen as a keyboard etc., or biometrics sensors such as 108, 109, or 103.

Figure 2:
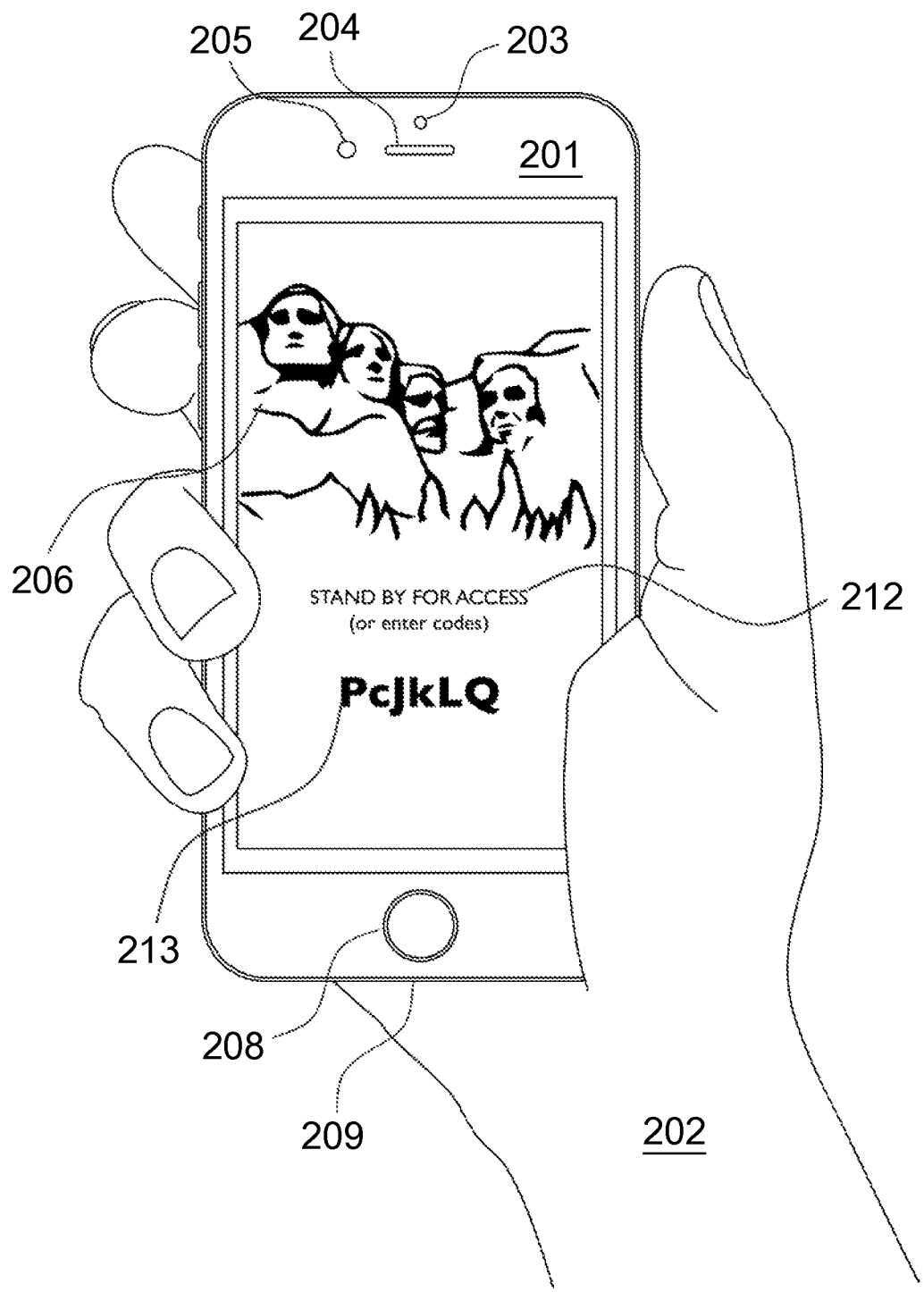

FIG. 2 Offline Code Entry Mobile Screen

Users wishing to access online resources from one device, using a second mobile device for the authenticator, but second device having no network connectivity, would experience a display like this.

Figure 7:
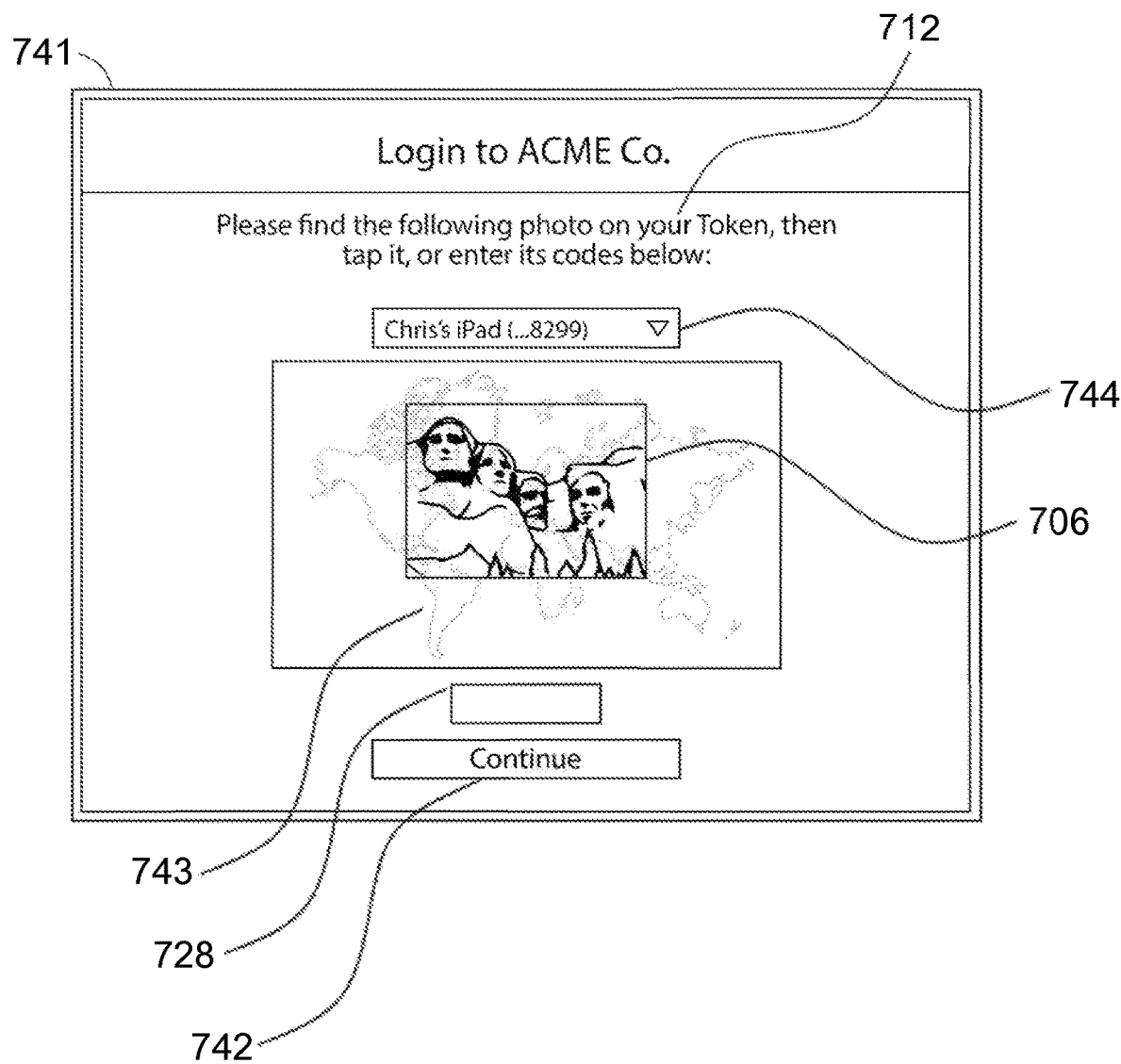

Mobile phone device 201 held in Users hand 202 having a front-facing camera 203 and a speaker 204 and infrared sensor 205, displaying instructions 212 and a random access code 213 which the user can type in to the first device to authenticate (e.g. refer FIG. 7) . Prior to this screen, the user will have seen a photo on the first device (e.g. FIG. 7, element 706), and opened their mobile phone smart token (or sensors/PUSH may have opened it automatically for them), and tapped on the matching photo (e.g. FIG. 5 element 506) to reach this screen. Photo 206 shows the user which photo they tapped on together with the random code 213 associated with this photo. The mobile device additionally includes a biometric fingerprint sensor 208 and microphone 209 to pick up spoken voice and camera 203 for face recognition. Sensors 203, 208, and 209 may be optionally used prior to this step to biometrically protect the photos and/or access code 213. The code 213 exists to allow the user 202 to type in this one time key (e.g. into FIG. 7, input box 728), to gain access. Speaker 204 may be used to broadcast a random code associated with the photo for pickup by the machine (e.g. PC 889 in FIG. 8) they're authenticating with (e.g.; by its microphone), as can other transducers like radio or PUSH.

Figure 3A:
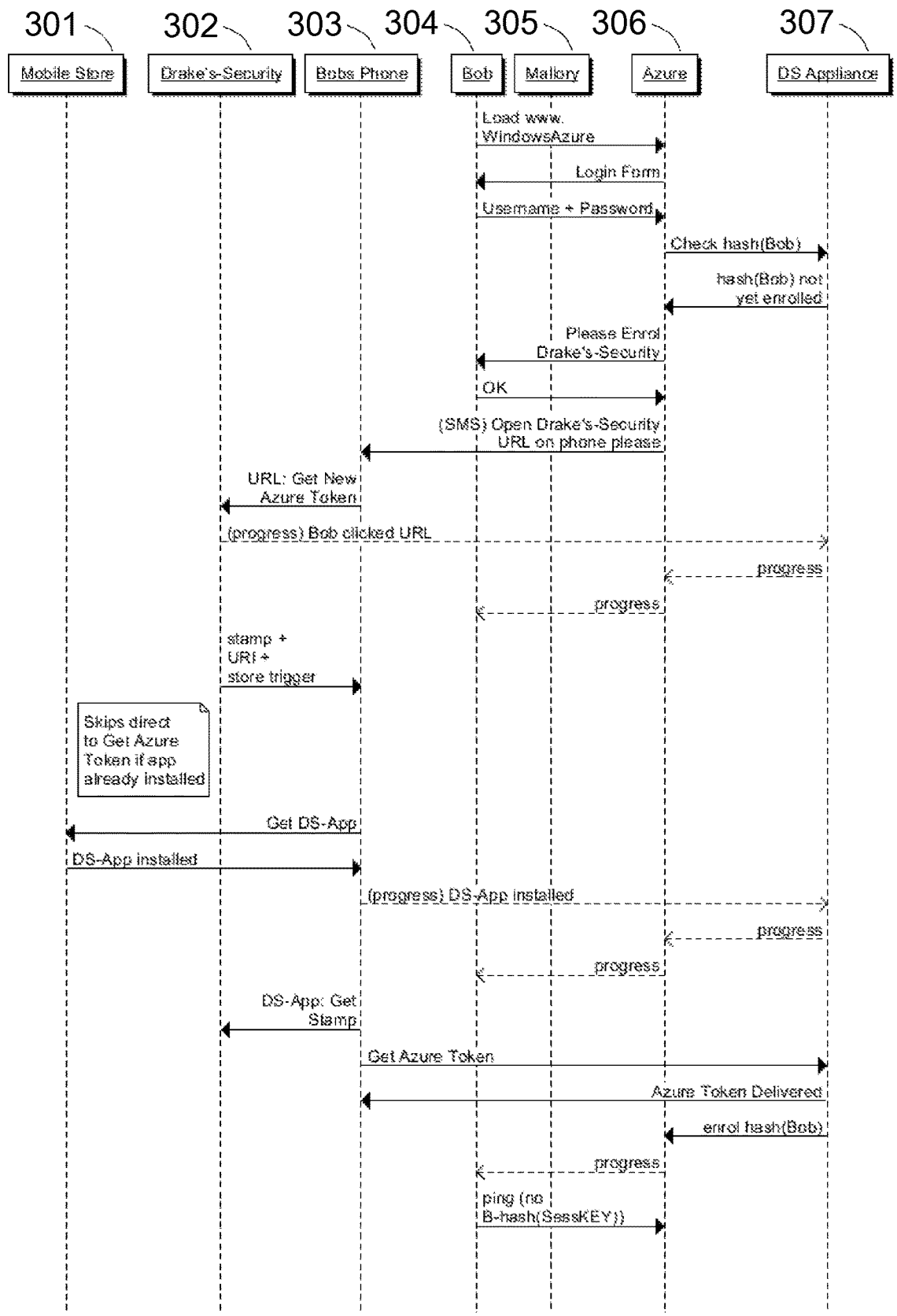
Figure 3B:
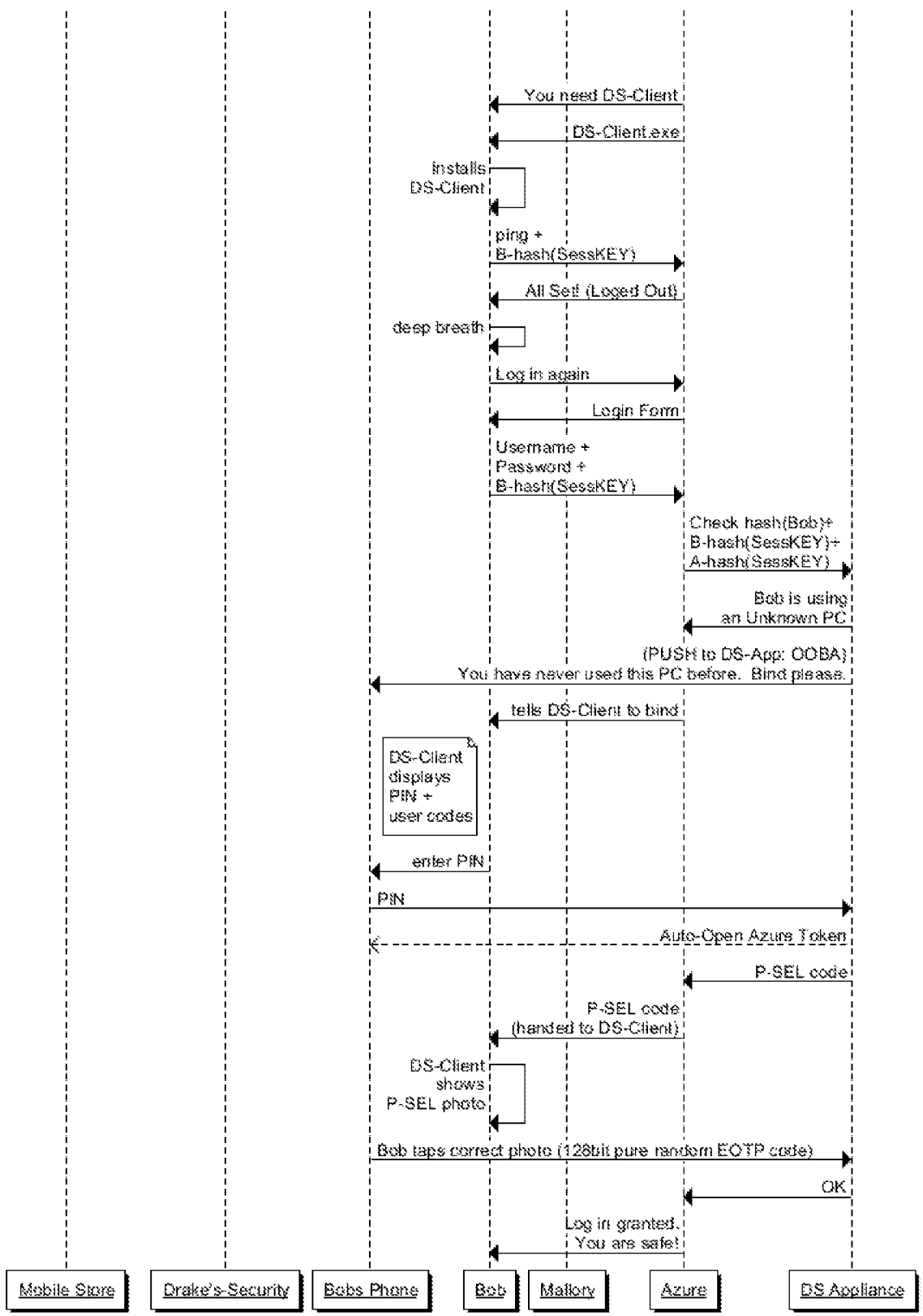

FIG. 3A and 3B Anti Man-in-the-Middle Flowchart with Enrollment and Authentication The present invention teaches strong protection against a wide variety of man-in-the-middle attacks, including the facility for new users to safely enroll for protection against these attacks even in the presence of an attack.

There are 7 actors in the enrolment and authentication process; an online mobile store 301 (for example, Google Play or Apple App Store) capable of delivering token-app-software to a user's mobile device, an online web server 302 for brokering temporary device Cookies, a mobile device, such as a phone 303 used by our User 304 who we call "Bob" with his web browser, the malicious in-the-middle attacker 305 Mallory, attempting to subvert Bobs' actions, a Provider 306 wishing to protect their users who we call "Azure" in this example, and a security appliance 307 operated by or for the Provider to support the authentication and security.

Reading down this chart, indicating steps with "*", enrolment begins when bob loads the * www Azure web site in his browser. This will be Bob's first login since Azure implemented protection according to present invention. Bob accesses the login web form * and enters his username and password *. Azure computes a hash of Bob's username and communicates * this to Azure's DS-Appliance 307 security machine built according to present invention. DS-Appliance 307 determines that Bob is a new user and instructs * Azure 306 to put Bob through the enrolment process. Azure 306 informs Bob of the new security system * and offers to enroll him right away. Bob OK * accepts which triggers Azure to originate a SMS * message to Bob's mobile phone which includes a web URL for Bob to open on his phone. Bob opens this URL, the act of doing so triggering a message * to DS-Appliance which relays * this message to Azure which updates * for Bob on his PC screen web browser the instructions and his progress through them for Bob. Concurrently, Bob's phone is temporarily stamped * with a cookie and if Bob already has token-app-software (DS-App) installed * said software obtains the requisite token for bob (i.e. skips to the "Get Azure" step). If DS-App is not yet installed, Bob's phone redirects * to the appropriate app store to install * on Bob's phone. Bob's phone relays installation progress message * which passes * to Azure and * to Bob's browser to update on-screen progress indicator and instructions. DS-App obtains * the stamp (set earlier) facilitating identification of Azure and Bob to the newly installed software, which * requests a token for them which is * delivered from DS-Appliance, which informs * Azure that Bob needs to enroll.

Azure indicates * enrolment progress to Bob triggering * a response from his browser to Azure, said response revealing lack of a DS-Client helper present on Bob's PC. Azure * informs Bob he needs this helper, and * delivers the code-signed installer for it to Bob. Bob installs * DS-Client which then * informs Azure that Bob is now ready to log in safely for the first time.

Bob * is now instructed * to log in again (possibly creating mild annoyance * and a deep breath from Bob, who may not appreciate the depth and complexity of the protection being deployed for him behind the scenes). Nevertheless, since Malloy had opportunity to steal or interfere with Bob's credentials at step *, it is necessary now to enlist the help of DS-Client with Bob's credentials, thus he provides them a second time in response to Azure's * form. DS-Client processes credentials and communicates * them with hashed keys to Azure, which checks with DS-Appliance * and find out * that this is the first time Bob has wanted to log in from this PC using present protection. The appliance informs * Bob via his phone of this fact while Azure * informs his PC which activates * DS-Client to generate a PIN. Bob enters * the PIN to his phone which is checked * by DS-Appliance, which then triggers * automatic opening on Bob's phone of the token (from step *) thus displaying for bob an assortment of random photographs. DS-Client constructs a code, sent * to Azure and on-communicated * to DS-Client which is used together with communication channel session data to display * for Bob a photograph computed by DS-Appliance to exist on Bob's token. Bob taps the matching photo on his phone, which communicates * the random code associated therewith to DS-Appliance, which informs * Azure of a correct login, which grants * Bob's authentication request.

Mallory has opportunity to monitor or subvert the majority of communications, but present inventions protocols prevent her attack; the most she could do would be to prevent Bob using Azure—thus revealing her presence and enabling bob to expel her from the connection. One benefit of the photo matching step is that unsafe logins for Bob will cause no correct matchable photo to display, preventing Bob from logging in, even if Bob is careless, lazy, inattentive or untrained etc.

Figure 4:
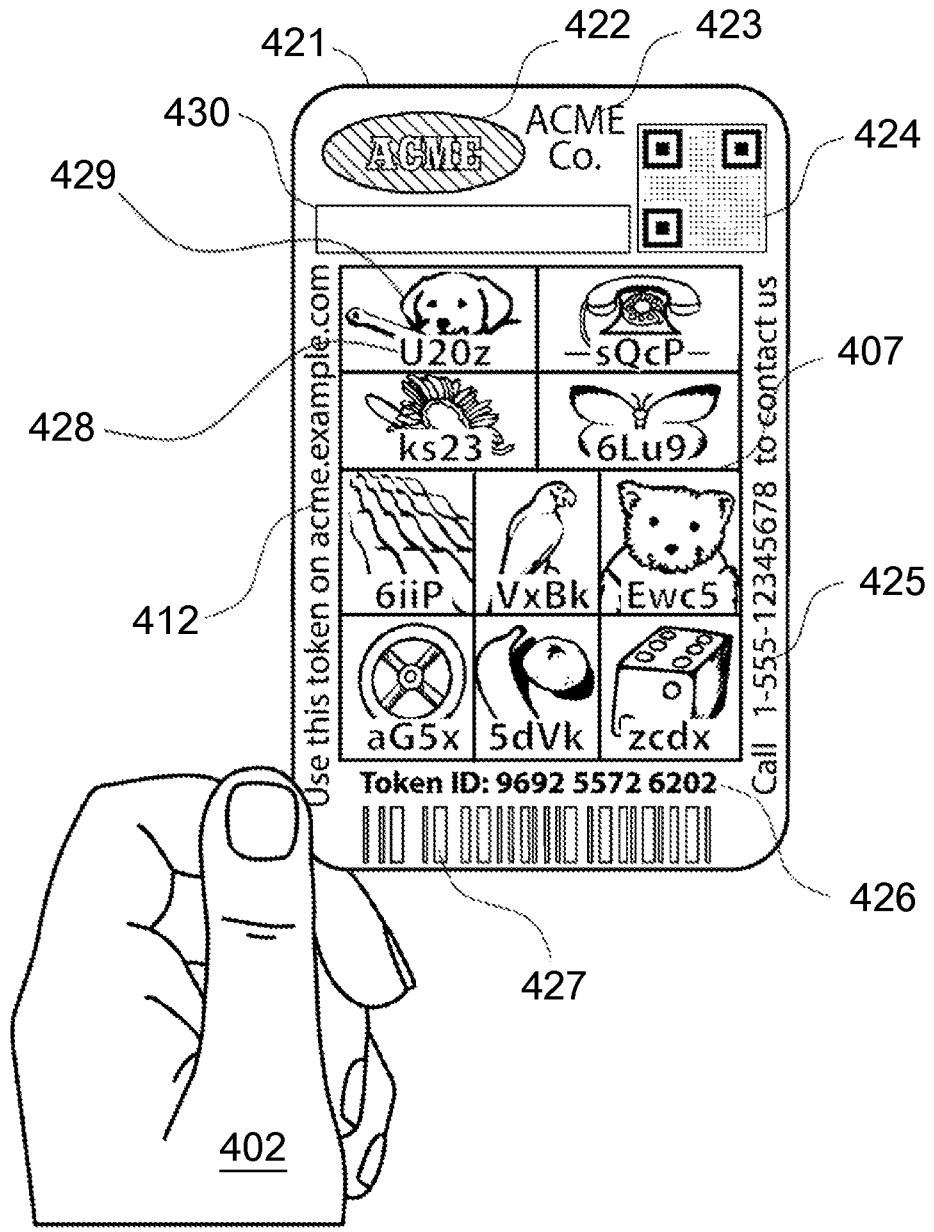

FIG. 4 Printed Physical Token

This shows User 402 (who is literally part of the mutual authentication process, which requires his hand 402, eyes, and brain (not shown) to complete) holding physical printed token 401, which in the best mode contemplated is the dimensions of a credit card. This card carries the logo 422 of the Provider it's for use with, as well as their name 423 (in case the user is not familiar with the Provider logo), along with a QR code 424 which has multiple uses, including encoding the serial number as well as a helper page URL and Cookie stamper and app deployment redirector, an assortment of ten different random photos 407 (more photos can optionally be provided on the reverse of the token if needed), Provider support contact details 424, a readable token serial number 426, a barcode representation of the serial number 427, an indication/instructions for where to use this token 412, and a notes area 430 for Users to record arbitrary info on (e.g.; their username which this token goes with—note that tokens are provided by security appliances, which in the best mode have no knowledge of Users usernames).

One random photo is puppy 429, and the random code which is associated with the puppy 429 photo, is the 428 code "U20z". (e.g. this code 428 would be entered into box 728 of FIG. 7, after the User makes use of dropdown selector 744 to select token 421—the last 4 digits of its serial number 426 will show in box 744 when selected, and the photo 706 would change to match the puppy 429 (for example) when ready), FIG. 5 Phone Showing Token App Software Display of Random Photo Selection Screen This shows the token-app software as it would appear during a user authentication through a different device (e.g. PC 889 in FIG. 8). Smartphone 501 is held by users hand 502 (the users hand is part of the authentication process, since the mutual algorithm extends to their eyes and brain, and they use their hand to trigger the mutual authentication step). It has front-facing camera 503 (can be used for face-rec biometrics), speaker 504 (can be used for voice calls, as well as emitting sonic codes for pickup by a nearby secondary device), infrared emitter/senor pair 505 (also giving opportunity for near local communications), fingerprint sensor button 508 and microphone pickup (on the side) 509 useful for voice biometrics. Shown on the screen is the token app software, giving instructions 512 to the user, showing an assortment of seven random photos 507, one of which 506 will be the login photo a user must tape (in our drawing examples) to log in.

Figure 6:
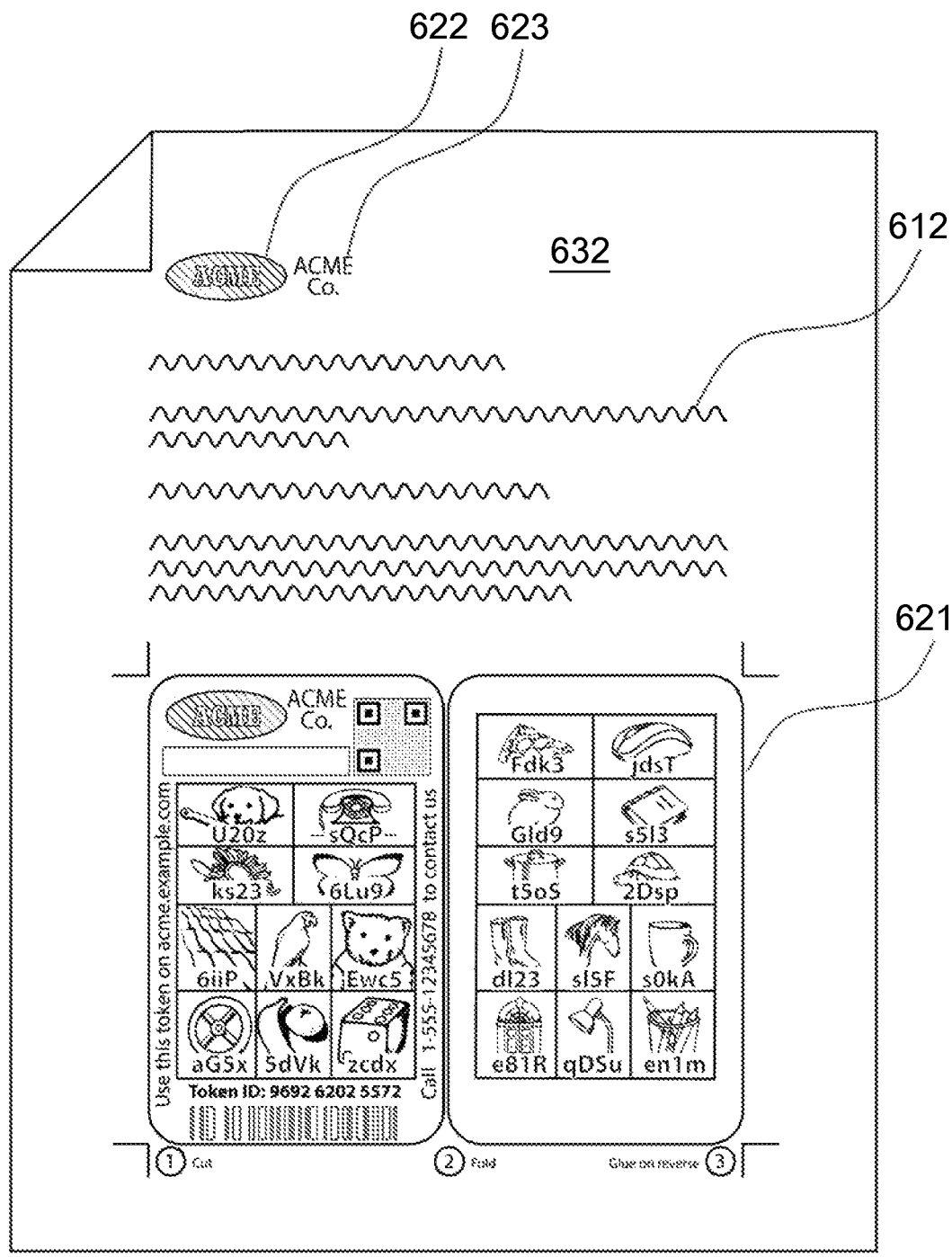

FIG. 6 Self-printable Physical Token

Sheet of paper 632 has printed on it a provider logo 622 and name 623 with instructions 612 and a security token 621 which can be cut out, folded, and glued by a user to create a credit-card sized portable physical token, usually at no cost to the Provider offing this feature.

FIG. 7 Input Screen for Manual Token Code Entry

Figure 5:
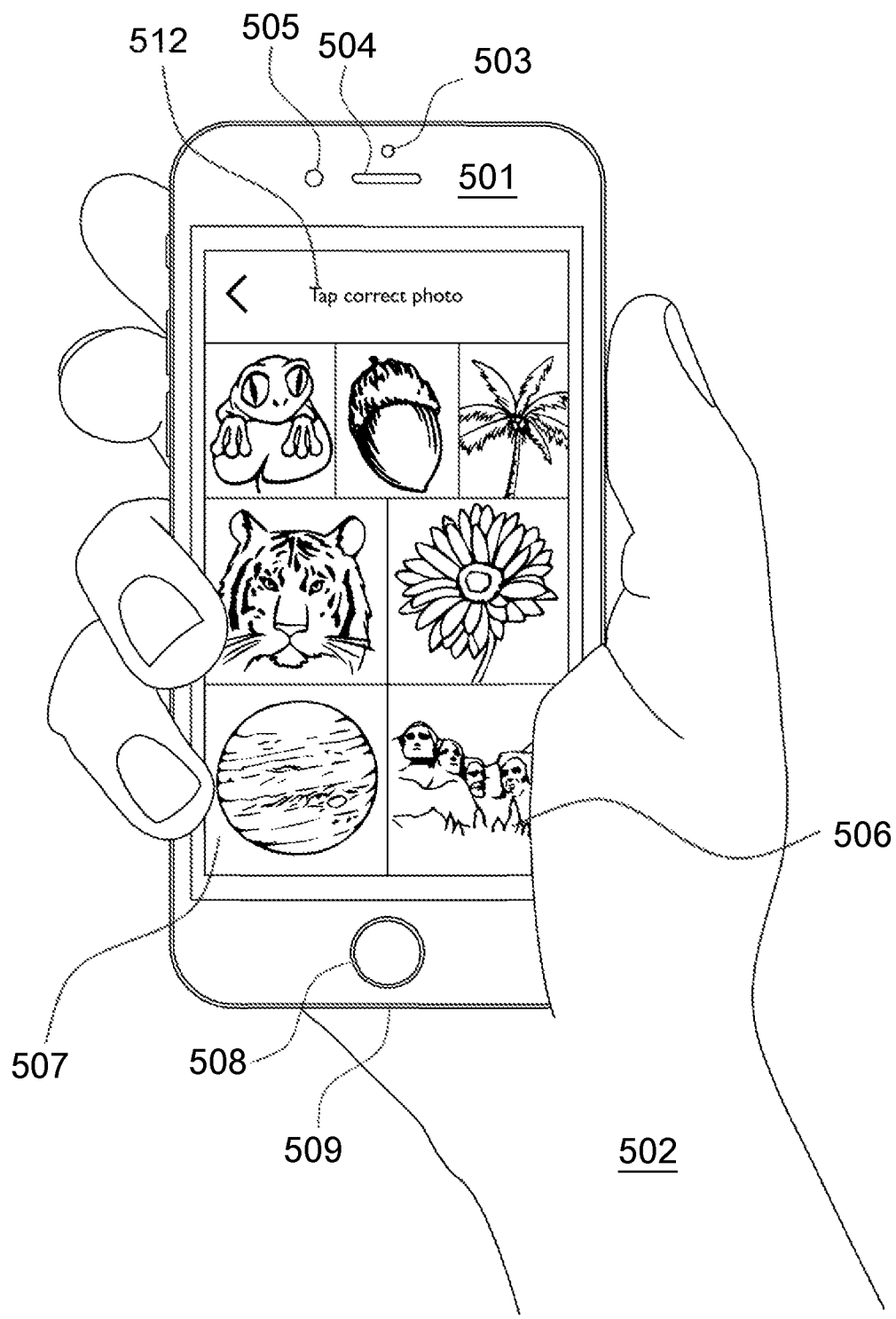

Computer input display screen 741 carries instructions 712 to a user for them to find and tap on photo 706 on their token (e.g. photo 506 of FIG. 5). The display of photo 706 is watermarked with a world map image 743 to hamper machine use, and is additionally signed, timestamped, allocated a unique ID, and provisioned with misuse-use triggering URLs in its metadata. Note that 706 and 743 are ideally both parts of just one single image file rendered for display to the user (e.g. the watermarking is done serverside).

Input box 728 accepts typing of random codes from users, and submit button 742 allows them to continue after they've entered their code. Drop-down selection box 744 allows the user to select which token, from possibly many different tokens they can use on their account, they want to use to authenticate with. When users can have more than one token, this allows for secure mitigation against loss, theft, or other unavailability problems on their primary token.

Figure 8:
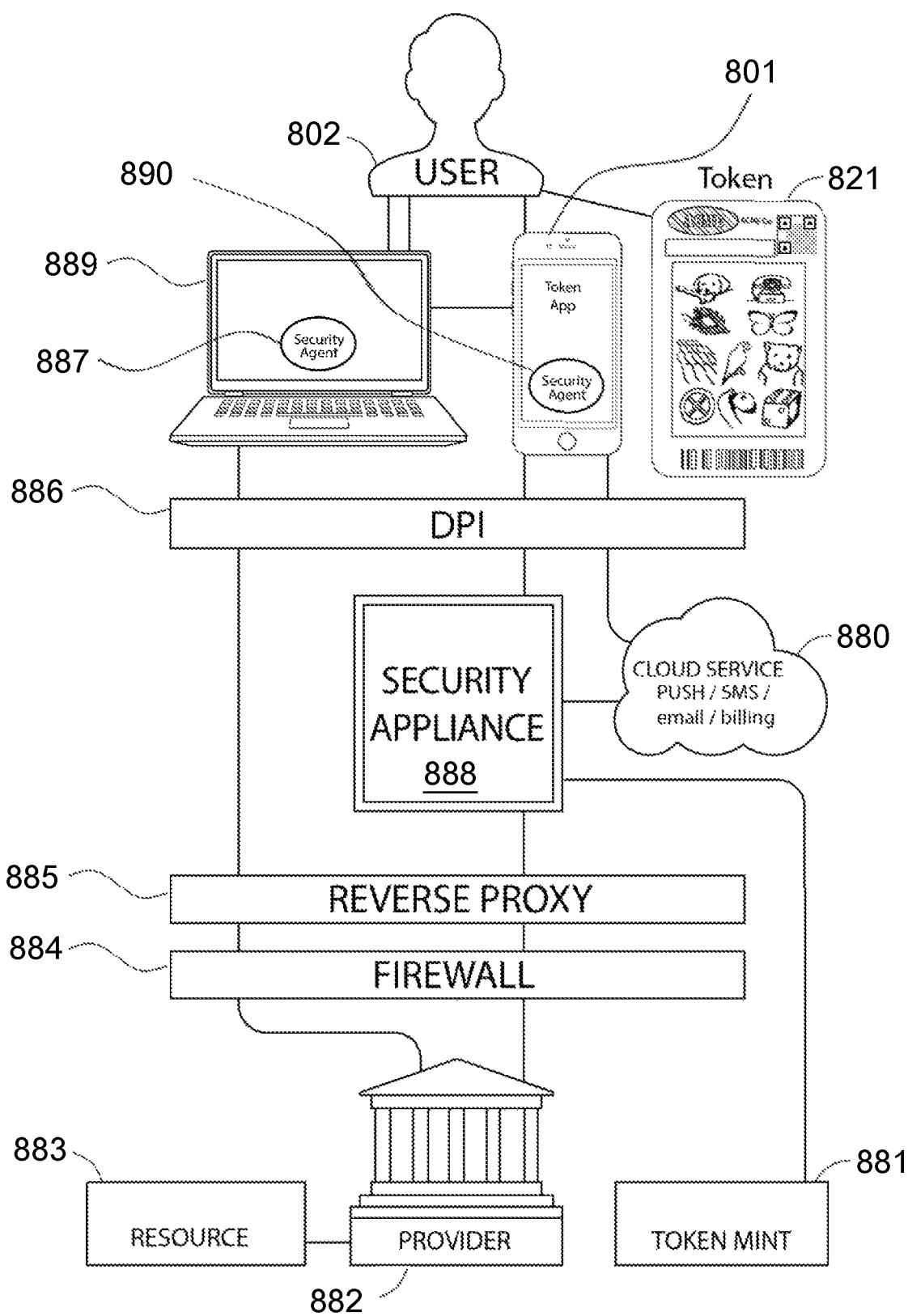

FIG. 8 System Architecture Overview

User 802 has a printed token 821, uses a laptop or workstation 889, and has an optional mobile device 801, which runs token app software. PC 889 has a helper security agent software 887 installed. Mobile device 801 has helper security agent software 890 installed.

Users PCs and/or mobiles are sometimes behind an optional deep-packet-inspection (DPI) firewall 886. A cloud service 880 exists to trigger PUSH to mobiles, to send SMS text messages, deliver email, perform billing, and so on.

Security server appliance 888 in the center is the main way this invention enforces protection to Users 802 and Vendors 882 alike, with help from the other system parts. This appliance consumes tokens from the mint 881 to facilitate usage metering and billing etc.

The optional reverse proxy 885 can be used to rapidly enhance provider security; like the DPI firewall, it may, or may not, necessarily be present.

Firewall 884 usually exists to help most providers counter simple threats and attacks, and it sits between the internet and Provider 882.

The Provider typically meters access to resource 883 which the User wishes to access.

Figure 9:
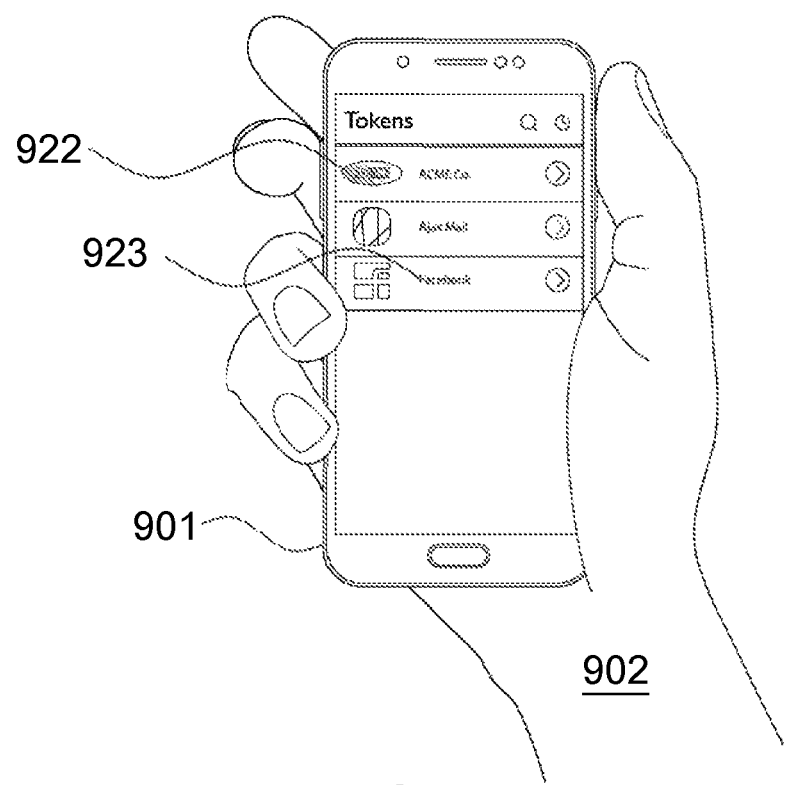

FIG. 9 Many Providers in One App

This shows the token-app software manual token selection screen. Mobile device 901 allows user 902 to select which token they want to use from the display of possibly many tokens. This is made easy by showing the logos 922 and Provider names 923 on each token entry in the list. In most automatic online situations, there is usually no need for users to see this screen, since tokens open when needed, and close when done with, automatically in most situations. This screen only exists as a way for users to manually open tokens, such as when a PUSH service fails to automate it for them.

Figure 10:
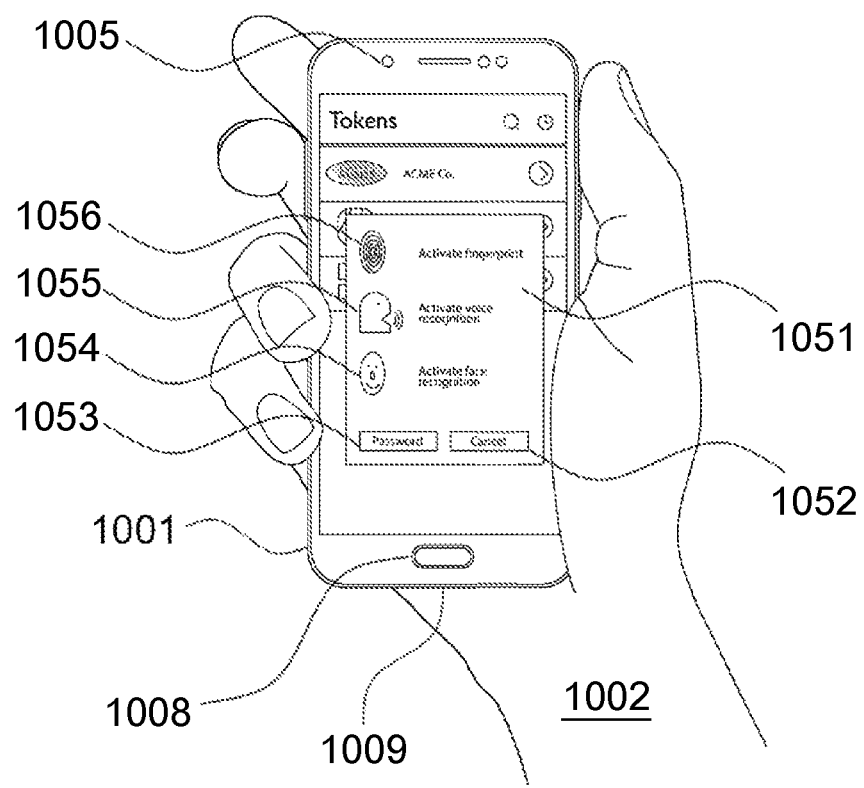

FIG. 10 Biometric Token Decrypt/Unlock

When users need to access protected tokens, they need first to decrypt them. Mobile device 1001 in use by user 1002 is showing the biometrics selection box 1051 which comprises means to select 1056 fingerprint decryption, 1055 voice biometrics decryption, 1054 face-recognition decryption, or a 1053 password supplied by the user. They can 1052 cancel out of this screen if they didn't mean it. Device front-facing camera 1005, fingerprint reader 1008, and microphone 1009 support the input of biometrics data. All, none, or any combination is supported.

Figure 11:
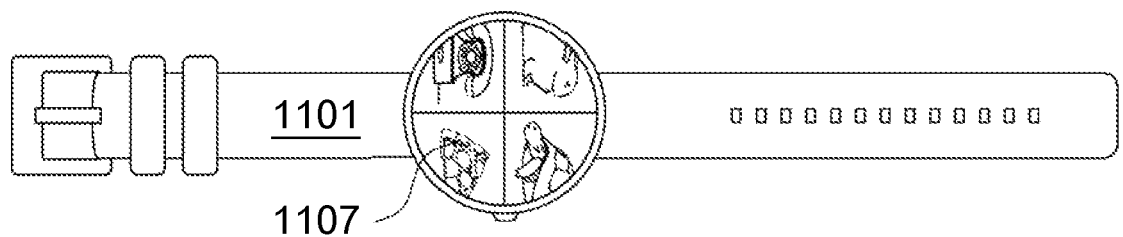

FIG. 11 Mutual Authentication Via Smartwatch

Smartwatch 1101 shows a small selection of random images 1107; a User with such a watch, when authenticating with a web service, merely needs to glance at their watch, tap the correct photo, and they're logged in. This invention's token-app software is programmed to activate the watch when needed, and convey the selection when tapped, to automate as much as possible of this method.

Figure 12:
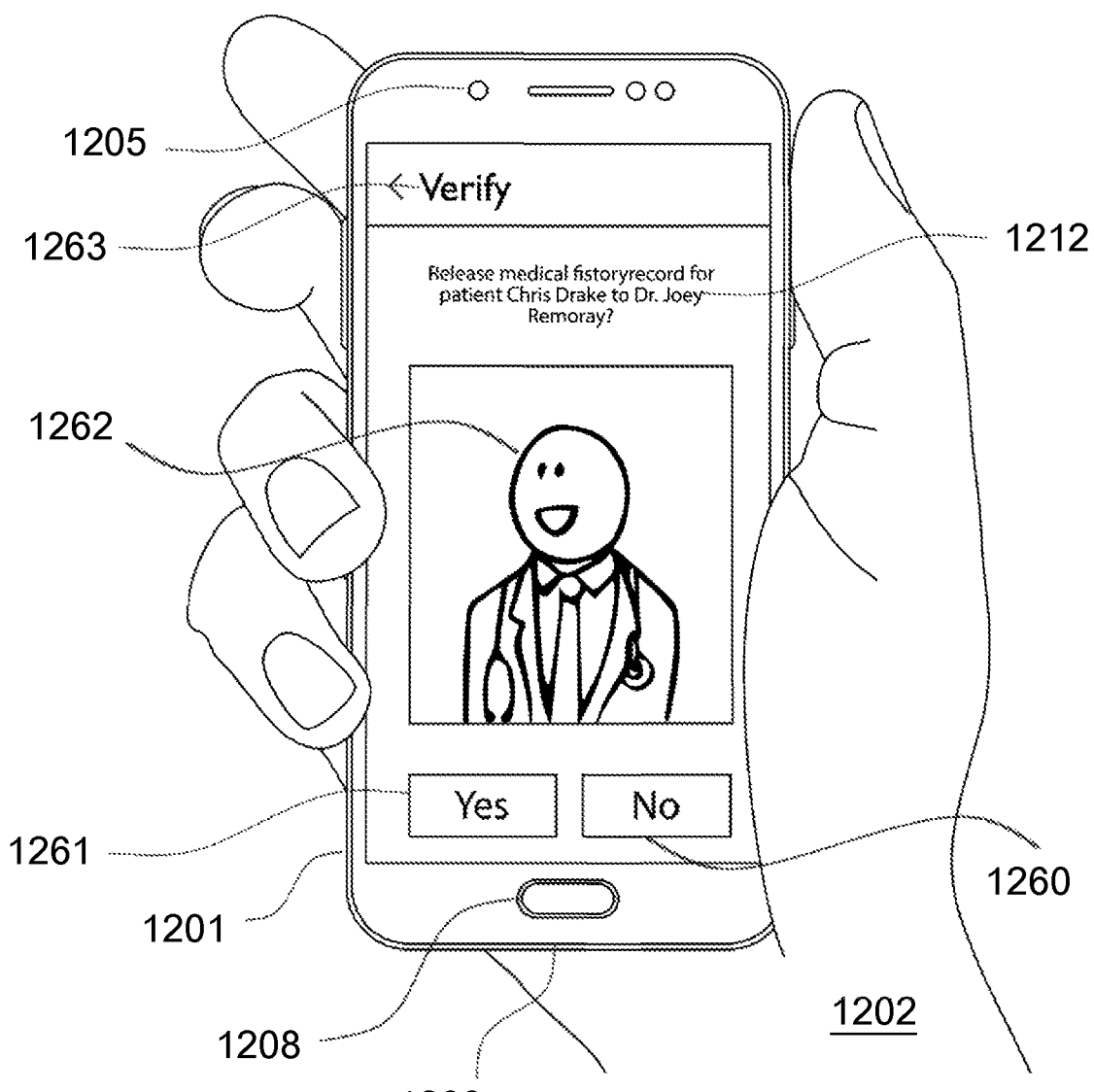

FIG. 12 Out of Band Actioning Attribute Release

This shows an example display that a User might experience when permitting the release of personal data about themselves. Mobile device 1201 with biometrics sensors 1205 (face rec camera), 1208 (fingerprint), and 1209 (voice rec mic) is held by user 1202. They see instructions 1212 for an event 1263, and are shown a non-random photo 1262 which represents the facial portrait of the third party who is requesting their attributes. The user can approve 1261 or decline 1260 this data release. In this example, a patient would typically be in the presence of the doctor at a surgery or hospital, thus they can check that the photo on their screen is the correct one for the doctor they are permitting their information release to. Note that with an identity infrastructure and trust brokers in place, this provides strong protection against imposters and fraud.

Figure 13:
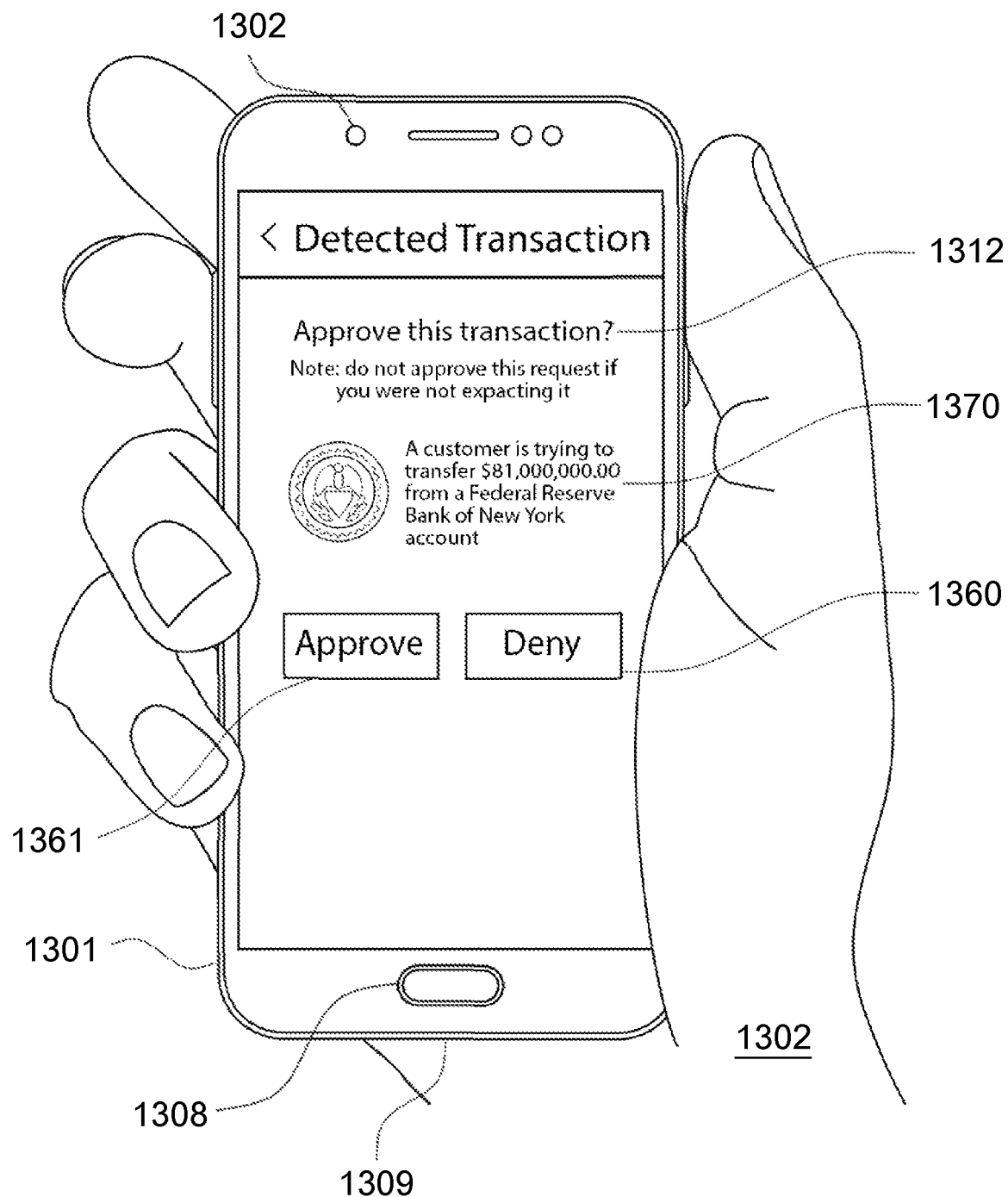

FIG. 13 Denying or Verifying and Signing a Transaction Request

Device 1301 held by user 1302 with biometric sensors 1302, 1308, and 1309 is showing the reception of an out of band action event/request. They see instructions 1312 and details indicative of an action 1370, with buttons 1361 to approve and 1360 to deny it. Note that in multiparty modes, this same screen may appear on two or more different people's phones at once, and approval/denial is based on business consensus policies.

Hitting 1361 "Approve" digitally signs the action shown, and communicates the approval and signature to the provider. Deny 1360 also signs and conveys this signed response. Note that subsequent to a "Deny" action, a user may see a follow-up screen asking why the action was denied. This allows for unexpected actions to be singled out, this mitigating attacks in real time.

DETAILED DESCRIPTION OF THE INVENTION

This present invention prevents or mitigates a vast number of different security attacks waged against a User or a Provider or both, and thus necessarily contains many different aspects, each of which are useful and most are novel over the current state of the art. There is little to no point using any security system which has holes in it, which is why it is very important to broadly withstand attacks and minimize holes. Depending on the desired level of protection that is ultimately required, not all of the aspects disclosed herein are necessary in all implementations, and not all of the elements of each aspect are necessary in all implementations, neither are the foregoing necessarily mandatory for all users at all times. Notwithstanding this, incomplete security is nearly as useless as no security at all, so the preferred implementation of this invention incorporates most or preferably all of the aspects of this invention to achieve the highest possible level of protection.

Assumed Skills

Practitioners skilled in the arts to which this patent pertains will have access to documentation for, and strong knowledge of: modern cryptographic techniques; modern web-browser, scripting, and networking/websocket techniques; mobile operating system technology, features, and protocols; hacking and computer security such as that obtained through completion of a modern accredited Certified Ethical Hacking (CEH) course; programming languages and techniques in mobile, web, and server-side technologies; networking and firewall operations and equipment; modern cloud servers and architecture, and deep server operations understanding in general, as well as server administration; authentication; identity; and good knowledge of the associated technologies and skills that tie all the foregoing together.

Nomenclature

Security industry terminology is very imprecise. Word, phrase, and acronym meanings vary between users, vendors, use cases, systems, and are not even fixed in time. Notwithstanding, and to aide in the general understanding of some terms I use now and herein, I will briefly outline some with examples.

In-the-middle or man-in-the-middle attacks (MitM) take place when a person, machine, or other intermediary gets in-between two communication endpoints, such as a user and the resource they wish to access for example. MitM commonly "cuts" the communication and splices themselves in, and they work to fool each end into believing it's still communicating with the other original end, however, they do not necessarily need to do this; eavesdropping without cutting is an example. A communications channel of course, is any means by which two ends communicate; it may be over a TCP/IP internet connection, or any other of numerous alternatives, like Wi-Fi, Bluetooth, modem, audio, ultrasonic, laser, infrared, NFC, radio, sonar, phone, DSL, fiber, wire, or other, or a mixture of those, and may be between machines or people or both.

Real-time generally means something that takes place with little or no delay, for example, a real-time alert that someone is trying to break in to your account, would typically be communicated to you, and preferably get your attention, within moments of such an attempt taking place.

An alert is really just any message that needs to reach you, not necessarily something to be alarmed of. If something like an alert or message is actionable or two-way, that means there is a way for you to act on it. For example, you might receive an alert that a cash withdrawal request from your account is being requested by an ATM in Ambrosia, and if the alert includes a button labelled "DENY" this affords you actionable means to prevent possible intruders from taking your money (and ideally an "APPROVE" button exists as well, so you can still spend your own money while on holiday in Ambrosia).

Something is "rich" when it is more visually interesting or useful, for example, a photograph of an unfamiliar ATM machine in a foreign country, when received on your cell, is "richer" than the words "ATM in Ambrosia" in plain text. A web page is "rich", while an SMS text message is not, for example.

Out of band, or OOB, is usually a way to communicate something that's independent of a primary communication, or to communicate with someone who is not currently an active party involved in it. It may also not involved a primary communication at all, for example, it may involve a machine which is performing some kind of processing, but is not otherwise communicating at all, but this machine then needs to communicate with a party not otherwise immediately involved in the processing. E.g. if you're sipping a beer on a Hawaiian beach when those Ambrosians make a run on that ATM for your money, the actionable alert you get on your cell is an example of an out-of-band communication that the banking ATM has made to reach you. Another example might be an alert you get later on, when your banks processing machine sends your cell a message asking if you would like a replacement credit card and to cancel the one found in Ambrosia.

When some form of evidence exists to refute a dishonest or incorrect assertion, or to prevent someone or something denying facts, this is the usual meaning of non-repudiation.

Biometrics in general refer to measurements of biological systems or attributes or features, and in security, this usually relates to using those measurements as a differentiator between different people. Elsewhere in this disclosure I detail its vast number of drawbacks.

Cryptographic usually relates to mathematical algorithms for protection, integrity, encryption or encipherment, and may include classes of functions like hashes, symmetric encryption, asymmetric encryption, random and pseudorandom number generation, or even obfuscation or permutation techniques.

Hashes or one-way-functions (e.g. SHA, MD5, etc.) typically take arbitrary input data, and produce an output or digest which is supposed to resist being able to be used to recover the original input data, although dictionary attacks, rainbow tables, brute-force and numerous other cryptanalysis techniques exist to weaken their ability to do this. Salting a hash (adding additional, usually fixed, arbitrary, usually random, data to the original input data, usually a password) can help prevent some forms of dictionary attack, and a highly common misconception is that passwords should be stored in databases using salted hashes, but this is untrue.

Password-based-key-derivation algorithms (PBKDF), e.g. bcrypt, exist as a superior means for protecting passwords when stored in databases, since they are designed to make brute force and dictionary attacks much more difficult and time-consuming for an attacker.

Symmetric cryptography is one where both ends share a single secret key (e.g. IDEA or AES), and asymmetric cryptography is when two different keys are used—a private key which typically encrypts data, but cannot itself easily be used to decrypt it again (excepting dictionary attacks), and its counterpart—a public key which can decrypt data encrypted only by the correct corresponding private key (and not itself be used to create encrypted data that it can itself decrypt). Keys work the other way too typically—data encrypted by a public key can be decrypted by a private one. The relative strengths and speeds of keys can also be different, such as the RSA algorithm for example, where some operations with one key consume vastly more compute power than would the same operation with the other key, and private keys are generally "stronger", making them not suitable for use as public keys, the latter often being made widely available to anyone, as a means for anyone to decrypt/verify data encrypted by a corresponding private key.

Entropy is usually a measure of relative strength of something cryptographic, for example, a longer symmetric key can often mean larger entropy; it is also a measure of the randomness or strength thereof in some systems. More is better.

Significant care is needed with all Cryptography, as there are an enormous number of complex considerations, drawbacks, and "gotchas", with new and obscure ones being found or revealed regularly, and there is a lot of incorrect and possibly deliberate misinformation about cryptography scattered around the internet. It's a fun topic, with far too many vocal armchair enthusiasts drowning out the voices of expert mathematicians on this topic.

An interesting range of cool techniques and new advantages exist from combinations of algorithms, for example, the slowness of asymmetric crypto can be mitigated by using it sparingly, to establish and share a symmetric key which is then used to protect a session. Perfect-Forward-Secrecy is made possible, where future revelation of keys does not aide in decrypting past communication intercepts.

The idea of random in computers is quite complicated, since computers are machines designed specifically to repeat steps in identical ways, thus practically every occurrence of "random" in the art in fact means "pseudorandom", which is usually the art of feeding "difficult to predict" information into a mixing algorithm to attempt to produce a sequence of numbers approaching a real random stream, or sometimes just the output of a simple algorithm that happens to produce random-looking streams, such as the "Lehmer random number generator" for example. The preferred mode of this present invention uses random that is sourced from a dedicated random number generating hardware device, preferably drawn from quantum principals or other source not subject to prediction or interference. Other than the preferred mode, random herein can be any arbitrary means for producing numbers or making selections that are (at least superficially) apparently unpredictable.

Authenticating and Authentication are terms very widely confused. In a general sense, it means allowing someone something by subjecting them to some kind of challenge. (such as "enter your password" for example). It may or may not involve people (e.g.: machines can authenticate too). The term "credentials" is often used in authentication, which is confusing since, as it's plurality suggests, it means more than one thing at once—for example—a username and a password together can be thought of as credentials. This is confusing identity itself, with the means to prove it. In internet terms, the act of "logging in" is usually considered equivalent to "authenticating". Part of the strength of this patents protective inventiveness comes from the dissection of what "Authentication" means, and great care is taken to protect the "means to prove it", and in some cases by going so far as to isolate such means entirely form the identity credential itself. The intent of "Authenticate" throughout this specification will be apparent from the context it's read in, not necessarily identical to the awkward approximate meaning it has in the art.

Mutual is usually two-way, or more accurately, two-ways-at-once, and in the sense of mutual-authentication, it's when both parties prove each other, to one another, at the same time. Some industry vendors abuse this term, claiming that certain things fulfill this definition, when in fact the "at the same time" part is not present. It is not the same thing for one party to prove itself to another, and then for the other party to prove itself in return, there should be a link that joins one to the other. The mutual-authentication introduced by this patent, which is genuine (and on account of using humans and photographs, is "visual" in nature), thus varies from the common, deceptive, use of this term in use by others, and again, the intent and meaning is made clear in my context. The person in front of a machine is not the same thing as the machine itself, thus it's important not just to consider what "mutual" means, but also what it's actually between, and if this isn't a human, how much you trust it, and what threatens that trust.

Virtual or soft or electronic usually refers to a software or data-structure or similar composition, while physical or hard or printed is it's real counterpart.

To start using something, users generally need to enroll, and in security, the act of enrollment is often used to describe how the user avails themselves of the technology, and binding or pairing is how the technology links together it's security or protection with the identity or persona of the user. Again, sometimes machines take the place of users.

Identity itself is an abstract concept, and is personified when users get a persona, for example, a username. An individual may choose to have many personas, and the term "identity" is regularly used in the art, when "persona" is the more correct term. Various ways to use personas exist, allowing access that is identified, or pseudonymous access, or anonymous access, as well as blind and double-blind techniques. Typically an Identity has attributes, which can be accessed through a persona, for example, the persona "user123" might have a "name" attribute of "Harry Potter".

Custom security agents live on user devices, or in user software products like browser or operating systems, to supply security-enforcing or helping facilities, often through the use of cryptography and device hardware access. Agents in general are usually software products that generally assist a user or a machine to accomplish its task with some added benefit, e.g. in the case of security agents, they may help with deployment, integration, duty-separation, or otherwise act for or on behalf of a user or machine to provide their useful facilities.

Headless most commonly refers to a computer with no display, and can include servers where facilities to use it directly or watch it operating are limited or unavailable entirely, for example, a remote cloud server. Installing a new operating system on a headless machine is a particularly difficult task, since every aspect of installation needs to be accurately accounted for in advance, in order to automate it fully, since there is generally no way for a headless machine to stop, ask questions, or get answers. This difficulty makes provision of cloud machines near-impossible to accomplish in a way that is strongly secure for cloud users. A remote boot takes place when a headless machine needs to restart; this introduces additional interesting problems, particularly when the machine wishes to use encryption to protect its files, since there is no screen or keyboard from which to retrieve the key to facilitate decryption.

Multifactor codes of this invention can be communicated automatically to an endpoint (provider, appliance, etc.), upon a trigger, for example, the act of a user tapping a photo.

A drive-by attack in web/internet meaning is when victims are exploited during their use of the internet, for example, a malicious web site might use typo-squatting (registering misspelling or mistypings of popular domains) to lure unlucky visitors, and a zero-day-exploit to infect their machines with malware, or a popular web site with advertising might attract a malicious advertiser who uses the visitor traffic volume to inject malicious content into user pages or browsers or systems. This is sufficiently common that is has its own term: malvertising.

When an alternate or spare token is used to access an account, or provision a replacement token, these are recovery tokens. In the present invention, one mode makes use of printed paper or plastic cards which users keep in a safe place, which they can use to recover access to their account should they lose access to their primary token, which is usually their mobile phone or tablet.

Users are generally the people this invention seeks to protect, although this can include machines in place of people or agents on behalf of people as well, and may mean the software or machine that is in use by the user, rather than actually themselves physically. E.g. A user does not log in to gmail—their computer does. I also use "Users" to help remind that this is not necessarily always an actual person we're talking about.

Servers are usually the machines at the other end, which are talking to a User, and often (but not always) means the thing that a User is authenticating with, and usually refer to ones operated by a Provider. Users may authenticate or use their own machines, which may or may not be present (as opposed to remote), as might they with devices like refrigerators, cars, or any gadgetry, usually with computing power, that might not necessarily be thought of as a "Server". Servers might make use of one or more Appliances (another name of a server, used mostly to help highlight that it's a different machine from the server itself most often, although not always), and one mode of this invention protects one Server by using a second (thus called Appliance). The distinction is not always important in context for understanding, so on occasion the term "Server" is just used, when a Server+Appliance architecture will be understood to be the mode contemplated. I use "Provider" as the general term for the Server or agent thereof that a User communicates with, or the organization or person operating it/them.

If a proposed action (for example, transferring $81M from the Bangladesh central bank's account at the NY Fed, to casinos in the Philippines) is deemed sufficiently important or valuable that more than one person should approve or can deny it, and if (say) that action can be approved by at least 3 people out of a set of 10, then the approval threshold for this action would be 3, and if the action can be denied by at least 2 people out of a set of 15, then the denial threshold is 2.

Operator privileges usually refer to the ability to perform functions that non-operator and/or ordinary users are not permitted to perform.

Backdoors are (usually hidden) ways to reduce or bypass security or cryptography. They are not just restricted to "secret way to get in"

System Overview

Broadly speaking, in one preferred embodiment of present invention, a Provider begins by deciding what resource(s) to protect, then implements the protection, which may include deploying equipment to assist with implementation or operation; next a User enrolls to avail themselves of the new protection, then activates it; and finally the User makes use of the Providers now-protected resources. Later, maintenance, management, and reporting of the protection by the User and/or Provider take place. Throughout the lifecycle, support and billing take place. This invention provides broad protection and numerous features and other improvements for Users themselves, for the equipment of the User, for the communications channel over which the user connects to a Provider through (or vice versa) or connects to other Users through, and for the Provider as well. Each of these broad steps are themselves intricate and detailed, and are explained later herein.

Enrollment

One useful purpose of present invention is improving the security of an end User authentication to computer systems operated by some Provider so that the User can access resources made available by the Provider, so a first step for the User is the enrolment process, whereby at completion, they will be protected by present invention for authentications (at least).

Enrolment involves providing the User with one or more security tokens, and pairing said token(s) with the account of the User at the Provider. After enrolment and pairing, protection is activated, which restricts subsequent authentications for the account only to a User with access to said token(s). This significantly improves authentication security, on account of the tokens being designed with mutual authentication included, and to prevent both access by unauthorized Users and also to prevent access to any Users (authorized or not) when the access originates from an illegitimate source, for example, phishing.

There are situations where a User can benefit from authentication protection not involving a Provider (such as accessing their own PC for example), thus it can be seen that it is possible for the User to also be the Provider at the same time in some situations. All examples and subsection headings in this specification are non-limiting.

Enrolment may be mandatory and automatic, in which event the Provider issues security token(s) to the User after pairing said tokens with the User's account in advance. When the User next accesses protected resources, they will need and use the token(s) to authenticate at that time. For example, a bank (Provider) might give or post token(s) or instructions for obtaining same to customers (Users), alleviating the necessity for the customer to manually enroll and pair themselves. Semi-automatic enrollment is also possible, where tokens are issued, but not paired, in advance, whereupon next access by User a mandatory pairing step requiring the token must be completed.

Enrolment may be mandatory, but not automatic (e.g. manual), in which case, the next (or in the case of new Users, first) time a User authenticates, their authentication operation will be interrupted and the user forced to complete the enrolment process and obtain their token(s) to complete their login. For example, a hosting company (Provider) wishing to prevent their Users from becoming phishing or malware attack victims in future, may elect to activate protection which forces all current and new Users to obtain token(s) the next time they log in.

Enrolment may be optional and automatic, in which case Users are provided with token(s), but they have the option to "activate" protection, or not, as they see fit. Providers make available an option or setting which, when activated, will cause future authentications to require use of a token by the User. For example, hospital patients might be given token(s) or instructions for obtaining them when next they visit, making the distribution process easy, and allowing Users to choose their own level of protection of their medical resources. Providers should choose to promote the use of the additional security, such as by inserting interstitial announcement pages upon user authentications, recommending they activate the protection. Typically, one major disadvantage of strong security systems is they do not get used, usually on account of them being one slow, confusing, inconvenient, unknown about, and/or expensive, thus it is a preferred embodiment of present invention that Users be encouraged to activate protection and informed of the many benefits that come with doing so, including at least stronger security, and faster and easier logins.

Enrolment may be optional and manual, where Providers make available the options to enroll and activate protection, but leave the user to obtain their own token(s). For example, a webmail provider might allow all their Users to choose stronger protection at their leisure. As mentioned before, it is preferred that User's attention is drawn to the benefits of choosing this.

Tokens and Pairing

Token pairing is the process of associating a token with a User's account at a Provider, such that when the user is authenticating with the Provider, knowledge of which token(s) belong to the User allows the Provider to successfully protect the authentication process.

A token of this present invention is a collection of random photographs, associated random codes, encryption keys, encryption salts, authentication Appliance endpoint URIs, serial numbers, pairing-assistance URLs, QR codes, provider name, provider logos, provider contact information for support staff or other needs, notes, policy rules, layout and formatting information, or just some of those things or parts thereof, and a token is optionally encrypted or protected by PIN's, passwords, or biometric-generated keys, or biometrics techniques. A token might be physically printed onto a paper or plastic card, for example, refer FIG. 4, or it might be embedded in a portable computing device, or it might be a computer file or similar arrangement designed to be stored in or used by a portable computing device like for example a smartphone, tablet, custom electronic authenticator, or watch, for example, refer FIG. 1. A token might be an image file or printable document, capable of being printed by a User, or for User(s), to create a physical token, for example, refer Drawing 6. In the case of tokens used in computing devices, one or more of the associated cryptographic keys or other elements in the token may be created by the device, and in the case of private+public asymmetric keys, the latter of them shared with an authentication Appliance or the Provider after creation.

Photographs are used as rapid human-lookup location indicators, and are typically (but not necessarily always) chosen from a larger fixed set of visually different photographs, although they could instead be any kind of images, photo or not, random or not, so long as they are visually distinct for the user. The best mode contemplates random selection, since it helps if attackers are unable to predict the photos on a user's token, thus random or equivalent means to accomplish this can both be used. Random may also be pseudorandom or the output of some other algorithm designed to select a subset of images for a token from either a larger set of images, or to generate the images.

Random codes are associated with photographs so that the bearer of the token can prove they selected the correct photograph. As before, they may not necessarily be literally random. Codes for human use are preferably rendered visually in large unambiguous text on or directly near their associated photo so it's clear which code belongs to what photo. Codes for machine use are preferably large enough to make automated guessing attempts by an attacker infeasible, the best mode contemplated using 128 bits for each. Tokens usable by both machines and users may have more than one code associated with each photo (one for the human, for example, which they type in, and one for machine use, for example the code which is automatically communicated as a result of the human tapping on a matching photo on a soft token).

Uses for encryption keys includes the protection of codes over communication channels, for example, a machine-use random code can be encrypted, to prevent sophisticated man-in-the-middle attackers from stealing it. Keys may be symmetric and shared with the endpoint consuming incoming codes, or asymmetric with the private key in the token and the public key at the endpoint, or both or other combination. In one mode, asymmetric keys are generated by the device of a token, and the public key communicated to the endpoint by the device. Other modes are possible, with public and private keys used by either end, and generated in a token, or externally. Another use for keys is verifying authenticity of incoming token updates and communications, incoming software updates, and encryption and/or signing outgoing token actions, including transactions and user responses to events and app self-checking for anti-malware defenses.

Salts can be used for some operations in place of keys, where it is not necessary to decrypt the content of a communication; a salted hash or PBKDF of a code or password can be verified correct at a different endpoint when it computes a matching result itself (such computation may have been done ahead of time, see next sentence). Codes hashed and salted are used in one mode as an alternative to symmetric encryption; they provide a means to mitigate dangers of mass theft of codes in the event of a server-side break-in.

In the best mode contemplated, authentication Appliance endpoint URIs are included in tokens so the place to where codes and other token communications are communicated is known, and this also puts URIs beyond reach of an attacker to manipulate. For example, a URI in a token for ACME bank, will be for the ACME bank authentication appliance.

Serial numbers are any unique-among-the-set-of-issued-tokens identifier for an individual token. In the best mode contemplated, they are random 12 digit numeric numbers suitable for use in EAN barcodes and for printing on physical tokens for users to read. They are also appended to URLs encoded in QR codes. Also in the best mode contemplated, a server knows which token serial numbers have been issued, and for whom (which provider) they are associated with, so when token serial numbers are encountered, it can be determined which endpoint they should be used on. Serial numbers are used in appliance databases as a key to the records needed to verify incoming communications from tokens. They are also used to help users distinguish between possible many tokens they may be issued. An enrolled token has a user associated with its serial number, which together with the serial number association with a provider makes for a convenient means to automatically work out all parties needed in a variety of situations, for example, when an existing user wants to get a new token into a new cell phone: they need merely to scan the QR code of an existing one using their cell (or type in or otherwise let it acquire the serial number) for sufficient information needed to then be available to make setting up their new phone as fast and easy and automated as possible. Enrolled soft tokens have PUSH codes also associated, which allow an authentication appliance to send messages direct to the user's phone which can cause the token to open up and automatically display for the user the token or action events when needed.

Pairing-assistance URLs are usually web addresses which users can type into a web browser, or which can be opened by other means or software, the address including the serial number or alternate representation of it (usually shortened).

QR codes are used to convey pairing-assistance URLs in convenient machine-readable manor. In the best mode contemplated, Alphanumeric (5.5 bits/character) encoding (i.e. uppercase only) of shortened HTTPS URLs with serial number represented in base 36 (i.e. [0-9A-Z]) is used, with maximal error correction, which results in very high quality non-dense representations with maximal scanning utility for all readers. For metrics and statistic-gathering each pairing URL has a minor difference from all others, including the manually-typed or SMS or Email or other URL, such that relative frequencies of which URL methods have been used by customers can be collected. For example: HTTPS://EXAMPLE.COM/Q/ABCD1234 might be a QR URL, while HTTPS://EXAMPLE.COM/S/ABCD1234 might be the same token serial for an SMS URL, the "Q" and the "S" service as the recordable source difference.

Provider name and Provider logos help customers differentiate between multiple tokens for different providers, contact information helps them easily contact support staff or relevant others if needed, notes provide a means for customers to customize their tokens, such as keeping track of which of their personas belong to each of potentially many tokens they might own.

Policy rules provide means for token software to enforce Provider requirements as disclosed elsewhere, for example, making the use of passwords to encrypt user tokens on phones that do not have lock codes in use may be a sensible policy a provider may wish to enforce. When a policy requires or permits (and it's allowable to not do so), a token is optionally (or required to be) encrypted or protected by PIN numbers, or passwords, or biometric-generated keys, or biometrics techniques, and may further enjoy sensor-assisted protection, such as being blocked from use when not in an appropriate area as determined by GPS or Wi-Fi or altitude etc.

Layout and formatting information assists with the visual rendering of a token for a user.

A physical computing device suitable for storing electronic tokens would typically be a portable battery powered one with a touch screen, preferably with transducers for automatic information exchange. It will have a storage means, preferably protected against theft, for recording token data in, and it's information exchange means is recommended, and preferably supports connection to an appliance such that the appliance can activate the token display at will.

Tokens capable of being physically printed by a User, or for User(s), preferably include attached or associated printing and post-printing instructions, and come in one or more forms readily usable for Users to easily print correctly. Post-printing instructions preferably include guidelines and icons to assist users cutting or folding a printed token to make it more conveniently sized for carriage (e.g. refer FIG. 6).

One purpose of tokens is to provide simple, rapid, and near fool-proof mutual authentication as well as multifactor protection of User accounts at Provider.

One purpose of the random photograph(s) in tokens is mutual authentication. The only other place where the photos are known is the Provider's security Appliance. Mutual authentication thus works as follows: at login, the Provider's security Appliance will cause to be shown to the user one of the random photographs present on the user's token (for example, the User might see the picture come up in their web browser after they type in their username to access protected resources on the Provider web site). To complete a login securely, the User is required to locate the matching photograph on their token, and use it to log in with. In the case of smart tokens (that is to say, tokens that are used in computing devices, as opposed to ones printed out on paper or plastic), the user will select, or tap on, the matching photo, causing the token to provide a random authentication code automatically to the Provider's security Appliance, which triggers the completion of a successful authentication. In the case of non-smart tokens (e.g. printed paper ones) or ones without active connectivity, the user will type in the random code associated with the photograph to complete authentication. This process and its advantages are explained in more detail later. Also explained later is how to defeat man-in-the-middle attacks, such as with a method that causes a wrong photo to be displayed in the event of an attack.

One purpose of the codes and/or keys and/or salts of tokens is multifactor authentication; it is something that the user possesses, which is needed to be used for logins, this being an advantage on account of Criminals not possessing them. The mutual authentication advantage additionally prevents Criminals from stealing them. For example, it is hard for Criminals to steal the User's code that corresponds to their photo of a juicy strawberry, when the Criminal has no idea what photos are on a user's token, let alone that the juicy strawberry photo code is needed. Theft of multifactor codes is one fatal flaw in existing multifactor systems. The use of photographs additionally prevents "tan pharming", that is to say, it prevents Criminals from tricking users into revealing all their secret token codes, because the Criminals don't know what photographs are on the token, plus it's not possible for tan-farm-victims to "type in a photo". Also explained later is how to prevent Criminals or man-in-the-middle attackers from stealing photos.

One purpose of the Appliance endpoint URI is to instruct computing devices where to automatically send authentication codes upon photo taps. This is a significant security improvement, because it prevents attackers from intercepting those codes by manipulating where they get sent to. The main reason phishing works so well to defeat existing multifactor protection is that their lack of protection with respect to where multifactor codes can be supplied to makes the codes trivially easy to steal by anyplace different than the intended original URI.

The principal purpose of the encryption keys and salts is to protect authentication codes sent by computing devices; even though TLS or similar link encryption will normally be used, one advantage of present invention is the facility to protect a user even in the event of in-the-middle attackers nevertheless still being able to access plaintext content of link-encrypted traffic (consider, for example, corporate and school content-inspection firewalls). An additional purpose is transaction non-repudiation.

The principal purpose of serial numbers is token pairing. An additional purpose is helping a user manually select a correct token when required, which is also one purpose of the provider name, provider logos, and notes. It will be appreciated by one skilled in the art that "serial numbers" are not necessarily just numbers, and not necessarily serial in nature either. Any unique marking which can be used to differentiate one item from all the rest will work. The use of "serial number" herein refers to any such marking. In one preferred embodiment of present invention, numbers which are random and thus deliberately non-consecutive are used, since they improve security by making it non-trivial for any user knowing one serial number to guess others. Numbers, as opposed to alphanumerics, are chosen in the preferred embodiment since they can be more easily recognized and understood unambiguously by peoples of many languages, and they can be easily represented in standard barcodes, present invention using QR codes and EAN-13 (UPC-A) barcodes on printed tokens for machine readable representations on account of these having the highest reader support in industry, the best scanning reliability, and supporting sufficient entropy for large user populations.

The principal purposes of pairing-assistance URLs is to facilitate token software deployment to Users in addition to token pairing information. Another purpose it to facilitate correct enrollment and/or pairing operation no matter which QR reading software might be used, including software other than that purpose built for handling tokens. In the preferred embodiment, URLs are constructed which resolve to a website address, and which additionally contain a token serial number code. Token software can decode the URL to extract the serial number when needed, whereas non-token software will resolve the URL to a web address, which upon load can automatically trigger token software provision, or activate existing token software. Existing software activation and/or provision techniques include using Android Intents or Apple Universal Links, or deep-linking, or custom URIs or other App triggers (hereafter collectively "URI") to open the App or the App store install page for the App.

The principal purpose of QR (Quick Response) codes is to conveniently convey pairing-assistance URLs or serial numbers, preferably both at once. In combination with pairing-assistance-URLs, QR codes constructed in accordance with this invention can be read and successfully used by most QR reading software, as well as by Token software itself, maximizing their utility and convenience. One benefit introduced by this invention is the ability for token-app-software on a device with a camera to be able to read pairing-assistance-URLs from printed tokens, thus affording a rapid enrollment process for printed backup tokens to users, whereby they merely need to scan a new token with their existing smart token, for the new token to be provisioned into their correct account, for example, by virtue of the smart token knowing which Provider the scanned token belongs to, and knowing which User is associated already with that Provider.

The policy rules have multiples purposes, including the conveyance of Provider wishes regarding tokens. Providers can for example permit or deny certain user actions on tokens, and in so doing might make those actions mandatory, or optional, or forbidden. Users themselves may be allowed to enforce their own token usage and operation wishes as well, and the policy rules support all these. For example, Providers like banks might make it mandatory that users encrypt their tokens with strong passwords, or might make the use of biometrics mandatory for user devices that support this, or Providers like social networks might make password encryption optional for the user to decide if they wish to turn it on or not, or Providers like blogs or forums might block password encryption on tokens entirely in order to minimize support issues from users who forget those passwords. Other policy items include, but are not limited to, the collection and conveyance of GPS or geolocation or other sensor data during use or otherwise, the collection of non-repudiation-supporting front-facing camera photographs during transaction approvals or at other times, key generation strength specifications, device information collection, device identity collection, prohibition of usage on insecure or jailbroken devices, and in general policy rules allows for storage of arbitrary items which can influence how token software manages tokens and behaves.

Smart-tokens constructed according to present invention are expected to contain additional information or be contained within additional elements like JSON for example, for purposes including network transport and assisting the token software with the use and display of tokens to users, such as layout and formatting information which can be used, for example, to assist the presentation of tokens to users from diverse equipment, like watches, smartphones, tablets, car displays, wearable devices, or others.

Encryption of smart tokens or their protection behind biometrics can help prevent their unauthorized usage, theft, or disclosure in the event of the loss or theft of the containing device or the exfiltration of data therefrom.

Regarding provision of physical tokens to users; they may be sold or given to the Users, or posted or otherwise delivered to them, or Users might obtain or purchase them at shops or post offices etc. Physical tokens might be pre-enrolled for the User, or the user might obtain general-purpose tokens which they later enroll with their account. It is preferable that tokens be protected against theft and copying, such as by providing them in tamper-evident packaging which blocks duplication or observation, or obscuring sensitive portions with scratch-off material, or other methods to ensure the safety of the token data.

Smart-tokens include tokens which are not physical, but are electronic in nature and designed to be used in a computer device like a smartphone, tablet, watch, or dedicated portable security authenticator. Smart-tokens may sometimes be physically provided to Users in the same manner as physical ones, such as when the computing device which contains them is physically transferred as with the physical tokens.

The preferred method for distributing smart-tokens to Users is by transferring the token to a computing device owned or used by the User, for example, their smartphone. Token App Software The preferred mechanism for transfer of a smart-token to a user's device is to present the user during enrolment with instructions to be followed to obtain the smart token, and where necessary, at the same time to obtain any requisite software needed for the token, such as for example an app from an app store for their phone.

The preferred instructions provide the user with one or more options to obtain their token and app. Because many different kinds of Users exist, with many different devices, more than one option is preferred. Ultimately, a preferred goal is to craft a pairing-URL (facilitating Cookies) which the User opens on their smart device, thus, preferred options to give to the user to get this URL include having it sent to them on their device using an SMS message, and/or letting them scan a QR code or similar with their device's camera, and/or showing them the URL so they can manually type it in, and/or using sound and a microphone on the device to transfer the URL, and/or constructing an intent-based or custom URI to convey it to a co-resident device app or associated store, and/or by email to an account of the user on their mobile device, and/or by HTML HREF directly on their mobile device when possible, and/or by direct link to an appropriate app store with the URL specified like a referrer or advertising ID (said linking is possible directly on a mobile device, as well as on a different device, e.g. a PC, which links to a $3^{rd}$ party app store because app stores can automatically install software onto mobile devices without customer needing to use the mobile device itself to do this), and/or other ways to help the User get the URL into their device browser or get the app itself while also providing the app with the URL or data from it. In the event of a user using a smart device on the Provider web site in the first place (for example, as opposed to using something else like a PC or laptop), this can be automatically detected and the URL opened forthwith.

The purpose of the URL is two-fold. The URL takes the User to a web page which is designed to check if their device already contains the software needed to obtain and use tokens. If not, the web page identifies the device and directs the User to the correct place to obtain the requite app or software for their device, preferably using a mechanism such as an advertising ID such that after-install, the app can use the ID to determine the User and Provider that requested it. Note however, that advertising IDs are not often very reliable, a solution for which is included below. It is one advantage of the present invention that the enrolment process for users is vastly improved, thus it can be seen that by directing the user immediately to obtain what is needed, when they need it, without making them search or follow unnecessary instructions, facilitates this advantage. If the device contains already the requisite software the web page instructs said software which token for which Provider the user is requesting. The other purpose of the web page is to record at least temporarily an identifier for the User, for example, by using browser Cookies. After the device obtains the app or software needed for tokens, it can then ask the device's web page to supply the identifier, for example, by invoking the browser directly to a URL on a server design to retrieve or match the Cookie and then to send this information directly back to the app via custom URI schemes or other methods, which reliably allows the software to obtain the smart-token from the Provider or their security appliance without needing to ask the User unnecessary questions. This is an important improvement over the current art. Using these options and techniques, it is easy for a new user to obtain and activate protection in 2 minutes or less, including the time needed to download an app, by following a mere half-dozen or so instruction steps. Existing authenticators using devices like smartphones typically take 17 to 30 minutes of time and effort to enroll, and typically take 56 or more consecutive pages of instructions to complete, thus is can be seen that the present invention is an order of magnitude faster and easier than existing systems.

One alternative to URL token acquisition is the use of existing smart-device software, for example an app on a smartphone, to assist users with enrolment and token download. Many ways exist to facilitate this, such as for example providing within the app a store-like facility from where the user can obtain a token for themselves, or using the app to activate the device camera or microphone or other sensor which is then used to scan or listen or otherwise acquire a token or an identifier therefore (for example, via pairing URL), or by providing for the user on their main computing device (for example, PC or laptop) an input area where they can type in the serial number of a token they own or can acquire through the app, or allowing the user to bump their smart-device on their other computing device, such as a key on its keyboard, and using the device sensors such as its accelerometer to detect the impact and the pair of devices then being able to identify and communicate with each other on account of the association of the timing of those events (the accelerometer impact upon a key of the keyboard being simultaneous, and thus facilitating a third party server to which both devices communicate being able to unambiguously detect which pair of devices are in use, and thus provide a token for the user on the PC to be delivered to the phone of the User, without needing to unnecessarily require the user to manually identify himself to his own phone for this purpose). In a preferred embodiment, the user is required to authenticate their new token by matching a photo on it with one displayed by a server to verify that the correct user and token are associated, and the association and token are working.

As can be seen, numerous improvements above all facilitate the pairing of two devices quickly and easily. The purpose of pairing is to associate a device a user owns, with an account a user has with a Provider, so that the device can be used to obtain tokens for the User, and those tokens associated with the user's account, with as much of those operations being automatic and invisible to the user as possible, to make the process as quick and easy as possible. In the case of physical printed tokens, they can carry serial numbers and/or barcodes and/or QR codes or other markings or use NFC or BLE or other technologies that can be scanned or automatically or manually input into the app on the User's device (or through the use of pairing URLs be supplied to said app from some other source, for example via web page opened by any $3^{rd}$ party QR reader that scanned the QR), and the app can use one or more of these codes to then automatically identify the user, on account of the physical token already belonging to the user or the user already owing an equivalent electronic token in their app. As before, this greatly improves the speed and ease with which users can enroll. Once a User and a Provider are both identified, token app software contacts a token distribution endpoint for the Provider to download a Token for the User from the Provider or their security appliance.

Association

Once the smart device has obtained a token for the User, and the user has authenticated to the Provider, the Provider can then associate the user's account with the token. The Provider can optionally challenge the user by showing one of the photos on the token to the user, and user can verify the token is working by tapping the corresponding photo on their token. This technique can be used to prevent users enrolling fake or wrong tokens, or to prevent Criminals enrolling tokens of other people on their own devices. An example of when the challenge would not be optional, is when a user is enrolling a new smart-token by using their app to scan a QR code of a physical token: the challenge would be needed to ensure that the owner of the physical token has already securely logged in and then approves this new token, which is needed to prevent Criminals enrolling tokens of other Users.

In a preferred embodiment of present invention, tokens which are stored on portable computing devices are put into the equivalent of the device protected storage, which is an area that does not get backed up by the device, and/or is otherwise protected against access by unintended users or software. It is desirable for tokens not to be backed up by device software, because copies of tokens stored in backups represent a security weakness, since they may theoretically become available to Criminals accessing those backups. The present invention supports multiple different tokens in multiple devices being associated with a single user and account simultaneously (as a means of distributed authentication backup), and allowing users to add tokens for new devices and delete them from lost/stolen ones at will, which makes token storage inside device backups unnecessary.

Cookies

It will be appreciated by one skilled in the art that many different means of tagging or temporarily or otherwise identifying a user or web visitor exist, including the use of browser cookies, persistent user data storage, browser fingerprinting, geolocation, HSTS supercookies, cacheid storage, etags, media rights management, certificates, IP address matching, TLS IDs or other resumed session identifiers, and more. In general, any means by which a web server or client device can re-identify a visitor upon a subsequent visit is equivalent to the use of browser cookies, and the term Cookie throughout shall be read to include any such means.

While means like Cookies exist to allow web browsers to re identify visitors, no existing reliable method is known for a non-installed smartphone App to perform a re-identification, after install, of the user who requested the install. Some app store implementations in some versions of some operating systems support a concept of a referrer or advertising ID which can be assigned prior to directing a user to install an App, however, these IDs are not guaranteed, often do not work, and are sometimes delivered too late to the App to be useful. This patent teaches the use of Cookie methods in browsers to re-identify a user, and through an App which uses a browser to communicate this re-identification to the App, extending the utility of Cookie methods from the browser to the App.

App Software Architecture

Because unused security offers no protection, and because users own a wide variety of different mobile devices of different ages made by different manufacturers, it is important that the software which manages authentication and tokens (App) is designed to operate on as wide a variety of these devices as possible. A major drawback of supporting many devices is the increased burden of software maintenance and upgrades this introduces. The preferred way to accomplish wide support with minimal maintenance is to code a native outer shell App specifically for each base platform (for example, Android, Apple iOS, Blackberry, WindowsPhone, etc.) which is designed not to change over time. This native App carries interfaces which abstract native hardware features, like protected storage, cryptography, notifications, networking, sensors and so forth. The component of the App which communicates with the user and servers and device is then built as an inner HTML application with Javascripting which makes use of the abstracted facilities offered by its container. Preferably, this native-outer and html-inner architecture is built such that the html-inner component is identical for all devices, this being made possible on account of the outer container's abstraction. Having one single main code-base for all apps dramatically reduces development and maintenance efforts, and enables additional important security features:

App Updates

The preferred App distribution includes the html-inner portion when obtained from an App store such that it works immediately when installed, however, the native-outer component is coded upon App opening to check for updates that might have been made available by the Publisher for the html-inner portion and when found, to download them, check their validity (such as by ensuring they have been digitally signed only by the App publisher) and then use them. This is a major security advantage because it means the App publisher can immediately address any security concerns discovered in their core app or make other improvements, and then ensure that all users are automatically updated to latest versions when required, such as immediately (in the event of PUSH messaging being used) or upon next use by the user (when the App is next opened). At present, updates for native Apps in stores takes weeks or months to be reviewed and published, and there is no reliable way to ensure users upgrade, plus incremental updates are not possible. Choosing immediate updates of only the lightweight html-inner components or parts thereof is thus a significant improvement in many ways.

App Protection for Tokens

When user devices become part of the security necessary for protecting user activities, it then becomes necessary to apply protection in the user devices to help protect them against Criminals. In the preferred embodiment of present invention, the App software stores one or more tokens for the user, which the App automatically makes available to the user on demand. Software based tokens may include policy instructions allowing or requiring that users protect individual tokens to make them more difficult for Criminals to access, whereby the App includes facilities to collect from the user a PIN number, password, biometric, or the like, and to use this, preferably through a PBKDF function, to encrypt tokens stored within the App. When encrypted tokens are required to be used, the user supplies what's necessary to decrypt them for use at that time. Should user devices be stolen, or software tokens stolen from user devices, this protecting makes it significantly more difficult for Criminals to successfully use tokens. It is also preferable where such facilities exist in devices, to store tokens within protected storage areas and/or to place them behind the protection of device biometrics.

Single Devices

One security advantage of present invention is mutual-authentication implemented through requesting users to match pairs of photos. When a user is computing on a device which is the same device running the security App software, (for example, they're using web browser on a mobile phone), it can be inconvenient because the 2 photos they need to match will be on two different screens (their web browser showing the match photo, and their token App software containing it's pair), and the facility for mobile devices to show two different apps at once is highly uncommon. The present invention overcomes this limitation and disadvantage through the use of in-device app communications (for example, custom URIs, intents, deep-linking, or the like) and interface design: when a user is required to match a pair of photos from different places, but using only one screen, the match photo itself or a secure representation for it is communicated to the secure token App locally, said App being programmed to display for the user the photo it receives so that the user can match it from the plurality of photos on the associated token. Refer drawing 0 for example. Additionally, after match, the App is programmed to yield control back to the original application, such as directly, or by the app itself exiting which returns control back to the former original application. In general, any time co-resident software (Apps, browsers, etc.) need to share a screen with the token security App (e.g. authentications, or verifications), this method of inter-app communication can safely support this otherwise difficult user-interface operation.

Offline Operation

Security reliant on mobile device network function will fail when said function is unavailable, such as when international travelers have no roaming, when mobile data is turned off, or unavailable, when network credits are expired, or any other reason why a user's device may be unable to access a network. This invention overcomes this drawback by allowing a user to manually authenticate and access a resource using their device authenticator with alternate means including manually entering codes associated with requisite photos, sonic data transfer, NFC, Bluetooth, QR, infrared or other non-network-based device facilities. An example of App manual code entry mode is shown in FIG. 2. (refer also FIG. 7 where the code gets typed into).

Deployment

Security only works when it gets used, and different Providers have different requirements; some, like for example smaller or less resourced ones, require "Cloud" provision of security devices, which do not require the provider to operate their own security servers, while others require on-premises security, for example large or mission-critical Providers who may be unwilling or not permitted to use external or $3^{rd}$ party security services, and thus require a solution like a stand-alone appliance.

Appliance

While it is possible to avoid both clouds and appliances by running the extra security directly on a Provider server, this is not preferred, because any break-in to the Provider server may then have the opportunity to compromise the extra security as well. It is, however, possible, and may sometimes be the only option. "Good" security is preferable to "Low" or "No" security when it's not possible to have "Best" security. The term "Appliance" herein refers to a machine operated by a Provider or someone else, either in-house or elsewhere, and includes machines that may be offering other services like those of the Provider itself but additionally serving the security functions that an otherwise independent appliance of this invention would offer.

To ensure protection can be used, no matter what kind of Provider needs protecting, one aspect of the present invention includes the use of a security appliance which is designed to operate either as one or more on-premise dedicated server(s), or can be operated on the public internet for the benefit of securing multiple unrelated Providers and their Users. This design is accomplished by using a security-hardened operating system like Linux running software which is controlled by one or more configuration files, whereby every sensitive or confidential aspect of the server configuration and all custom parameters, such as keys, certificates, salts, domain names, IP addresses and so on are defined in the configuration as variables. It can be seen that so long as the configuration contains all secrets and custom variables, it is then possible to distribute complete copies of the server to many different Providers, each with their own configuration files, in a way that does not reduce the security of each of them. For example, even though Provider-A can obtain and examine, reverse-engineer, hack, or otherwise inspect an appliance, this does not reduce Provider-B's security because Provider-A never has access to Provider-B's configuration files (which may in some cases not literally be files, but simply entries in a database or the like).

Token Minting

Vendors of security appliances may not be permitted by security appliance operators from having contact with appliances, and appliances may also be prohibited by customers from contacting vendors, since this provides customers with an added level of protection against vendors who are, or who may in future become, untrustworthy. To ensure that appliance vendors are still able to meter appliance usage (for example: for billing purposes), the present invention introduces the concept of a token mint. This is an independent system which generates token files and optionally digitally signs them, said files then being deliverable to appliance customers as and when needed, by any means customers may accept. For example—a vendor might sell a 100-user system to a customer, by providing an appliance with 100 tokens installed upon it. When the customer has used all the tokens, they can purchase more from the vendor, who can bill-for and mint an appropriate additional number, and deliver them for installation to the appliance, such as on a DVD media for example. Since tokens become useable by customers for authentication, it is important that the token mint be carefully protected itself.

A mint in the best mode of this invention is a computer that has no networking connection at all. It contains an independent hardware random number generator and large collection of stock image photography files. It generates tokens by randomly selecting images, assigning random codes to them, assigning or generating serial numbers for them, and assembling this along with other token elements as before disclosed into deliverable files for consumption by token apps, or for printing tokens from. Files are manually retrieved from the mint when needed, or alternatively, a data-diode is established for delivering tokens over a network to appliances.

A data diode of this present invention facilitates one-way communication from the mint, by using only the outgoing half of a serial communication channel of some kind (e.g. RS232 or optical diode emitter and photodiode receiver pair). The main object of the one-way is to protect the mint against incoming attacks.

Server-Side Protection

One aspect of the present invention gives Providers protection against many effects of their own servers being hacked into, one method of affording this protection is by the Appliance being its own separate server. Hacking into a Provider server does not give an attacker access to the separate Appliance. It can be seen therefore, that it is the duty of the Appliance and its deployment process to protect itself in the environment it becomes deployed into, against vulnerabilities that might be present prior to or during its deployment. For example, the Provider may wish to deploy the Appliance into a virtual environment, thus giving the virtual host potential access to the Appliance, and risking Appliance compromise should that host be hacked. Or another example, a Provider may wish to deploy the Appliance onto an existing server, real or virtual, upon which an operating system has already been installed, putting the Appliance at future risk of any mistakes or vulnerabilities introduced or present in that environment before it gets installed. Popular nowadays, are containers, pre-packaged cloud machines, customized virtual instances, and markets for obtaining Appliances, and there are an increasing variety of different cloud providers offering pre-built machines running on their infrastructure. In all these cases, one or more possibly untrusted people have been involved in preparing those things for eventual use by their customers, and they frequently contain vulnerabilities, and they usually contain services or "back doors" which allow the cloud operator or their host infrastructure to access or compromise the Appliance, such as for maintenance, monitoring, and administration. Still other vulnerabilities might exist from other sources as well, such as compromised operating system software, pseudo-random number generation (PRNG) routines, or vulnerabilities which may or may not yet be known about or discovered. These all represent security risks.

The present invention overcomes these risks by first erasing any environment it finds itself or it's installer operating in, and performing its own fresh re-installation from a digitally-signed reputable source of its own security-hardened operating environment. The steps involved are as follows First, a Provider electing to deploy an Appliance prepares their infrastructure, then supplies to the Appliance vendor one or more configuration files or the variables required in them, and the vendor then supplies to the Provider the installation "kickstart" instructions and/or media and optionally means for Provider to augment the installer with sensitive variables that not even the vendor should know, like root passwords for example.

Providers who wish to deploy by using an original vendor operating-system installation disk (for example: a RedHat® DVD or .iso file), may substitute vendor installation media with mere instructions, like these for example: "Boot your O/S install disk, at the boot prompt press the <TAB> key, then type in following and press <ENTER>: ks=http://1.1.1.1/pid.cfg ip=2.2.2.2 gateway=3.3.3.3 netmask=4.4.4.4". The "ks=" line instructs the O/S installer to retrieve the automated-installation instructions from the server designated "1.1.1.1" and supplies everything necessary for it to establish a network and carry out those instructions. The instructions in the file "pid.cfg" will be constructed by the vendor to contain or obtain the Provider custom variables needed for the Appliance to operate. For example, the instructions might be a RedHat® or compatible headless Anaconda-Kickstart script which obtains the operating system files, partitions the machine storage, installs the O/S, and provisions the Appliance software and starts the Appliance.

Not all new servers are capable of receiving keyboard input, nor are all server operators happy to need to type long startup lines on keyboards, so alternative installation methods are made available. Bootable server media, like DVD rom disks or .ISO files, USB sticks or flash drives, CDs or floppy disks, or other devices, and network boot or PXE or other server startup methods are all capable of loading a customized operating system installation process, where the vendor-supplied configuration files or Provider variables are included or made accessible to the process, such that a Provider merely needs to boot this way, and the Appliance can automatically install similar to how the keyboard methods described earlier herein proceeds. Of particular note, very small installation media exists sometimes called "netboot" which contain a bootable loader with little more than the capacity to start up a network on the server machine, which it can then use from that point on to obtain the O/S and other files from. For example, the netboot image for the CentOS® operating system is a mere 44 megabytes in size.

Not all servers are capable of arbitrary booting, such as for example cloud instances that might be made available to the Provider already-running, with no suitable host access for booting new installations. These situations are catered for as follows: a small installation program and an embedded or accompanying netboot image (vender-customized for Provider as described earlier) are transferred onto the running server. In general, it is understood that "transferred onto" or the like, and "made available to" or the like are interchangeable concepts. The small installation program makes adjustments to the existing storage (e.g.: hard disk partition layout and using "dd" to prepare a partition) to instruct the server to execute the netboot image at next reboot, and then the server is rebooted. Deployment proceeds thereafter automatically, the netboot image programmed to erase the existing storage and install the Appliance. One easy way to do this is to select or require the use of a "Linux" operating system on the cloud server. These machines usually require a small disk partition named "/boot" which contains the kernel and driver files needed to start the server on reboot. They also often contain separate partitions of the type "swap" which are used for O/S memory management. In linux, it is possible to use the "fdisk" or similar commands on a mounted file system to change the partition number that gets booted, and it is also possible to use other utilities, e.g. "dd", that read and write physical disk sectors, allowing the installation script to adjust the start and/or end of existing partitions, and/or change the one which boots. In the case of machines with a "swap" partition, the O/S is first instructed to disable swapping, the netboot image is then transferred, for example using the "dd" command, into the swap partition (it will easily fit, since netboot is always very small), and the operating systems boot loader, for example "grub" is modified to boot the netboot partition instead of the former boot partition. In this way, we use the existing operating systems own booting mechanism to commence the netboot installation which then proceeds to erase the server and deploy the Appliance. An example modified boot entry in the /boot/grub/grub.conf file might look like this: title Security Appliance Netinstall rootnoverify (hd0,2)

makeactive chainloader+1 this works when the original boot partition was number 1 (which would formerly have been the grub entry "(hd0,1)"), and the swap partition was the second "(hd0.2)"; thus it can be seen that when the server is rebooted, the netboot image transferred via "dd" to the swap partition will be booted.

In the case where no swap partition exists, the existing /boot or any other existing partition can be partially overwritten. This is done by the installation script choosing an unused small area of an existing partition, to contain the netboot image, then creating a new partition entry in the disk master-boot-record (MBR) which overlaps the existing /boot partition, then as before transferring the netboot image into this overlapping partition (e.g.: "dd"). This can be made easier by rebooting the machine after the MBR adjustment so that the existing operating system takes care of positioning the netboot image into the correct disk sectors for the newly created overlapping partition. The grub adjustment is made similar to the swap method, then upon reboot, the Appliance auto-installs itself as before. One way to find unused portions of existing partitions is to create a file on them containing known data, then to use direct disk read tools, e.g. "dd", to search for the known content; when found, this area of disk will be safe to use for overwriting a netboot image into. It is worth noting that disk partition entries which point to the inside of other disk partitions, while logically seeming a ridiculous concept, nevertheless work well when used as just described.

It is additionally advantageous to distribute Appliances as self-installing scripts since this ensures that at any time a new Appliance is to be provisioned, it will always self-obtain the most recent up-to-date version available. In other words, it will not be a "stale" or out-of-date system, and so will be greatly more secure than one which is old, on account of the prevalence of Criminals who write code to seek out and exploit known vulnerabilities in legacy products. Eliminating the opportunity for old Appliance versions to be newly created thus vastly improves security.

Many cloud providers have stores or other mechanisms whereby their customers can obtain and start pre-built images. Over time, images frequently need updating as new vulnerabilities are found and fixed, and there are already a vast number of different cloud providers, with more frequently appearing. The task of trying to keep Appliances up-to-date in all these different stores is daunting, but can be eliminated by using the self-installing script method. To do this, a cloud server is provisioned, then prepared using the swap "dd" or /boot "dd" netboot re-install method or similar as described before, but instead of the server being rebooted, it is instead shut down or snapshotted, and it is this image that is made available in the store or equivalent. When a Provider elects to deploy such an instance, it will immediately erase itself when started, and self-install an up-to-date version of the Appliance. Provision can be made either in the Appliance setup, or on resources it is programmed to contact, by the vendor in consultation with the Provider to ensure the Appliance receives the correct configuration files; most cloud providers supply a means to get unique variables into their Appliances at first boot, which is an example of one way to automate this.

One way a virtual guest server (e.g. an Appliance) upon a cloud host machine can protect itself against attacks waged by the cloud host or Criminals broken into it, is to use encryption. Similarly, any server can also use encryption to protect data on its own storage devices by using disk encryption. This can present a difficulty for situations where a server may need to be restarted, since the key to decrypt the data will be needed, and servers are usually unattended machines. Where it is desirable for the decryption key to be provided to the server upon reboot, in a manner that securely prevents the key theft by an adversary, and in a manner that is also convenient, techniques disclosed later herein can be used for that purpose. In other words, the decryption of Appliance-A can be secured through the use of Appliance-B, where an operator or administrator for Appliance-A is a User of Appliance-B. As described earlier, the linux netboot process is very small, and permits a machine with no yet-booted operating system the opportunity to use the internet to request and obtain data. Thus is can be seen that vastly improved startup security is possible as follows: The server "A" with encrypted storage boots a custom netboot image. The custom image contacts a second server "B" to obtain the requisite decryption key. The "B" server makes use of its existing out-of-band facilities to contact the "A" servers' administrator via their mobile device to inform of the rebooting event (for example: their smartphone beeps, and shows them on its screen that the Appliance is restarting), and request the key, or release of it. The operator uses their mobile device to approve the reboot and/or supply the key (for example, by tapping an appropriate response on the phone), which enabled the "B" server to supply the key to the "A" server to accomplish the reboot action. The key might come from the operator, or from an app in his smartphone, or from Appliance-B itself. Importantly, the key will not be available to Criminals automatically, since key release is now dependent on the human operator approval. In this way, Providers can use Appliance operators who do not need to be present in datacenters, or have access to computers, but still enjoy full-disk-encryption protection without the risk of extended downtimes on reboots. The security mechanisms described herein are also suitable for protecting themselves and/or one-another to further improve security.
Two-Person Concept (Sometimes Known as Two-Man Rule)

The same mechanism can be extended to two-or-more operators in situations where Providers may wish to protect encryption keys by using N different operators from a pool of N+M approved operators. For example, key provision may require any 2 operators out of 3 available ones to approve it.

The netboot image, for example stored in pid.cfg, typically contains an edited syslinux.cfg file with boot options like:
label linux
menu label ^Security Appliance netinstall
menu default
kernel vmlinuz
append initrd=initrd.img ip=2.2.2.2 netmask=4.4.4.4 gateway=3.3.3.3 nameserver=8.8.8.8 hostname=HOST ks=ks=http://1.1.1.1/pid.cfg repo=REPO ksdevice=eth0 root=live:INSTALLING It is also possible to individually protect services that might be running on Appliances, using the security of other Appliances to do so. For example, for situations where Secure-Shell (SSH) access to an Appliance is required, the use of SSH can be protected by the security on either the Appliance itself, or better, a different Appliance. For example, when an operator connects to SSH on Appliance-A, access is not granted until Appliance-B contacts one (or more in the case of Two-Person Concept) operator(s) supplying details of the attempted access, and the operator(s) verify and approve the access. The secure and reliable means to make contact and perform approval (with auditing and non-repudiation too) is described later herein.

Owing to the fact that Appliances are used for security, it is advantageous to provide for the management of the Appliance such that it is not trusted to any one person, similar to how we see the launch of nuclear missiles in movies requires 2 operators to concur. This is accomplished by the Appliance supporting the same concept as follows: A non-privileged Appliance user is provisioned, with no right other than to permit a second user to have authority. A second user is provisioned with "root" privileges, but with no authority to use them. Security contexts, policies, and users are established to enforce these rights. An example for the SELinux protection system to enforce these rights is:
semanage user -a -R "nsysadm_r system_r" unprivoperator_u
semanage user -a -R nroot_r nroot_u
semanage user -a -R nuser_r nuser_u
semanage login -m -s nuser_u -r s0_default_
semanage login -m -s nroot_u -r s0 root
semanage login -a -s unprivoperator_u -r s0 unprivoperator
semodule -r oddjob
setsebool -P ssh_sysadm_login=1
setsebool -P allow_nuser_exec_content=0
setsebool -P allow_nroot_exec_content=0
cat>>/etc/selinux/targeted/contexts/users/
    unprivoperator_u<<EOF
system_r:crond_t:s0 unconfined_r:unconfined_t:s0 nsysadm_r:nsysadm_t:s0
staff_r:staff_t:s0 user_r:user_t:s0
system_r:local_login_t:s0    unconfined_r:unconfined_t:s0 nsysadm_r:nsysadm_t:s0
staff_r:staff_t:s0 user_r:user_t:s0

Thus we protect a server against unwanted actions perpetrated by an individual operator, on account of privileged actions requiring both operators to concur to allow. This concept can be extended to larger numbers of operators and more complex rules by adding additional privileged (e.g. root) and non-privileged (e.g. user) operators to the system and granting an appropriate matrix of rights to allow or use privileged commands (for example, two root users might be permitted, either one requiring approval by any two non-root operators from a pool of five).

Appliance Updates

New vulnerabilities in complex systems are regularly found, and Appliances wishing to remain secure against attackers exploiting these need to be updated to remove them. Most modern physical devices do not have automatic updating included, and also usually have no updates provided for them, not least because even if some were made, too few users would know how to perform the manual update required. Automatic self-updating is therefore desirable to include within the Appliance's own security-hardened environment, to remove the burden from operators to manually perform timely updates, and thus remove vulnerabilities before they become exploited. An Appliance of the preferred implementation of this invention obtains its updates from a predetermined source that makes only secure, tested, and verified updates available to the Appliance for use. For the sake of removing potential security single-point-of-failures from a large number of appliances, it is preferable that multiple different predetermined sources are used for the updates provision, and that update sources are managed by independent competent professionals and proposed updates themselves are tested also by multiple independent competent security professionals.

Operating System Cryptography Protection

Most security relies heavily on quality sources of random numbers; security such as symmetric session keys, negotiation secrets, starting points for prime number search or other asymmetric key material purposes, and so on. It is thus important to protect the quality and randomness of any RNG or PRNG used by an Appliance. One infamously useful method of compromising security systems is to replace a PRNG with a deterministic algorithm conceived by Criminals, because by knowing or being able to re-generate approximate copies of random numbers used by a target system, a Criminal is thus empowered to break all cryptography used by it. Another method of backdooring cryptography is to use "seeds" to a PRNG. These have the effect of causing a stream of random numbers to be used, which can later be perfectly reproduced by the Criminal who knows or can find the seed. The preferred embodiment of this invention includes one or more additional random number sources, preferably including random that is generated by dedicated hardware devices from techniques that are designed to be non-repeatable. The preferred method for using these additional random sources is not to replace any existing random, but instead, to XOR the additional random into the existing stream. XOR is a bitwise computing primitive which when used on a pair of random numbers will produce a third usually different random number, however, it will be appreciated by one skilled in the art that XOR may be replaced by any alternative with properties supporting the intent of the combination, which is to combine in a "lossy" way random streams in order to produce a new stream which is protected against vulnerabilities in at least any one of its sub components, and the term XOR herein shall be read to include any method for combining two numbers that results in a new number insufficient to recover both original numbers for all possible pairs of two numbers. The benefit of combining all independent random sources into one random stream using XOR or equivalent, is that if any one or more of those sources is a compromised one, the resulting random stream will still be secure so long as no single entity is able to utilizes their compromises over all random sources. Or in other words, combining random streams removes the opportunity for individually compromised streams to cause harm, thus reducing the risk of choosing any one random stream as opposed to using them all at once. An example for how to achieve this protection is to install a commercial hardware random number generator into a physical Appliance, and to adjust and modify the operating system and cryptography code such that the component supplying the random source numbers is modified to include via XOR or equivalent the additional random source, and calls requesting random numbers starting from provided seed numbers are adjusted to ignore such requests.

Integration

The preferred architecture of this present invention includes a security Appliance (e.g. a $3^{rd}$ party security service, or an in-house server, or possibly even software operated on a Provider server). Integration involves the Provider making adjustments to use the security provided by the Appliance. There are several different ways to do this.

For situations where the Provider is unable to make any adjustments to the software or systems requiring protection, they are disconnected from their existing network, and a reverse-proxy appliance inserted between. The proxy takes care of using the Appliance to enforce security, while the Provider software is protected without change on account of it no longer being accessible as before to Criminals (it's behind the proxy now). From this point, protection is Integrated with the proxy, rather than the Provider software. A reverse-proxy is a web server which end Users connect to, and it in turn makes a connection on behalf of the User to the original resource (e.g. the Provider's legacy web software). There are many situations where Provider legacy software and systems are difficult to secure, some examples include the regular discovery of flaws in SSL/TLS web encryption, flaws in server software, cross-site-scripting discoveries, and slow-to-evolve legacy software providers who fail to regularly improve their products, or fail to support desirable product features like security and APIs etc., or fail to keep up with technology, such as failing to work properly on mobile devices or failing to function on modern secure operating systems. These situations can make it difficult for Providers to stay safe, because regular updates to patch flaws and add features are either hard to do, or not possible without damaging their legacy system functionality. Reverse proxy appliances shield legacy systems from harm by taking the front line position to the internet. The preferred embodiment of present invention when protecting systems which have sub-optimal existing security and feature support and/or cannot easily be modified to support additional security, is to insert a reverse-proxy system, built according to present invention, in-between it and the Users, where the proxy presents "A+" TLS security support to all customers (for example, an A+ result test from a service such as ssllabs) preferably including perfect-forward-secrecy (PFS) protection, as well as adding additional authentication protection where possible, as well as adding action signing where possible, as well as supporting additional protection like scanning for or preventing incoming user traffic for signs of cross-site-scripting traffic or sql-injection commands and/or scanning for or preventing unexpected outgoing traffic like file or database exfiltration, and enforcing form field input sanity like for example forbidding non-numeric data in number entries, or preventing shell-escape or HTML tokens in text entries or in general any inappropriate content, and where possible, for the proxy itself to support translation operations between modern web standards like APIs in JSON or AJAX or websocket push etc. and the legacy system it protects. This combination represent a single purchase that a Provider can make, which can be installed to immediately fix a wide range of security and usability problems on any existing site with minimal time or effort to deploy. Remember, security that is not used is pointless, so it is important to make it as fast and easy as possible for a Provider to take advantage of new security.

For situations where the Provider's resources are of an "off the shelf" nature, or contain facilities to deploy third party add-ons, plugins, or features, the additional security made available by the Appliances(s) is built in a suitable package to be deployed according to the products' requirements. Examples of architectures supporting such deployments include cPanel®, Wordpress®, Joomla®, and AtMail®, to name just a few of many thousands. In all of these situations, the Provider merely has to follow their software instructions to install the add-on, to get the benefits of the new security. The work of integrating protection into the "off the shelf" system is performed by the plugin/add-on/etc. package built for it.

In situations where bespoke software is in use by the Provider, or where no existing plugin is available, a new plugin is built or an Integration performed, for example using API's and/or SDK's, as follows: existing authentication routines are adjusted to send hashed user IDs to an Appliance, which checks if users have protecting enabled, and if so, returns content for display to the user (e.g. the random image they need to find and tap), or if not, allows a normal login. Upon a tap, the check also allows a login. A blank page is made for administration, which when loaded, grabs and displays the Appliance content which lets users turn protection on and off, add and remote tokens, see reports, and so forth. Actions needing protection or signing are identified, and wrapped in a few lines of code to send them to users (via the Appliance) for signing, and check signatures before processing.

Architecture

In one embodiment of present invention, there exists a Provider wishing to protect resources, a User wishing to use resources, and a security Appliance to assist with said protection. Users are issued tokens which typically include photographs for manual mutual authentication by the User, but may in other embodiments be of an electronic nature and use cryptography, audio, proximity, near field, radio, inductance, video, or other sensors to automatically carry out authentication. The users with their token interacts with the Provider and the Appliance to enjoy the new security afforded by it. Thus, users must necessarily obtain tokens before they can use them, and usually need facilities to manage tokens after receiving them as well.

One new beneficial aspect of the present invention is the capacity to help protect a Provider server even when it gets attacked or broken into by a Criminal, as well as not compromise a Provider server should an Appliance be attacked or broken into. Another aspect is protecting the privacy of Users. This is accomplished in part by preventing the Appliance from storing or using User data that is unnecessary, or that can be data-matched. For example, in most situations, a User accessing a Provider resource will be assigned a unique ID by the provider, for example, a username or a serial number or email address or the like. In order for an Appliance to differentiate between users, and to understand whether or not a user already has tokens, and which ones, it needs the Provider to communicate a unique identifier to the Appliance. Thus, to protect privacy and support break-in protection, the Provider uses a salted hash or password-based-key-derivation-function (PBKDF) or other means to convert a user's real unique User ID into an obscured unique ID, whereby it is generally infeasible for the Appliance or possible Criminals who attack it to convert back from the obscured version to the original one. It is the obscured ID which the Provider communicates to the Appliance to permit it to carry out its functions for the User. This additionally protects privacy in the event that one Appliance is used by many providers, because a same User on both will thus not have a same ID in the Appliance. Similarly, in an event where Provider or Appliance databases are stolen by Criminals, the obscured IDs prevent sensitive information leakage, as well as data matching or user correlations or other privacy-damaging exploits.

As mentioned earlier, security is useless if not used. Providers exist without the capacity to assist Users with obtaining or managing their tokens, so it is important that the secure distribution and management of tokens be possible in a self-service way. Providers also exist that lack will, manpower, justification, or face other obstacles when it comes to putting in the effort to make improved security available to their users, so it is important that the work required to do this is minimized, and/or made as easy as possible, and/or financially rewarding. Some providers may wish to bill Users for extra security, so it may be important to support billing in different forms, and make it easily available to use. In general, the improved security needs to be easy for the Provider to add, easy to use by both User and Provider, and require little or no support, for example, by being fully self-service for Users to take up. The present invention offers all these new benefits. Many different integrations exist, and can be done in any order, one preferred embodiment supports this as follows:

Provider to Appliance Session Establishment.

One preferred embodiment of present invention allows for Appliances to support multiple Providers' sites and multiple Providers, thus is it necessary for an individual Provider site to identify and authenticate itself with an Appliances it wishes to be protected by. It will be appreciated by one skilled in the art that Appliances are suitable for protection of resources other than just web sites—like for example desktop applications, mobile apps, TVs, embedded devices, server services, and more. The use of the word "site" herein is not intended to restrict the invention scope to just web sites, but is to include all other suitable resources (e.g. the forgoing) too. To facilitate communication between a Provider and an Appliance and keep the communication secure even in the presence of in-the-middle attacks between the two, even including attacks using stolen CA or other SSL certificates, Providers are assigned a private key, and Appliances generate a public key for communication protection. Messages between devices are encrypted to the peer public keys, and signed by the private key, to enforce both privacy and integrity. Additionally, it is desirable that communications resist replay attacks and have capacity to prevent abuse or other attacks, thus inter-device communication messages additionally contain timestamps and/or sequence numbers, and in the case where communication is taking place on account of a User, where possible, User metadata useful for anti-fraud and anti-attack resistance is also communicated; for example, a user's IP address, which may be useful to determine geolocation or correlate abuse patterns. Appliances wishing to additionally resist attack from fraudulent locations are programmed to accept Provider communications only from addresses known to be legitimate for the Provider; for example, the known static IP address of a Provider web server is the only data source from which an Appliance will accept messages from for that Provider and site combination. Thus, putting this all together, the Provider constructs a signed and encrypted request message that contains an obscured User ID with time and/or sequence numbers and user metadata which can be communicated, for example using an API call, to an Appliance, and the Appliance will respond to the Provider with a session code. This session code uniquely identifies an individual User's session with a Provider, and is suitable for disclosure to the User (for example, their browser or other user agent) such that the User can present this to an Appliance so it can process User events as needed. In general, any time a Provider needs to communicate with an Appliance, the method of using encrypted, signed, replay-protected, and metadata-enhanced packets are used, additionally including any other parameters as needed for the specific communication in question.

Management Interface

User self-service necessitates a web page or other interactive means offering facilities to obtain new tokens, delete old or lost tokens, enroll new smart devices, view usage reports, and activate or deactivate protection. It is unreasonable to expect a Provider to implement them all manually. This is solved by programming the Appliance to provide all these facilities along with the web user interface for them, and making them available to the Provider system for use "in line". To implement the self-service management functions, a Provider will make available a "blank" web page, for example, within a "settings" or similar area of their web site usually in or near an existing "change password" feature that they will usually already have, and the "blank" portion of this web page is then populated by the Provider web site as follows: when the User accesses the management page, the Provider web server, or, the User web browser, obtains the web content necessary for management from the Appliance, this content then replacing the "blank" section of the page, or filling a "blank" template thereon, which causes the management interface to be available to the User. The provider additionally makes available a means for the user to access this page, such as by adding a menu item for it into their site navigation.

Template Protection

It will be appreciated by one familiar with cross site and injection attack methods, that provision of content by an Appliance for use in a Provider site presents an opportunity for an Appliance compromised by criminals to potentially cause harm to Provider Users. In preferred embodiments, this invention overcomes this threat through the use of templates as follows. Provider resources, for example web pages, which are made available to users, but which require Appliance content within them, are made available through templates stored at the Provider (and hence out-of-reach to potential Criminals in control of an Appliance), and content from the Appliance which fills those templates is subject to strict Provider-enforced range checking and sanitization before inclusion in the template. For example, a template might exist including a scannable QR code image to help users enroll new devices, where the image is specified as follows: <img src='$qr'> whereby the URL for the QR image resource is provided in the variable $qr by the Appliance. It can be seen that a compromised Appliance might return the following $qr content (not including the " " delimiters): "https://example.com/image.png'><script src='https://attacker.com/malicious.js" which if outputted would potentially pose a risk to the user. The provider eliminates this risk by processing the $qr variable returned, before outputting to the template, with a command like the Perl code: $qr=~tr/0-9a-zA-ZV:_.-//csd; and truncating incoming data to a safe and reasonable length, which neutralizes attack opportunities by only permitting the output of safe characters and preventing possible processing overflows.

Mutual Authentication

The present invention resists phishing, spoofing, and related imposter attacks through the use of "fool-proof" visual mutual authentication, whereby the "fool-proof" aspect, which is a significant inventive step over legacy techniques, consists of forcefully requiring the user to visually verify the authenticity of the resource, via the means of having the User match a pair of same-looking photos. For example, after a user has identified themselves to the Provider, the Appliance helps the Provider display a random photo to the User, and at the same time, the Appliance instructs (e.g. via PUSH) a User's electronic token (if they have one) to also display to the user (usually on a different device or a different screen on the same device) one or more (usually more) random photographs. The user finds the photo on their token which matches the photo shown by the Provider, and taps on it to authenticate. To make this work, the Provider takes the user's ID and as described earlier obtains a session code from the Appliance. The Provider then includes this session code within the resource shown to the user after they identify, along with supporting code from either a template or the Appliance itself or both, which together trigger the display of the random photo. This code understands to wait for either input from the user (for example, them typing in an identifier code for the photo shown), or a message from the Appliance indicating that the user correctly tapped on the matching photo, and upon completing of either of these events, permits the User authentication process to automatically proceed. The Provider, upon receiving notice from the code of the completion of a mutual-authentication event, makes a call to the Appliance to verify the event correctness, and when verified, the Provider grants the User access to the resource. The point of matching the photos of course, is that only the real Providers' Appliance knows what photos exist on a User's token, imposter sites do not, thus Users are blocked from authenticating accidentally (or otherwise) to an imposter site.

Making security fast and easy is one preferred embodiment of present invention. The manual act of matching a pair of same-looking photos is one that humans find especially easy, and the action of tapping on the matching photo is also very easy. To assist the user in enjoying this speed and ease to the fullest, the present invention uses multiple and different techniques to automatically prepare the user's token for them to carry out the match, and to prepare the Provider's resource to automatically proceed when the User makes the tap. The mechanism to accomplish this is described later herein. A system built to this present inventions specification allows for a User to authenticate to a Resource in as little as one single tap, taking merely a couple of seconds, while affording them security far in advance of anything else known in the current state of the art.

In situations where an alternative to a physical tap selection action is desired, like for example when no touch transducer is available or a user is unable for any reason to perform a tap, alternative selection interfaces are made available. This can be the use of a mouse to indicate the correct photo with a cursor and a button to click to signify selection, or the use of a visual positioning system to find the correct photo and a pause, eye-track, blink, muscle movement (e.g. dilator naris) or other indication once found to select it, for example, a virtual-reality or augmented-reality display apparatus can highlight the photo in the center of the user's vision, and the user can pause while highlighted to indicate their selection.

Cross Site Scripting (XSS) Protection.

This invention makes it fast and easy for a Provider to integrate protection with their resources; one means of doing this is by the Appliance supplying to the Provider content that is suitable for display to the User from the Provider web site. This invention also prevents the chance for a break-in at the Appliance to compromise the Provider resource. In order to prevent Appliance content offering an intruder on an Appliance opportunity to compromise the Provider, the Appliance vendor makes available to the Provider templates which are installed on the provider resource, and are filled in with data supplied by the Appliance, and the vendor also makes available a filter for accepting incoming data from the Appliance which blocks the reception of unsafe content. Template fields which expect, for example, numbers, will cause the filter to block incoming data that has anything other than numeric content, similarly, hexadecimal codes accept only 0-9 and A-F input, and so on. Of particular importance, content capable of exploiting a Provider or template, for example in the case of HTML any content containing "<" or ">" or quotes or other escape codes, is prevented from being sent to the User. This present invention takes the approach of "accept appropriate", as opposed to the alternative approach of "reject dangerous", on account of it being safer to allow only what is known to be needed and safe, than it is to hope that programmer understanding of everything unknown and unsafe is complete. For example, in the case of HTML and an alphanumeric template field, rather than blocking "<" and ">" etc. characters, instead, only "A" through "Z", "a" through "z", and "0" through "9" are accepted, and only as many as the maximum length for the field. Anything else is blocked.

Where explained elsewhere herein, that an Appliance returns content for use by a Provider, these explanations should be taken to include the principal of using templates and filters to make this safe for Providers who require XSS or other protection against a possibly compromised Appliance, or for Providers who favor implementation speed over such protection, it may in those cases also include the principal of the Appliance literally sending content that does not offer this protection or is not processed by the Provider to cause protection, and in these cases, browser-supported means (e.g. CORS) to help limit the opportunities for cross-site malicious activities are strongly encouraged.

Authentication.

The present invention is an addition to, or a replacement for, a Provider authentication system. It uses the principal that it is more secure, and also faster and also easier, for a User to authenticate using something they have, for example a unique token stored on their phone, than other methods. In the case of electronic tokens stored on portable devices or similar, the device supports use of local cryptography to protect the token against usage by others, for example the children of the phones owner, or thieves of the phone. Token data is stored in device protected storage, being a special part of phone memory more resistant to attack, and against disclosure, and which is usually omitted from device backups on account of it being undesirable for the important security data of the token being replicated inside backup files stored in other places (users who need to restore backups can acquire replacement tokens and delete no-longer-used ones through the Provider site). Token data which the User elects to encrypt, or which the Provider forces the User to encrypt, is stored encrypted to a secret such as a PIN or password, or as in one preferred embodiment, stored encrypted to a key derived through PBKDF, for example bcrypt, or token data is protected by biometrics. Most biometrics make use of the "feature" concept to identify Users. Biometrics data is taken from a sensor, converted into a feature set, and compared against previously stored feature sets, and when a match is found, a match-flag is set to indicate success. Two large drawbacks exist with this technique; firstly, malicious alteration of code can simply invert the match-flag, changing any "no match" result into a "match" one, thus granting access to all users other than the real owner, and the other drawback is the capability for a stolen set of features to be used to construct a fake biometric that will successfully emulate the User. One preferred embodiment of present invention is the encryption of token data using a key that is derived from biometrics, instead of using match-flags. This overcomes both drawbacks, and the technique to accomplish this biometric key generation is described later herein. Some situations exist where such advantages are not possible, like for example mobile phone fingerprint hardware that does not permit application software to extract features, or only supports the match-flag technique. In such situations, this still offers more protection than using none, and so is still preferred as a protection technique for tokens.

Certain Providers have differing security strength requirements than others, for example, the requirement to encrypt tokens might be mandatory for Providers with strong security needs, or it might be optional, or it might be prohibited by Providers who wish to prevent Users from accidentally blocking themselves. Electronic tokens constructed in accordance with one embodiment of present invention are stored in a structure that includes policy information, and policy requirements may be specified in tri-state form, for example, token-encryption might be "Mandatory" or "Optional" or "Not allowed". Upon download into the User's device, policy requirements are enforced by the device software, for example, the app that holds the tokens.

A user requesting access to a Provider resource will first identify to the Provider. This is accomplished either by the user supplying an identifier, like a username or email address or account number or biometric or the like, or by the User's device supplying information capable of identifying the user, such as a Cookie or TLS-ID or persistent-storage value or other pre-stored or derived identifier. A traditional request in legacy implementations typically has the user also supply a password or PIN or similar, and this present invention allows the Provider to elect whether or not to require Users to use passwords, and if so, whether to use them before or after the protection afforded by present invention. On the one hand, passwords are an additional "layer" of security, being something extra that a user knows, in addition to them needing to have something, a token, to successfully log in. On the other hand however, the typical User nowadays has on average 70 different online accounts, making it entirely unreasonable that a Provider should expect their Users to remember 70 different passwords, and indeed, almost all Users cannot, so Users instead re-use passwords, or find other ways to deal with the problem, such as writing them down, recording them in password-manager software or web sites, or inventing schemes to generate them, or of course, re-using the same ones over and over. Passwords are easily stolen, either from Users, like via phishing for example, or from Providers, like by hacking their database for example. One purpose of present invention is to protect users against the increasing ineffectiveness of passwords, thus the present invention allows for the Provider to make passwords optional for users, or to not use passwords at all.

Ultimately, during Authentication, a user will first identify, and may or may not need a traditional password as well. It is here where a Provider integrates the authentication protection of present invention as follows: A session code is obtained from the Appliance, with the protected user ID supplied to it. The Appliance responds with flags indicating User's protection status, and content for display to the User. For Users who have active protection enabled on their account, the content is at this point displayed to them, and this is the content that triggers the display of a random photograph. The Appliance, meanwhile, upon serving the content to display the photograph, contacts the software in the device of the User and requests it to open and display the correct token for this Provider to the User. For devices with "PUSH" capability or SMS reception capability or other network or vendor supported techniques for receiving incoming messages, these may be used to trigger the token display. Not all devices have such facilities, and those that do can suffer delays and outages, so one preferred embodiment of present invention includes in the software on the User's device a network and/or audio connection that listens for incoming notices from the Appliance. This greatly improves both the speed and reliability of the "convenience" feature of present invention whereby the token required for use by the User with the Provider is automatically shown to the User at the moment it is required. For situations where no automatic display is possible, the device software contains the facility to allow the user to manually open a token for the Provider. To improve further the reliability and speed of token opening on devices, other notification methods can be used, including the production of audio sounds by the device used by the User to authenticate with, for example their desktop PC with its speakers, and preferably the audio is located in the high part of the spectrum where it is typically inaudible to humans. The device software uses it's microphone to hear the notice from the Appliance in order to trigger the token display, and preferably ignores notices received that do not apply to the present authentication, such as ones for tokens not present in device, or ones that are old or ones that have a stale sequence number or replayed ones etc. Other convenience methods may be used as well to help open the correct token, such as using a device camera to scan a code, for example a QR code or barcode or similar, or using radio, for example Bluetooth, or using local networking, for example IP broadcast packets, or using infrared or magnetics or inductance or NFC or other means whereby the authentication component can communicate with the token or device holding it.

The foregoing techniques and others disclosed elsewhere herein for facilitating a device to receive a notice from a user's machine or a server or both or from one through the other are collectively referred to as "PUSH".

For situations where the User is authenticating from the same device that contains the token software, for example, they're logging in to a web site on their mobile phone, and the same mobile phone contains their token, the Appliance supplies to the Provider a custom protocol handler, deep-link or universal link or other inter-process communication method or similar which instructs the app on the user's device to automatically display the correct token. One method to do this according to one embodiment of the present invention is as follows:

Firstly, the device is programmed not to change screens, in particular, not to go "back" to an earlier one, by issuing the following Javascript code or equivalent:

function noBack( ){window.history.forward( )};
noBack( );
   window.onload=noBack;
   window.onpageshow=function(evt){if(evt.persisted)noBack( )}
   window.onunload=function( ){void(0)}

In the case where the calling page needs to remain, for example, iOS8 when needing to maintain communication with a server like websocket or long-poll, first we create the new blank tab or window, then we wait until the new tab/window becomes visible (this being necessary because the calling page is sent to background and thus no longer generates visibility change events which we need to monitor), next we bind visibility events handlers to the newly created window document and initiate a countdown timer, and at this point we load attempt to load the app if already installed. If visibility change events are generated this indicates a successful app launch, and the countdown timer is cancelled, but if not, the timer generates a page redirection to the app store for the user to download the requisite app.

Next, a Uri is constructed to identify the protocol handler for the software in the device with the token, and is output by issuing the following Javascript code or equivalent:
   location.replace(Url);

Many different ways to open URI's exist, but all of them have drawbacks, such as not working across different devices, or triggering an unwanted "back( )" action on the authentication web page, or behaving badly should they be used on a device without the token app software being installed, or suspending execution of the calling page, or issuing unwanted error messages to users, and other problems. This disclosed combination of scripting techniques provides reliable communication from the calling resource, for example the login web page, to the app, for example the token software in the phone.

An example Uri which opens a token app software having the protocol handler "icp:", and supplying additional information, would be, in the JavaScript language:
   Uri='icp:bG9nPTQ2MTNjE0ZjU3Y=='

One problem of having a user match a pair of photos, when they are using one device with one screen to do so, is that the screen showing the photo to match, and the screen showing their token which has multiple photos on it, will generally by unable to be both viewed at the same time. To overcome this, the Provider Uri which opens the token may supply additional information to the token, which can be displayed to the user at the same time as the token by the token app software. The additional information can be the image from the Appliance that is needed to be matched, or an identifier or encrypted version thereof to assist the app software to show to the user the photo they need to match. For example, a token that has 10 random photos, with 6 portrait ones displayed on the top half of the screen, and 4 landscape ones displayed on the bottom half of the screen, can choose to hide the top 6 photos and replace them with the one random landscape photo from the Appliance, along with an instruction to the user to match the shown photo and tap it on assortment below; e.g. Refer FIG. 1.

Another problem of using just one device, is that when a protocol handler opens the token app software, the original Provider resource, for example their login web page, is no longer visible because the app software is now using the screen. Some mobile device operating systems or versions thereof do not provide a way for an app to arbitrarily switch over to another running app. This present invention solves this problem in legacy implementations in a new and inventive way never done before, which is by programming the token app software to exit or yield after the user taps the correct photo. When the app exits, the previous screen returns into view for use again. For mobile operating systems that support context switching, the token app software yield control and screen back to the originating app through the use of those mechanisms.

So in one embodiment, a complete authentication experience for the user on a mobile device is; they load the Provider resource login page, which either automatically or manually identifies the user, then the User sees a screen showing one photo to match, and several random photos, one of which does match, then when the user taps the matching photo, that screen goes away, and the user returns to the resource login screen which then automatically proceeds to grant the user access to the resource.

The provider's authentication system output, after having output the Appliance content that made the photo matching and app triggering work, causes the establishment of a persistent connection to the Appliance or an agent on its behalf, and listens for incoming events. For devices that support "websockets", these are used, for devices that do not, "long-poll" is used, whereby the User's machine is instructed to load from the Appliance or its agent, and the Appliance accepts this instruction, keeps open the connection, but refrains from returning content immediately. When the Appliance detects that the User has tapped the correct photo, it communicates this fact, for example by returning data over the "long-poll" connection, or via websocket, which indicates to the Provider login page that it is time to check if the user is allowed to log in and if so, complete the login. For situations where a User mobile device cannot contact an Appliance, for example a mobile phone with no internet connectivity, or when a user is not using an electronic token, the correct image on the User's token has one or more random codes associated with it, and the user authenticates manually by typing the correct codes into the provider web page.

When the Provider detects a tap or a code, it uses it's session code and the user's obscured ID to ask the Appliance if the user has correctly authenticated. When the Appliance confirms this, the provider allows the login as normal, but if not, the user is not allowed to access the resource.

One example summary of integrating protection with a Provider login web page is: the Provider adjusts their server-side login code so it communicates a user identity (preferably obscured) to an Appliance. It also retrieves a session code and content from an Appliance, and it outputs content from the Appliance which triggers a photo display to the user, and when it detects a photo tap or code from the user, it checks with the Appliance if this is correct, and if so permits the login.

Photos are used on account of humans being naturally able to easily match these, however, it will be appreciated by one skilled in the art that substitutes exist which are also suitable, such as graphic images, abstract shapes, computer generated codes, words, numbers, symbols, or anything visually useful for the purpose of matching, and also useful and of interest to the visually impaired are audio alternatives like sound recordings or sound productions or the like, as are automatically machine-matchable alternatives like NFC, QR codes, ultrasonic sounds, short range radio waves, magnetics, wired and wireless networks, or even motions. An example for the use of QR codes in this context: rather than a user tapping on a matching photo when the token software automatically opens, instead, the token software automatically activates the device camera, which the user can scan an on-screen Quick-Response (QR) code with.

Out-Of-Band Actioning (OOBA).

One purpose of this present invention is to protect Users and Providers against unwanted actions perpetrated by Criminals or their software agents, for example, man-in-the-middle attacks or malware or social engineering or viruses that my exist on the User's machine. For example, many forms of banking malware exist today, like Dyre Wolf, Neverquest, Bugat, Brazilian Bancos & Janela, Zeus, Necurs, Ramnit to name a few, which are programmed to live on a User's machine and wait for the User to access internet banking, and when the User does, the malware will use the User's authenticated session to steal their money by injecting financial transfer instructions, and often after stealing the money, to hide this fact by suppressing the fraudulent transactions from display to the user, displaying former account balances, or locking the user out of their account, and Provider banks have difficulty detecting these heists because the attacks originate from a legitimate User's machine using the User's own credentials. Other unwanted actions both banking and otherwise that malware might carry out include adding new accounts to a User's profile, erasing a user's online resources like files, folders, virtual machine instances, changing user passwords, disabling user security protections, posting unwanted material publicly on behalf of the User, stealing assets like domain names, bitcoins and virtual currency, game assets, etc., ordering goods to be shipped for collection by Criminals, encrypting documents by ransomware, or in general, impersonating the user or performing any actions that the User does not approve by taking advantage of the access available to the malware on account of its presence. Remote-Access-Trojans (RATs) are a different class of malware which offer Criminals a general interface to impersonate a User from the User's own machine using the User's own credentials, to accomplish more or less any action a legitimate User might wish to perform. This present invention neutralizes the ability for Criminals and malware or the like to successfully carry out such actions (also called transactions, whether or not they involve money) by adjusting the Provider systems to require User confirmation prior to processing User actions that are deemed needing protection against these kinds of attacks, where confirmation is performed out-of-reach of the malware or the like. Confirmation (also called Verification herein) of actions comes from the User's token or the token app software in the User's mobile device, and is disclosed in detail elsewhere in this specification. Additionally, the OOBA channel direct to the user facilitates a secure means by which a Provider can augment transaction information with additional useful content, for example, banks experiencing social-engineering attacks whereby Criminals persuade customers to send money to them through elaborate hoax means, can, at the point where customers are about to confirm the transmission of that money, insert a topical warning about the destination being known as a fraudulent scam, to help alert potential victims prior to them being scammed.

Another example of unwanted actions that present invention can protect against comes from bank Automatic Teller Machine (ATM) or Point-of-Sale (POS) credit/debit card skimming. These are attacks where Criminals obtain card details and possibly PIN numbers, such as for example using skimming hardware and hidden cameras to extract this information from magnetic stripes and ATM/POS keypads either electronically or by visual observation or recording. Card details stolen this way can be cloned onto plastic cards and subsequently used in ATMs to withdraw cash or POS to obtain goods, thus stealing from victim accounts. Coordinated attacks in 2003 obtained $45M cash this way in a single heist lasting a few hours. The present invention prevents unauthorized cash withdrawals or POS transactions because the banking payment switch or other internal bank software is programmed to seek the genuine user's permission for the withdrawal or sale by sending details of the proposed transaction to the user's smart token mobile device to request their approval. In the event of Criminals attempting to use stolen cards, unwanted transactions can be blocked, and the User can be alerted to the theft of their card, and can take further action to prevent subsequent loss, such as for example using the token mobile device to immediately cancel the card.

Similar protection can also be afforded with this infrastructure, whereby all or selected customer card payments are blocked until such time as the customer makes use of the token app software to momentarily unlock their card for a transaction they intend to perform, optionally specifying an intended amount or approximation of it to help ensure the subsequent transaction is permitted.

Common forms of card attack experienced by customers of illicit goods and service providers include transactions for amounts that are significantly higher than expected. For example, some illicit clubs in Europe operate modified POS terminals which display a sale amount to the customer which is 10 times lower than the amount the customer unknowingly approves at time of purchase. Customers tend not to dispute these illegal transactions, and those who do often fail to win on account of the club taking care to prepare evidence of customer attendance and sales policies to support the sale. Thus it can be seen that this present inventions' mechanisms of having the customer approve the actual amount, or having the customer specify the actual or approximate expected amount of a transaction in advance can prevent fraudulent transactions from succeeding.

A further example of unwanted actions prevented by OOBA are those which can be protected by multiparty approvals (examples include two-person concept or two-man rule protection concepts). For example, $101M was taken (from an original $951M theft) from the New York Federal Reserve in 2016 perpetrated by either hackers or corrupt Bangladeshi bank insiders (it's unclear which). OOBA protects Providers like the NY Fed (currently being sued to recover the funds) as follows; actions (the transfer instructions in this example) are collected but not approved by the Provider (NY Fed in this example), who initiates OOBA to circulate the proposed action to 2 or more pre-authorized signatories (in this example it would be two or more officials from the Bangladeshi Central Bank, being the victim account holder at NY Fed), and only when sufficient number of signatories approve, is the action performed, and additionally, signatories can deny actions which prevents approval entirely. Thus, the NY Fed can protect itself against both hackers and corrupt account holders because the digital signatures approving transfers offer non-repudiation evidence to prevent the bank loosing lawsuits over unwanted actions, plus the multiple signatories make it extremely hard for hackers, and significantly unlikely for insiders, to successfully carry out an attack in the first place, on account of the approvals personally linking each and every one of the approvers to the action. Hackers cannot successfully cause legitimate officials to approve fake transactions because it requires the transaction itself be scrutinized at point of approval, and corrupt officials are unlikely to approve fake transactions en-masse knowing that each and every one of them will be indelibly implicated as the approver.

OOBA is also useful for other security purposes that require out-of-band approvals, for example, modern accounting software often requires access to User bank accounts, such as to download statements or transactions, and automatic or online payment systems exist capable of automatically generating transactions on behalf of Users; all of these things require approval from a User which is an otherwise difficult User-Experience (UX) to accomplish (e.g. requiring Users to switch sites or deal with complicated pre-authentication request workflows and the like), or is outright dangerous (e.g. asking users to give online banking passwords to third parties, or auto-opening/framing/popping-up provider sites to let users enter credentials, thus facilitating simple criminal-impersonation and harvesting, cross-site scripting, and other vulnerabilities). OOBA allows a third party requesting access to a User-Authenticated resource at a Provider to trigger the Provider to request from the customer using the secure OOBA channel approval to perform that action. One embodiment of this solution according to present invention is as follows: $3^{rd}$ party requests the User resource along with details of the reason and longevity information (e.g. one-time access, or, ongoing future approval), the Provider relays an appropriate approval request via OOBA to the user, the user approves, whereupon the Provider returns to the $3^{rd}$ party an access key which facilitates the request (and if approved, future ones). $3^{rd}$ parties thus do not get user credentials, and users are not subjected to high-risk authentication activities as part of the approval process.

The preferred embodiment of present invention implements an electronic method for the secure approval of action instructions by two or more signatories comprising: (a) designating a number N of authorized signatories required to approve said action from a subset M of similarity authorized signatories where N=>2 and M=>N; (b) receiving content indicating instructional intent of said action; (c) electronically communicating intent of said action to two or more said signatories; (c) providing said signatories each with means to view and action said intent; (d) accepting from said signatories indication of their approval status (note that "approval status" can be "approved" or "denied" or "hold" or anything else that makes sense in the context of the proposed action); (e) generating digital signature for each signatory over combination of the elements of said approval status plus said action intent (note that it is preferable that all elements be signed, but not mandatory; so long as enough to convey the intent of the action and intent of the status are signed, that is sufficient); (f) communicating said signature and said approval status to a processing endpoint; (g) carrying out said action instructions after reception of sufficient positive approvals with valid signatures. When non-positive responses arrive, the preferred embodiment further comprises: (h) designating a number X of authorized signatories with permission to deny said action where X>=0 and where said authorized signatories are not necessarily present in sets N or M; (i) designating a denial threshold Y of said set X signatories where Y<=X; (j) denying said action instructions upon receipt from set X signatories of Y or more denies approval statuses, said denial preventing said instructions from being carried out henceforth.

To assist Providers implementing out-of-band actioning, this present invention makes available multiple different provider-side mechanisms (e.g. store-and-verify or signature-at-time-of-transaction), one or more of which can be chosen by the provider to enable protection. Security is useless if not used, thus it is important to make the implementation of security as fast and easy as possible to enable a Provider to use it. This concept itself is an important and useful improvement over legacy implementations.

An example typical existing workflow for a Provider system offering possible actions, or Transactions, to a User, consists of making facilities, like for example a web page, available to the User which they use to specify the action they wish to perform, like for example transferring money, or changing domain-name DNS records. The User will submit their intended action via this interface, whereupon the provider systems receive the incoming action request, and process it.

One embodiment of the present invention changes the User's experience of submitting an action by requesting the user to confirm or Verify or approve it, using their token, before the Provider processes it. A provider using this embodiment will accept a proposed transaction, queue it while they seek a user response, then complete appropriate processing after said response arrives.

A preferred embodiment improves again on the approval process, because it is usually a difficult programming change for a Provider to modify their workflow to accommodate action queuing, because in-between receiving an action, and processing it, they now have to somehow store and remember the action, perform out-of-band actioning upon it, and then at a later stage either process or decline depending on the verification result, and this is not easy because actions are typically submitted by Users with a "stateless" protocol like web pages, and programmed usually to happen upon reception, and simply put, the web does not work in a way that makes queuing easy; web servers typically do not "wait" for Users, and Provider resource software is typically written without any use of this foreign concept of waiting for verification of actions. Thus the improved workflow according to a preferred embodiment of the present invention adjusts the user experience by including the out-of-band actioning step, but said step is implemented by the Provider so that this verification is transparent to their systems, as follows:

The provider identifies an action that can be secured by out-of-band actioning, and modifies the source of this action, for example, the web page where this action will be submitted from by the user. The modification is included where the presentation of the action options to the user takes place, e.g., the page where the user submits the action from, the Provider resource using its session code to request from the Appliance some additional content to modify into the page being shown to the User. The content returned by the Appliance is programmed to intercept the action request being made by the user, and instead of sending it to the Provider for processing, the details of the action are sent to the Appliance which in turn shows or sends these intended action details to the User, for example, by the use of a PUSH message which triggers the token app software on their mobile device to display the intended action, and shows buttons to approve or deny it. The Appliance content also instructs the original page, upon submission by the User, to wait for the User to confirm the action via the Appliance, such as by websockets or long-poll or the like. When the user chooses to approve or deny or some other action through their mobile device, notice of same is communicated to the Appliance by the token app software along with optional additional metadata such as geolocation coordinates, front-facing-camera images, audio or photo or other sensor data, such notice preferably being digitally signed by the User's private key present in the device, such signature being made to substantially include the details of the action the user is verifying. The Appliance then notifies the original page that a Verification has been received, and supplies to it the notice or signature of the approval, at which point the page then does submit the action for processing by the Provider resource software. Thus, there are only a few small changes a Provider needs to make to integrate out-of-band actioning protection into their actions; the insertion of the Appliance content into their page, and at the point of processing the User's action request, to only do so when the now newly-included out-of-band actioning signature is present and correct. The difficult problem of store and verify and later process in the context of stateless web traffic flow is removed.

To further ease the inclusion of out-of-band actioning for arbitrary User actions, one embodiment of this invention programs the Appliance to recognize when a never-before-seen out-of-band actioning (OOBA) request arrives for the first time, and when it does, this will indicate that a Provider is implementing OOBA on this kind of action for the very first time, and at this point, the Appliance will initiate a "Wizard" system which interactively guides the Provider developers through the task of specifying how to display and arrange the action information to the User for verification. The wizard allows the developer to save the layout and design in a template, which the Appliance will in future use for subsequent OOBA and/or page loads. This means that a Provider can complete an out-of-band actioning setup, including making it look attractive and work well for the user, by merely adding a small amount of "easy OOBA" code to their page, a small amount of signature checking code to their processing, and then loading the page which allows them to design the user experience, and the OOBA integration is complete.

One embodiment of present invention offers protection to a Provider in the form of non-repudiation evidence for user submitted (or approved) actions. For example, many internet banks voluntarily refund their customers when the customer is a victim of malware or other computer attack that has stolen their money. Criminals in the form of dishonest Users of the bank can now take advantage of this bank generosity, by transferring money from their account, and then fraudulently claiming to the bank that they did not do this, in order to enjoy the bank refund. The inclusion of out-of-band actioning, and where suitable, additional metadata like User GPS coordinates, biometrics, front-facing-camera photographs, or the like collected at the time of transaction approval make it possible for the bank to save evidence useful later to protect itself against fraudulent Users, at the same time as protecting their good users against attacks. The OOBA response with metadata makes this possible, with or without a signature, and the use of digital signatures using the User private key makes it possible for Providers (e.g. the bank) to have a very high level of confidence that transactions they process have been approved by a User, as well as creating compelling evidence the Provider can later rely on should a dispute arise.

Not all Providers will wish to implement Appliance-assisted easy OOBA, and so one embodiment of this present invention additionally supports this. A Provider will in these cases accept an action request from a user, make a request to the Appliance for the request to be verified, and will process the request upon receipt of a suitable verification response. For example, such responses may be received from a User's browser after websocket or long-poll notice from an Appliance, or may be received directly from an Appliance, the latter being useful for situations where a User may not be using a Provider resource at the time. For example, a household security system, upon detection of a break-in attempt, may request an Appliance to notify the user and ask if silencing the alarm is desired. The user can if they choose approve an action to silence the alarm, for example, in events of a false-alarm, and the OOBA mechanism provides to the Provider, who in this case might be the alarm monitoring company, a robust mechanism to manage alarms at the same time as protect themselves against liability through the present inventions non-repudiation features. It will be appreciated by one skilled in the art, that an enormous range of other uses for this OOBA mechanism are possible; in general, any time one or more Users require an instant notice of an event, the Appliance can be asked to activate the token app software on the user's mobile device and use the full screen and touch and sensor capabilities of that device to inform them of the event, to request a response from them, and to securely process and/or sign the response(s) which can then be actioned by the Provider with non-repudiation protection, and the token app software can then optionally exit which returns the Users to whatever they might have been doing prior to the OOBA interruption.

In one preferred embodiment of present invention, User responses to OOBA events are digitally signed using the private key associated with a token that was used earlier by a user in an authentication step with a Provider, that step including mutual authentication whereby the provider proves its legitimacy to the user via means of photo display. Most high-assurance activities performed on computers are governed by Provider security rules or policies, for example, many government agencies mandate the use of mutual authentication in such situations. In a preferred embodiment, present invention extends the mutual authentication protection established during a User login to subsequent out of band signatures made by the User by establishing a key with the token used by the user at login, and requiring the OOBA responses to prove possession of that same key in their replies; this is done by OOBA signed responses carrying a digest of a provider-supplied nonce with the key. The provider uses this digest to ascertain that the token has knowledge of the key. Since this key exists as a result of the Provider proving its identity to the User, at the same time as the User proving their identity to the Provider, this extends the mutual authentication protection to the subsequent OOBA responses as well. It will be appreciated by one skilled in the art, that asymmetric cryptography like public and private keys, as well as hash algorithms and the like are suitable alternatives to digests, and that in general, any means by which two trusted parties can later prove their involvement in an earlier cryptographic operation, and in a non-replayable way, can be used.

Some other use cases enabled by this present invention include the approval of parents who may not be present for actions to be taken by or on their children, such as school health emergencies; or for patients to approve the release of medical history records to doctors at the time of consultation; or for physical premises access to be granted to a third party by a User not present, or for operational or emergency actions to be remotely approved or chosen, like activating extinguishers, starting or stopping equipment, opening or closing valves or accesses, changing alarm states, disabling machinery, mining operational decisions and detonating explosives, and the like. In general, where it is advantageous to inform one or more Users and collect a non-repudiable response therefrom, this present inventions OOBA is a new and valuable way to do this.

Image Protection.

Photos displayed to users in this invention are digitally signed and timestamped (e.g. within their EXIF data) to facilitate helper agent rejection of fake, old, stolen, or replayed images. They additionally carry "time bomb" links within the EXIF which encourages viewer and graphics processing software to trigger an outgoing lookup to a web URL over TCP/IP and/or UDP, which facilitates detection of phishing attacks. In other words; storing URLs and web scripting inside EXIF fields can cause a remote server to learn when a stolen image is being re-used.

To hamper machine and automated processing of photos, before showing to users, they are morphed and watermarked, translated and randomly placed—humans typically don't even notice this effort, but to a machine it makes matching much harder. The main purpose is to support CAPTCHA style anti-robot protection, in such a way that the users don't even notice its happening.

Non-Integration Operation.

One object of present invention is to encourage the use of improved security by Users, one means to do this is to make security fast and easy. Not all Providers will necessarily be able or willing to integrate all, or in some cases any, features of Present invention, but it is still desirable to nevertheless improve the security for their Users regardless. Many of these Providers may lack the will or resource to adjust their systems, or to do so in a timely way, and some may already have made adjustments to use lesser additional security, like 33-year-old TOTP code technology, perhaps unaware of its ineffectiveness, and such Providers may take time to understand their mistake before upgrading to modern security. Thus, the present invention is capable of operating for the benefit of the User without requiring Provider integration as follows.

The User installs upon their device(s) with which they access Provider resources a helper agent. The User installs upon their device(s) which they desire to help them with using provider resources a credential agent. These later device(s) may be the same or different to the former, for example, they might use a PC or laptop or tablet device to access resources, and may use a mobile phone or smartwatch as a credential agent. Any combination is possible, including for example using the same mobile phone to both access a resource, and manage credentials. This helper agent, a software or programmable hardware device, is programmed to monitor activity on the User's device in order to detect provider resources. For example, this helper agent may be in the form of a web browser extension which monitors the web URLs being loaded, and/or the web page content. This agent examines the URLs to detect known web locations, and/or examines the page looking for content, like for example input form fields for usernames and/or passwords and/or TOTP codes etc., and the agent communicates with the credential agent, possibly through an intermediate server agent, to determine if the User has an account with the detected provider or resource. When a positive match is found, the credential agent notifies the User with a prompt, and waits for a User selection or confirmation. For example, when our example User Alice uses her PC to visit a Hotmail login web page, the helper agent on her PC detects Hotmail, initiates a lookup for possible User credentials, then notifies the credential agent on the User's smartwatch which quickly notifies her with an actionable message, for example "Log in to Hotmail as Alice@Hotmail.com?". Alice can complete her login quickly and easily, without having to remember her password or open $3^{rd}$ party TOTP apps nor read nor type one-time codes nor insert additional security hardware devices nor activate them, instead, Alice can simply tap once on her watch. The credential agent is programmed to detect when a User confirms a login action with a tap, and/or is programmed to allow Users to select which, out of possibly many different credentials, they wish to use, for example by showing a scrollable list, and the credential agent communicates to the helper agent the Users selected or confirmed identity and credentials and generated OTP code if required to automatically complete the action. For our example of Alice, her one-tap on her watch will quickly and securely log her in to her Hotmail resource, without her having to otherwise manually authenticate on her PC.

Operation

Psychological Advantage

Important to security system success is its ubiquity, and the use of photo matching during authentication presents a new and useful means to motivate Providers and Users alike to implement, activate, and/or utilize said security. When a happy or uplifting or the like photo (collectively herein "Happy") is one among a plethora of other random photos used in tokens, and users are required to locate this Happy photo as part of their security activity, the repeated act of "looking for Happy" can make noticeable improvements to a User's disposition and mental wellbeing. This trick works on account of the user subconsciously persisting the task of looking for other happy things in other parts of their life, which may help reduce depression, improve sleeping, and encourage Users to adopt and maintain positive moods. In embodiments of present invention where User mental wellbeing improvements are desired, authentication and other security enforcing actions taken by the users are designed whereby the photo a user must match is predominantly one that is Happy, and preferably unique in this aspect on account of non-matching photos used along with it being neutral or non-Happy in nature. To assist maintaining the strong security while using a human-discernable Happy photo method, and also as a security entropy enhancement even when not using Happy photos, token app software is programmed to automatically replace one or more photos contained within tokens with new and different photos prior to next Use, this having the effect from a User's perspective that the Happy photo they need to match will predominantly be different each time. This becomes a security advantage on account of improving the chances that a Provider will choose to deploy a security system for their Users, and once deployed, that Users will elect to make use of said security and/or users will enjoy said provider and potentially encourage other new users to join, plus it establishes an interesting feature that Providers can include in marketing materials, all or some of those thus increasing the security system ubiquity and/or utilization.

Support

Social engineering is an enormous authentication risk, and one of the several different techniques of this present invention to overcome this risk is as follows: the User's token app software includes telephone call capability, such Voice over Internet Protocol (VoIP) for example. Tokens made available by Providers for Users additionally include Provider support-staff endpoint contact information. In the event that either party needs to engage in real time communications, such as voice or videoconference, the Appliance and token app software facilitate this. Users may be given an option within their token to place a support call or request for a support callback, which is relayed to the token endpoint. Provider staff are given a facility to call or request a callback from Users in a similar way. Additionally, the call itself is protected using the keys for the token to establish an encrypted channel. If biometrics or passwords protect the token, the User unlocks the token to engage with the call.

Since calls make use of information only known by the genuine User and Genuine Provider, such as token keys, this provides both a reliable means to prevent imposters at either end of the channel, and reliable means to adequately secure the communications itself, which is an important consideration since it is usually especially important to protect calls established in relation to authentication or provider operations.

Calls and callback requests make use of the authentication appliance to facilitate connection, thus they can be originated by many different means, such as a Users' PC web page, or their mobile phone's token app software, or by a call center web page or telephone system. During these mutually-authenticated, encrypted, real time communications (calls or video conferences), this present invention provides within the token app software the facility to share video, including front-facing camera for video conference, or rear-facing camera for situational purposes like allowing an operator to see documents, locations, screens, etc., or for an operator to show Users steps, instructions, diagrams, maps, etc. It also allows for the sharing of device sensor or other information like GPS, temperature, barometer, battery, network, storage, etc. and provides an interface for users to share other items like files, photographs and so on.

Operating VoIP or similar with video also easily facilitates the use of voice-print biometrics and face recognition biometrics for situations where higher assurance may be needed. All sharing facilities are preferably governed by policy configuration settings requiring a User to permit the sharing and extent thereof of the foregoing information.

Remember; security needs to be used to protect people, so offering features including the option of face to face human support, easy contact making, low-cost or free calling when possible, no-wait queuing (callbacks) and facilitating significant improvements in support capability encourage both Users as well as Providers to want to use this security.

Strong privacy is an additional advantage of token-app calling support, since Users and Providers alike need not be given means to contact one another outside of the protection of the app, and as explained elsewhere herein the facility to avoid unique identifiers and support strong separation between multiple User personas is included.

Identity Verification

The present invention is well suited for security identity systems, a first step involving binding an identity to an authenticator, either in-person, or online. This is accomplished in-person as follows:

A verification agent or trust broker makes available a location or premises and a clerk thereat where users can attend with their identification papers, document, or other proof-of-identity materials or means. The clerk carries out their identification procedure, and when satisfied, issues to the user a token of this present invention (e.g. hands to the user the token, or a package containing it), making a record in the clerk systems of any user attributes they may wish to store (e.g.: the user's name and perhaps social security number or other ID, etc.) along with the token serial number or means to associate it later (for example; tokens may themselves be sealed in tamper-proof packaging to further protect user identity, and the packaging itself may have other barcode or number markings on it which can associate with the enclosed token, without otherwise revealing details of the token). The user takes this token, and uses it later to establish an online account, or enrolls the token with an existing online account, thus binding their real-world identity to their online account.

Identity binding is accomplished online as follows:

A verification agent or trust broker makes available an electronic service (e.g. web site, smartphone app, or improved ATM machine, etc.) which users can visit. The user follows the service instructions, for example, they enter a variety of identity-document data, which the service checks against a document-verification-service, or they scan or photograph documents or other materials which the service verifies or stores. The service may elect to operate a remote clerk who can interactively communicate with the user, via on-screen or voice (e.g. phone or SIP call) or videocall or other means, to help with identification and verification (e.g. checking the user applying looks like a real live human, with an appearance matching one known for that person on file). When satisfied, the service records user attributes it may need, and binds the user to a token. The token bound may either be communicated to the user at this point (e.g.: a file they can print physically, or a virtual token that becomes enrolled in their phone), or the service associates an existing user's token with their identity (e.g. the user having first acquired the token prior to verifying identity). Biometrics may be used to improve assurance that token will only be used by the verified user, and some or all of the interactive methods may be provided by the token-app software on the user's phone itself.

In either offline or online cases, the user's account management as disclosed elsewhere in this invention allows them to obtain additional real and virtual tokens and bind new ones as well.

Note that sworn-testimony, trusted elders, and other means may also work as alternatives to identity documents in this system, as can web-of-trust techniques facilitated, for example, via rich auctioning as also disclosed elsewhere herein.

Smart Token Supply

Two features of this present invention include making security easy for Users (to get as well as use), and making it easy for Providers (to make available to their users).

One mode of operation enabling both this is through using a security appliance. It is programmed to communicate with a Provider system, such as a web site, and the Appliance accepts input form the provider, such as an obscured identifier for a user, and returns content for use in templates or directly, which are shown to a User through the Provider's system. This gives the Appliance the means to carry out otherwise complicated operations, without the Provider having themselves to code these operations.

One such operation, is the onboarding of new users to the security system. A Provider will integrate into their login flow, or will make available a separate function (e.g.; admin web page), a means for the appliance to communicate through provider to user. When the appliance encounters an obscured ID not-before-seen, it will determine that this is a new user, and activate for them an enrolment subsystem, or wizard, to guide them through the process of setting up their security. This is preferably accomplished by the provider relaying between user and appliance, but can alternately be provisioned by a user talking direct to an appliance (for example, via means of web site frames or scripting). The Appliance will detect the platform in use by the user (e.g. A mac/pc, or an iPhone/Android, or tablet etc.) by means such as browser user agent examination, client-side javascript, device fingerprinting, previous-encounter database pairing, or the like. It will select the most suitable range of enrollment and app-provision options for the user, and display them with a recommendation for the one most likely to work best for the user. For example; a PC/Mac may suggest users obtain a token (and where necessary the app for it) by sending the user an SMS message to their mobile phone. In situations where the user's mobile phone number is already know, it will preferably do this automatically. Not all users can use SMS, so alternate options will be given, and should include email (so a user can open the email on their phone, and click within it on a link to obtain their token; again, this email should be automatic when it is already known for the user), a QR code which a user can scan with their phone, a URL which a user can manually enter in to their phones browser, and any additional mechanisms to help the user ultimately visit the URL on their portable device (which may also be a tablet or other device, not necessarily their cellphone). For users visiting the web site on a mobile device already, no SMS option is needed, since they are already using the device they most probably wish to install a token upon, so the SMS option is replaced with a recommended option which takes a user to the appropriate app-store for their device. This option is preferably not automatic, since it's possible a user may wish to install the app on a different device. This option is best provided as explained elsewhere herein as a deep-link style action, which activates any existing token-app software when present, rather than redundantly sending a user to a store when they already have the app. Tablet devices are handled like a hybrid of both, they allow for SMS and QR etc. so a cellphone can be used for the token, plus they include an app-store option for users who wish to install the token on their tablet.

Providers preferably make available this Appliance function to all users, even ones already installed, through a security administration area of their service. This allows for users with new phones to re-run the enrollment experience whenever needed, and allows the appliance to make available to users the means for users to download new physically-printable paper tokens, to manually add new tokens to their account, and to delete tokens they may now longer need or that were lost. This self-service security management provision is an additional security-enhancing benefit from present invention, since it lessens the need for users to contact providers and their staff, which lessens the chances of scammers or social engineers from tricking anyone.

An app, once installed for a user, will typically use means to work out which user this is, and what provider they're using, and use that information to select an appropriate appliance from which to request a token. This appliance, upon issuing one, also uses that information to activate (enable and turn on) the security protection for the user, and associates the provided token with their account (obscured userid).

Future user logins proceed with the provider contacting the appliance, determining that protected authentication is now required, and facilitating the appliance to perform it (with the user's now-installed token) to allow the user to log in. One preferred mode is for providers to enforce contact with the appliance for all users, allowing the appliance itself to tell the provider that a login may be allowed even without authentication protection (for example—users who do not yet have the new security set up). The provider can choose if they want users to be allowed to "disable" protection and/or re-enable it themselves, and so this mechanism caters for those use cases. Providers not wishing to allow non-protected authentications can refuse logins until new (or existing) users have successfully completed the enrollment process. This is accomplished by the provider communicating with the appliance directly, as well as with the provider relaying appliance content for on-sending to the user.

At the step where the app retrieves tokens for users, providers have the option to activate in-app billing, should they wish to charge users for the extra protection. This is negotiated with the app service (e.g. iOS or Android etc.) as a once-off or recurring subscription charge, and once successful payment is acknowledged, only then does an appliance release a token for the user's app. Income from billing can be used to fund Appliance vendor operations, or Provider ones, or a combination of both. Incentivizing providers to offer security to users is one way to improve user security, and revenue opportunities are a useful way to do this.

Face-to-Face Authentication and Attribute Release

Not all authentications take place between humans and computers, and neither do all authentications necessarily identify both parties. The present invention teaches a means for parties in the real world to reliably authenticate and exchange attributes with one another in real-time. For example—take the act of a nightclub bouncer vetting entry to an establishment based on legal drinking age requirements: patrons wishing to enter may be unwilling to disclose their age, name, or address, yet legacy entry methods typically involve the examination of ID like a driver's license, which contains far more information than is needed, most of it extremely private, and they also require bouncers to perform on-the-spot date calculation mathematics and to know the law, plus these legacy techniques leave no audit trail. Other factors may also be relevant, like alcoholics having placed themselves on a do-not-drink register, rowdy patrons who may be banned, international or religious patrons who may be subject to different laws, and so forth. Identity systems can be established to contain all this information, thus and example of this inventions method for enabling the use thereof is as follows:

The establishment enrolls its security staff with an identity provider system which provisions for each staff an authentication app according to present invention containing within it a security token. The identity system includes a picture of the staff member and the name of the establishment, together with rules the establishment may wish to enforce (e.g. drinking age, patron blacklist, etc.). The app includes a challenge facility which the bouncer staff or prospective patron can select, which activates an ID exchange process whereby an identifier is broadcast locally or between patron and bouncer by the app (for example, by displaying a QR code on the screen of a smartphone in which the app is running, or using NFC, or bump, or infrared, or printed QR codes or Wi-Fi or networking or ultrasonic or audio, etc.).

Patrons enroll in an Identity infrastructure wherein a trust broker is involved with verifying patron identity and attributes, like name, birthdate, their picture, and so forth. Patrons also receive an app built according to present invention. When challenged by establishment staff or wishing to enter, the patron engages in the ID exchange process (for example—by using their app to scan to bouncer's QR code, the establishment QR code, or read the local ultrasonic ID, or NFC, etc.). The Patron app retrieves the picture attribute of the bouncer along with the bouncer's age-challenge, and present to these to the patron. The patron checks that the person asking for proof-of-age matches the picture shown, and uses their app to approve release of their proof-of-age attribute and photograph attribute. Note that this is not their age or birthday, but merely an indicator that they are (or may not yet be) old enough at this moment in time to enter. The patrons approval appears on the bouncer's screen along with their picture, whereupon the bouncer checks that the picture matches the patron, and that their age attribute is appropriate, and entry is granted.

This person-to-person attribute release/verification is supported by the identity service of the patron being programmed (such as by using identity language like SAML or OAUTH or the like, or bespoke) to permit authenticated users (or specifically, the token-app software in their devices) to make requests of other users and submit required attributes in support thereof (e.g. the bouncer's own photograph), and the identity service making the attribute request to the user, accepting their response, and returning the requested authorized attributes (e.g. their photo) or indicators (e.g. , that thy are old enough to drink) to the requestor. Thus this invention facilitates means for two or more Users to authenticate one another or their attributes, not necessarily requiring identification (or privacy incursion) to do so.

Biometric Key Generation.

Biometrics typically use feature sets to recognize users. For example, biometric face recognition records measurement of features, like the relative distance between user eyes, the angles from eyes to nose, the size of their eyes and relative distance to and size of their eyebrows, the shape of their face and relative position of eyes, nose, mouth on it, and so on; similarly, fingerprint biometrics use human fingerprint attributes and user-distinguishing features like measurements between them, voice biometrics uses vocal attributes, palm-vein uses vein attributes, iris uses eye attributes, ear-print uses ears, heart uses electrical user body sensors, typing uses our dexterous keyboard behavior, and in general, all biometrics measure user-distinguishing aspects of the attributes relative to the technique and hardware in use. During enrolment, these recorded features are stored, and during recognition, new recordings are compared with stored ones to identify the user, and subsequently grant them access to something. Storage of features is problematic, because they become vulnerable to theft and subsequent use for impersonation, and various laws prohibit who is allowed to be subject to having biometrics taken, and what is allowed to be done with that information. The feature matching step is problematic, because device code can be altered to falsely indicate a match. It is therefore desirable to find a way to make use of biometrics without these problems.

It is desirable therefore to introduce a new way to perform biometrics which does not rely on stored feature matching. This has many uses, one example consistent with the other security disclosed elsewhere herein is the protection of User tokens within smart devices: an imposter attempting to use another User's phone to authenticate as the User will be prevented, on account of the phone requiring the correct User to be present and, in the example case of using face biometrics, visible to the front-facing device camera, in order to decrypt the token for use. The inability to extract profiles, or modify biometrics matching code or results by Criminals protects the secure token data.

Encryption keys are typically large random numbers, their size being expressed by their bit length in binary base-2 representation. Different encryption algorithms required different key lengths for similar resistance against attack. One most basic form of attack is key guessing, so key lengths are typically chosen based on the effort taken to guess them; for example, the number of guesses that a modern fast computer can compute per second is estimated, the speed at which computing power improves over time is taken into account, and a key size necessary to remain unguessed for a sufficient length of time, like decades or centuries, is estimated.

This present inventions' method of generating an encryption key from biometric data is as follows; biometrics features are measured or sampled and preferably more than one time. This produces one or more sets of features, and where two or more samples were taken, each element in the feature set has two or more samples of each. A mean and deviation or equivalent are calculated for each element where two or more samples exist. An encryption key length is determined based on the strength required according to the algorithm chosen (many different existing or other encryption algorithms exist, and any which make use of a random key are sufficient). The computing power of the device in use (or planned to later be used for decryption) is measured or estimated, and an average acceptable decryption time chosen, for example, one second. A constant is derived based on the speed of the device, and the number of features in the biometrics set. Using each element deviation where available, or in the alternative a constant for the feature derived from a representative population, the scale of the feature measurement is adjusted by the previously derived constant. The principal of later decryption will be based on initially reconstructing this key via the same or similar means, but owing to the general approximation nature of biometrics, it is expect that individual feature measurements will not every time be exact, so the constructed key will usually be wrong. Decryption is subsequently accomplished by starting with this usually wrong key, and systematically attempting decryption time and again by attempting minor variations of individual feature readings, or decryption fails after no key can be found within a suitable time. The minor variations are determined by scaling and representing each feature such that it's represented significance will determine that statically a match will be found within the predetermined maximum number of attempts desired as computed from the speed of the device and number of features in use.

For example, let's say a User has a smartphone with 8 CPU cores within it, each capable of operating at 2 ghz (2 billion instructions per second) and let's say a cipher is chosen that requires 256 cycles to test a decryption key; that gives us $8*2e9/256=6.25\times10^7$ test operations performable per second; and let's say that decryption times of up to 2.15 seconds are deemed acceptable for use; thus we find that $LOG_2(2.15*6.25\times10^7)$ determines that we can test up to 27 bits of the key in that time; and let's say our biometric input source provides us with 9 feature elements in a set, we thus find that $27/9=3$ bits of accuracy can be used as feature significance, and since $2^3=8$, that allows us 8 guesses per feature to find the key.

A marker key is then constructed by concatenating each scaled and represented-to-desired-significance feature element reading (or it's mean in the case of multiple samples) to create one long binary number. This number may be hashed, folded, or otherwise compressed or expanded to match the required key length for the chosen algorithm, and may be combined with salts, constants or otherwise transformed to improve its security, thus completing the generation of the biometrics key.

Initial encryption is then performed using the generated biometrics key; the data being encrypted including some constant or other reliable means by which, upon decryption, the success of the decryption operation can be ascertained.

Subsequent decryption of the encrypted data proceeds by first reconstructing another marker key from new biometric readings, then searching for the correct biometric key by guessing successive variations in features. In the case of a legitimate user, the search will succeed in a reasonable time, while in the case of an imposter, the size of the variations of biometrics features will prevent the search finding they key in any reasonable amount of time.

Mathematical significance is the degree of confidence in the accuracy of a reading, usually expressed in discrete decimal powers of 10. For example, a reading of 2.0 is 10 times less confident than a reading of 2.00. The concept of significance used elsewhere in this specification however, is not restricted to decimal and is not discrete.

It will be appreciated by skilled artisans implementing present invention that many different side channel and other attacks are often mounted against biometrics technologies, thus a strong understanding of these attacks and the methods to prevent them is important, such understanding can be obtained through accredited security training or cryptanalysis education.

Billing, Auditing, and Reports

The appliance is configured to return content to the Provider, which is then on-sent to Users, as well as different content being onset to provider administration staff and/or being available to admin staff directly from the Appliance itself. The appliance is programmed to collect usage statistics in a database, and a menu system is programmed in the appliance to provide admin staff with navigation and selection of reports on the collected data. Examples of collectable data include user logins, device types, access times, authentication information such as whether a token just-used was protected by biometrics or not, and if so, what kind, incoming payment notifications from store billing services, token supply and demand, delays and timings, server load and/or traffic, and generally any information about the operation of the system and those in contact with it that Provider administrators my wish to monitor.

Audit Logging

It can be beneficial, especially in the event of a suspected account compromise, to know details of past authentication actions, like for example their dates, times, IP addresses, geo-locations, and other information. Similarly, the monetary or other costs of a security system, access reports for users, access logs, and usage statistics are all useful reports to various people, including Users and Providers alike, as well as security system vendors or affiliates and others. Often, especially when break-ins are suspected or trust is an issue, the integrity of reporting may be compromised or suspected. It is therefore advantageous for security system reporting to be independent of systems or others that might reduce the reporting integrity. This present invention therefore maintains records on a device separate to the system it protects to greatly improve the integrity of this information, and to protect it against destruction in the event of a Provider resource being broken into.

Defending against Active Man-in-the-Middle Attacks (MitM)

One aspect of this present invention teaches how active and/or passive MitM or similar attacks can be detected and/or blocked, including in situations where a deep-packet-inspection (DPI) firewall may be present.

One of the more difficult modern attacks to prevent, is an active man-in-the-middle one. When a user (for example; let's call him Bob) is tricked by someone malicious (e.g. Mallory) into using her fake web site that impersonates a Provider (for example, Azure), Mallory can use this deception to get usernames, passwords, 2FA token codes, & almost anything else she wants from Bob. She can use those immediately on the real Azure site, or even trick Bob into authorizing her session out-of-band if she wants. She can perform actions as if she is Bob himself, and hide or disclose whatever she likes. Among other things, Deep-Packet-Inspection (DPI) Firewalls have, before now, scuttled other attempts to stop Mallory, because both Mallory and a DPI Firewall operate the same way, only their intentions differ.

This present invention blocks active man-in-the-middle attacks, and how it does this is described in the following pages. It also blocks almost all other threats too, like phishing, malware, shoulder-surfing, and even careless or inattentive or unmotivated or unsophisticated users, to name just a fraction, which are covered elsewhere in this specification.

Despite this wide threat coverage, security may be arguably the least important feature: Simplicity, speed, and ubiquity possibly in fact all beat security, because security is pointless unless people use it, so it needs to be easy to set up, easy to use, and easy to install. It needs to be ultra-fast, or users will turn it off, and it needs to work everywhere, all the time, on everything, for everyone, even when users break or loose stuff. If you cannot reliably solve every part of all that, then you'll need to build ways to disable, bypass or avoid, and that's where attacks will come in through.

Alternate Solutions for MitM Problems.

This present invention offers the first and only so far effective protection against active MitM attacks, even in the presence of deep SSL packet-inspection corporate firewalls. (DPI), and it does so using at least two different and separate defenses against MitM:

1. OOBA

Out-of-band real-time actioning (OOBA) is an anti-malware and anti-man-in-the-browser (MitB) defense technology described herein. OOBA is only a partial defense against MitM, because it protects a user against malicious activity perpetrated by the man-in-the-middle, such as monetary theft or resource destruction/hijacking etc., but it does not defend against data exfiltration. OOBA blocks unwanted activity by using a second, independently-secured, channel between the protected server and the customers' security token. Activating this protection requires as little as 2 lines of code to be added by the Provider: the first activates out of band signature generation from the moment of the user's transaction initiation, and the second performs signature-verification at the server. A security Appliance (DS-Appliance or just Appliance) constructed in accordance with this specification, hereafter the "Drake's-Security Appliance" and corresponding software-development-kit (SDK) and/or Application-Programming-Interfaces (API) perform the work required to make those lines of code functional. This protection brings with it additional benefits, including action or transaction non-repudiation, and can be used for other general purposes too (not just Transaction-Verification); in general, anywhere a secure, two-way, rich, real-time, out-of-band user interaction is required, OOBA is ideal.

2. Active Channel Binding (ACB)

ACB correctly defends against all in-the-middle and screen-scraping-style attacks scenarios, both with and without DPI Firewalls present.

Broadly speaking, one method for introducing MitM protection takes advantage of the symmetric session key negotiated to establish SSL or TLS or similar protocols and its property that neither party in the negotiation can force this key to be one of their own choosing. This key is used by both ends of the communication, together with a secret known only to the legitimate two ends, usually pre-shared and not known by a potential attacker in the middle, to compute a new secret, and that new secret is communicated by the other side of the connection over a different channel and used to establish the secure communication. In the event that an in-the-middle attacker or a DPI firewall exists in the connection, such presence is discovered on account of the mismatch between the two new secretes. In the case of the DPI firewall, an option is provided to accept this interception, and a third new secret computed as before, except using both symmetric session keys this time. Should an in-the-middle attack be present, again, the mismatch in new secrets will reveal it. One implementation of the present invention makes use of the computed new secrets to select for display a pair of matching random photographs to the user, neither of which travel over the possibly compromised connection. The user is required to confirm the match to verify the connection security. An example of a users' experience of this protection would be: the user accesses a protected web site, they then see a random photo on their screen, and they then use their mobile phone to find, match, then tap on the matching photo, whereupon their secure connection is verified, this whole process taking mere seconds. If the user ignores the photo, or no match can or does take place, no access is granted (a wrong or missing photo prevents a user from being able to know what photo to tap to log in). Accordingly, when a correct photo is used, true mutual authentication is established (the system proves its legitimacy through display of a photo which only a legitimate system could know, and the user proves their legitimacy to the system through supply of a code associated with said photo, which only a legitimate user knows or has access to). Another, different, implementation communicates the new secret or knowledge of it over a different channel to the user's computer, facilitating automatic channel security verification. An example from a user's perspective would be invisible, the user having previously configured their computer to accept these incoming different-channel protection messages, for example, through the use of an attachable hardware device or through supporting software agents. One manor of using this invention is described as follows.

Actors

Teaching the details of this protection is best done with aid of an example, so we will introduce User Bob, who wants to maintain his virtual server with Provider Azure, and Mallory Malicious, the in-the-middle attacker who can view, modify, substitute etc. traffic in either or both directions, replay old messages, and so on. In our example, Mallory wants to spy on Bob, and erase his Azure instances first opportunity she gets. There are a huge range of different ways Mallory can get "in the middle", all of which are irrelevant to our discussion, but we will choose the most difficult and as hard-to-protect example as possible, so let's assume Mallory has access to a private key of a root certificate authority (CA) cert in Bob's browser and can forge working EV-SSL Azure certificates at will. Let's additionally assume Bob is a new user, so he has to enroll over this compromised channel as well. Bob likes to use Azure from home sometimes, on his new MacBook or sometimes his iPad, and other-times from Work, on his Windows Workstation. His work's security policy forbids the use of USB devices, and all traffic travels through a deep-packet-inspection (DPI) firewall (this is an edge-device which proxies all SSL traffic, using certificate substitution).

This example is deliberately difficult, but others, including lesser ones, may be trivially engineered, for example, Bob might be inattentive, allowing Mallory to "proxy" Azure on a lookalike, but different domain, or he might be using a malicious free wifi connection, and/or he might pay no attention to certificate errors when logging in, or HSTS (if used by Provider) might not be supported in his browser for this connection, or he might be using Azure for the first time over this compromised connection, affording no opportunity for HSTS or similar certificate checks to be used, or the malicious wifi might operate an SSLSTRIP intercept.

While our example is deliberately difficult, it will be appreciated that the protection taught is effective against both complicated and difficult attack situations, as well as less difficult scenarios as well, both for MitM style attacks as well as other attack forms.

MitM Protection

Here's one example of how this present invention, Drake's-Security (DS), protects Bob:

1. Bob visits Azure, but in actuality connects to Mallory, who in turn connects to Azure and establishes her "in the middle" position.

2. Bob sees the following new Azure popup message: "Azure users are now required to enable Drake's-Security protection on their account. Click _here_ to set up". Mallory could if she want interfere with this message, however, the Microsoft servers no longer allow non-Drake's-Security (DS) access, so she has no option but to allow Bob to enroll; the opportunity for Mallory pretend to be bob, and elicit what's needed to enroll on his behalf being defeated shortly. This present invention is purpose-designed to protect everyone and is suitable for everyday users to use all the time, thus it is a preferred embodiment wherein enrolment is mandatory. Enrollment can however be optional, if the Provider is willing to accept tradeoffs, like allowing Mallory (when she has connection control) to downgrade (hide) enrollment procedures or otherwise block as-yet-unprotected users from enabling Drake's-Security protection for the first time.

3. Bob clicks the _here_ link, which generates an SMS message [Azure knows his number] to his phone containing the URL he needs to open on his phone to install the Drake's-Security app (DS-App) on it. Bobs' PC screen displays several alternative enrolment options to cater for any possible situation (e.g.: Bob can't get SMS's right now, or Bob wants to use a different phone or needs to supply his SMS phone number because Azure didn't already know it, or Bob has no phone at all, or Bob already has the DS-App and wants to use it instead of alternatives, or Bob wants to use a 3$^{rd}$ party web service (e.g. Google play or Apple's App Store or Samsung app store or others) to auto-install the DS-App on his nominated phone, or Bob is accessing Azure from a mobile phone and thus able to start the install of the DS-App on it just by tapping, or similar—these convenience options, some which may not be safe over a compromised channel, can be removed if safe enrolment over compromised channels is required). This enrolment PC screen is "active" (e.g. via websockets or long-poll etc. channels)—it knows when Bob's phone gets the SMS (the SMS originating server communicates the fact over said channel), and auto-updates in real-time with relevant-to-the-moment instructions (e.g. "SMS Sent. Open SMS on your phone"). If both Mallory and Bob enroll, Drake's-Security automatically resolves the conflict on account of the DS-App's ability to distinguish between Bob and Mallory on account of only Bob's phone carrying the SMS it sent earlier. Mallory cannot prevent Bob's enrolment, since it's initiated by Azure+Drake's-Security via SMS or through alternative channels outside of Mallory's control, e.g. DS-Client as disclosed shortly.

4. Bob opens the SMS on his phone (or chooses one of the other enrollment options—they all ultimately lead to here, or lead to an equivalent outcome) which contains a custom URL he needs to open on his phone.

5. Bob opens the URL on his phone, which connects to Drake's-Security (this is outside the control of Mallory—she's "in the middle" of Bob's Azure connection, not his phone: If Mallory can also get "in the middle" of Bob's phone connection, the most she can do is cause inconvenience to Bob. Ultimately, phones do not permit rouge app installations, and Drake's-Security apps (DS-App) contain Appliance-assisted protection against imposter apps that might somehow sneak past a store integrity check anyway by including with communications sent from the app to the Appliance an integrity verification code constructed by creating a digest (i.e. cryptographic hash, digital fingerprint, checksum, PBKDF, or the like) of all, or the parts requested by the Appliance, of the running app code and/or its execution environment and/or parameters, variables, and secrets. Appliances can thus recognize imposter apps upon digest mismatches. Drake's-Security is designed to work on all popular smartphones, as well as tablets and smart watches and feature-phones etc. For the sake of clarity, the examples here use "Phone", but "tablet" or "Watch", or even a custom Drake's-Security hardware device are all useable alternatives too. Bob must have a legitimate DS-App to log in, and the app must get a token for Bob from a Drake's-Security Appliance, so Mallory has no option but to permit this action.). Drake's-Security at least momentarily "stamps" this phone (for example, uses a Cookie or connection identifier or persistent connection or persistent-storage value or device fingerprinting other pre-stored or derived identifier) and issues a redirect to the appropriate app store page (e.g. WindowsPhone, Blackberry, iOS or Android, etc.) for the Drake's-Security app download. Bob's PC screen updates when it detects Bob opened the URL (via the aforementioned websockets or long-poll browser channel receiving this information from the Appliance), and shows instructions for how to install the App on the kind of phone it detected he has. These instructions are mere convenience, installation is self-evident, straight-forward, and guided by the phone itself anyway; Mallory stands to gain very little by attacking the PC instructions.

6. Bob clicks "Install", agrees to the legal and/or license details and/or various terms and so forth, and launches the DS-App. In other words—he follows (on his phone) the instruction he sees (on his PC). Drake's-Security also works properly on mobile devices—for example, if Bob uses his phone to log in to Azure, and wants to use this same phone for his DS-App as well, this is supported and secure; and enrollments in this scenario carry the extra possible option bob can choose: "Enroll now, on this phone", which eliminates and/or speeds up some of the steps of the PC+Phone enrollment case.

7. The DS-App retrieves the phone "stamp" (from step 5, which facilitates identification of both Bob and this present Azure account) and downloads an Azure login Drake's-Security token (a payload of random photos, one-time-codes, certificates & certificate generation instructions, and endpoints etc; refer 2$^{nd}$ paragraph of "Tokens and Pairing" on page 72) and binds it to Bob's Azure account. Mitigation exists for the (rare) situations where, for any reason, "stamp" fails or is unavailable, whereby the DS-App itself allows Bob to manually add a new token directly, the new token being obtained either by the DS-App scanning the on-screen QR or similar code, or Bob searching the in-app list of available Providers and selecting the Azure token, then using his PC to inform Azure which token he received, such as by providing his new token serial number by typing it in, or by synchronized bump, or by audio or video or near-field or other means; refer page 86). When Bob's enrolment is normal, step 7 proceeds invisibly and automatically without his participation.

8. Bob's PC detects successful enrollment (via notice over aforementioned websocket etc. channel). If Bob's PC does not yet contain the Drake's-Security client helper ("DS- Client", recommended to be distributed within his PCs operating system itself, for example, in Windows or OS/X or iOS or Android or Linux etc., or sent out via WindowsUpdate or Apple AppStore or Android updates or a Linux repository etc., but also suggested available by other means, like on disc or pre-installed by company administrators etc.), Bob is provided with instructions to download and install this component now. In our example, Mallory's compromised CA access does not include a code-signing privilege, so she has no option (the opportunity for Mallory pretend to be Bob, and elicit what's needed to enroll on his behalf is defeated shortly) but to permit this download. Drake's-Security is still effective and useable without the DS-Client plugin, so for Providers who choose to make this an option for their users, downgrade attacks would then be plausible (e.g.: Mallory preventing Bob's PC from getting the DS-Client helper, or preventing DS-Client helper from being triggered from the Azure web page). Such attacks can be prevented by Azure defaulting to not permit access without the DS-Client helper (this is a safe and reasonable default that will not disenfranchise many, if any, users). If a Provider allows users to decide whether or not DS-Client usage is mandatory for them, Drake's-Security Out-Of-Band Actioning (OOBA) provides a mechanism to safely prevent Mallory from secretly or maliciously changing this setting on Bob's account, by requiring Bob to confirm and verify using DS-App any changes to that setting.

9. Bob is now enrolled. The previous steps require approximately 2 minutes, and about a dozen steps from Bob (click "sign in", unlock phone, open SMS, open URL, etc. . . . ), which is approximately an order of magnitude faster than legacy implementation enrolment, an order of magnitude fewer steps for Bob, and is significantly more secure, among other advantages. Bob now has a Drake's-Security app on his phone, a Drake's-Security backup token (on paper; see next paragraph), and a Drake's-Security DS-Client helper on his PC. Mallory is in the middle still.

Depending on policy decisions made by Azure when deploying Drake's-Security protection, instructions for printing a backup token arrive both after step 8, and/or out-of-band (via email, or via physical distribution). Backup tokens are credit-card-sized printed paper or plastic cards used for secure re-enrollment (e.g.: after phone loss) or by customers with no phones. They are optional, but highly recommended. For the case of email or similar delivery, the backup tokens arrive with instructions for how to print them, as well as how to fully erase the email so that the backup token is not left available for potential revelation to unauthorized users of Bob's email account. In situations where mitigation against the use of stolen backup tokens is desirable, the system is programmed to use OOBA to give Bob the opportunity to deny unexpected access to his account, with the OOBA having a suitable timeout period, for example 5 minutes, after which time backup token usage is permitted. This allows Bob to block unwanted access, as well as informing him of that access and affording him the opportunity to delete the compromised backup token from his account, and the timeout allows Bob himself to still be able to use his own backup token, for example in the event of having lost his phone, to safely log in to his account when that method is needed.

10. Azure now logs Bob out (so he can safely re-authenticate with his new security). From here on, regular Drake's-Security protection kicks in. Bob is now protected.

11. Bob now initiates a re-log-in to Azure. Technically, his browser connects to Mallory, checks certificates, and uses TLS Handshake Protocol to generate a number of things, including eventually a secret session encryption key which is based (as per TLS or SSL or similar protocol, hereafter called just "TLS", but which may be any like protocol) on random data supplied by both Bob's machine and Mallory's. The TLS handshake protocol prevents either Bob or Mallory from individually determining this secret, because it is mutually based in part on random data supplied by each end. This established TLS connection initiated by Bob and the session data and certificates contained in it, together with a DS-Client digest (described later), are collectively now called the B-TLS-Session (B—for Bob). Mallory, in the middle, in turn establishes a connection to Azure, the outcome of which generates, as for Bob, the data we now call the A-TLS-Session (A—for Azure). Hereafter, "B-TLS-*" represents a Bob outgoing connection, and "A-TLS-*" an Azure connection. TLS prevents Mallory causing either Bob or Azure to generate a secret that matches the other. If Mallory was not in the middle, the secret would match of course.

11a. Bob enters his Azure-username, and his password (password entry is a policy decision left to the Provider to decide—passwords can be required, or optional, and can be entered either before, or after, Drake's-Security protection has taken place), and clicks "Sign In". The sign-in action (or the action of loading the sign-in form, or a subsequent redirect, whichever is easier for the integration process) triggers Bob's browser to contact (locally) the DS-Client (or DS-Client monitors the browser itself), which obtains (or is properly supplied with) the B-TLS-Session data and Bob's PC-username (e.g. from his operating systems login). If SSL-Strip is present (or Bob is not using TLS for any other reason), DS-Client ends here (it detects no B-TLS-Session data, which terminates Bob's ability to proceed). Thus, Mallory is forced to talk TLS to Bob, in order to attempt to continue her attack. DS-Client contains asymmetric cryptographic routines which perform cryptography through the use of either static or dynamic public and private keys.(lt is simplest to think of the Drake's-Security protocol using public and private key terminology, but keep in mind that literally doing so may leak machine-identifying information, so it is preferable to use either a nonce key equivalent, or for DS-Client to use a new pair of public and private keys for each connection, their safe exchange being possible on account of DS-Clients pre-existing knowledge of the public keys for Azure or it's Appliance.) DS-Client generates a signed packet containing the certificate information found in B-TLS-Session, its own public key, a nonce generated with the TLS session secret, and a hash (aka digest) of the nonce with Bob's user ID. This packet is called the B-TLS-ID, and is provided to Azure along with Bob's form data when he clicks the "Sign In" action. If Mallory also attacks Bob's SSO (live.com), she has now stolen his Azure credentials, and the B-TLS-ID (if password theft is undesirable, the password can be avoided or entry of it delayed until after Drake's-Security protection, but keep in mind the reason for needing Drake's Security in the first place, which is the general modern uselessness and insecurity of ordinary passwords, thus rendering it almost a complete waste of time to expend extra effort attempting to protect this broken idea of password safety anyway). The opportunity for Mallory to "screen scrape" (e.g. use her own PC to contact Azure, relaying everything she sees on her screen over to Bob's screen) and use her own local DS-Client with Bob's data is defeated shortly.

12. Azure at this point has a TLS connection established with what it assumes (wrongly) is Bob. Due to the nature of the TLS session establishment, it is not possible for any in-the-middle attacker to be surreptitiously involved in this connection. Mallory's attack requires her to establish 2 TLS connections—one coming in from Bob to her, and a second one going out from her to Azure. TLS establishment protocol prevents Mallory from letting Bob connect directly to Azure in any way that lets Mallory interfere with the TLS traffic or observe its plaintext. Unless Mallory is screen-scraping, Azure knows that something is wrong (because the B-TLS-ID contains Mallory's certificate, not Azure's), but Azure is probably powerless to do anything about this (for example, maybe it's a certificate from Bob's Work's deep inspection firewall—Azure might not know this yet). Since Mallory controls this connection, even if Azure wanted to use this connection to tell Bob about the mismatch, Mallory is in a position to suppress anything Azure might say here.

12a. Azure checks Bob's account, sees that he has Drake's-Security enabled, and notifies the Drake's-Security Appliance that a login for Bob is taking place while sending it A-TLS-ID and B-TLS-ID as well. Note that the Drake's-Security Appliance has no knowledge of Azure user identities—Azure actually sends the Drake's-Security Appliance any salted/hashed/encrypted unique identifier for Bob that it so chooses. The Appliance operates on a "need to know" basis only—nothing that it doesn't strictly need to know, needs ever be provided to it.

The Appliance detects a never-before-seen DS-Client inside B-TLS-ID, so requests (through Azure) Bob's PC to activate binding, and Bob's PC to bind DS-Client. DS-App on Bob's phone receives an incoming OOBA that tells him to minimize his Browser window, then enter his PIN number shown in the bottom-left-corner of his PC screen alongside his PC username. Note that alternative embodiments may function in reverse, where a PIN from a device is provided to the PC, rather than the other way around. DS-Client, on receiving notice from Azure, auto-minimizes Bob's browser, and draws one or more PIN numbers on Bob's PC screen, preferably using techniques not available to a browser application, like for example writing this information directly over the top of the "Start" button area on a Windows desktop O/S. Preferably, more than one PIN is drawn, and Bob's PC account name is drawn alongside the correct PIN Bob must use, while decoy usernames and decoy pins are preferably also drawn, to help ensure Bob looks for the correct one. Both these technique help prevent Mallory from tricking Bob into entering her PIN in the next step, since Mallory does not know Bob's account name, cannot control his PC screen, and cannot talk to him with his browser minimized. Bob is asked to minimize his browser even though DS-Client does this automatically, to defeat situations where Mallory may attempt to block DS-Client from doing this itself.

Bob puts the PIN in his Phone, which binds (e.g. allows the Appliance to associate) his PC and username to his Azure account (or in the alternative, in the case of all components being present on the one device, for example, a phone or tablet, they may user inter-process communication to automatically exchange this information). Mallory cannot prevent the DS-App instructions (They go to Bob's Phone), but she can attempt to use what's in Bob's browser to scam him into entering a wrong PIN. This is why DS-App tells Bob to minimize his browser. DS-Client on-purpose draws the PIN directly on the desktop (and dims it) and also uses Bob's PC username, because each of these actions defeat Mallory (she cannot do or know these things). It will be appreciated by one skilled in the art that numerous different means exist on a wide range of computers and operating systems to perform actions and convey information to Bob in ways that are difficult or impossible for an in-the-middle actor to recreate.

Mallory is prevented from enrolling on Bob's behalf, because she cannot trick Bob into entering her own PIN into his phone. She also cannot enroll her own phone, because the DS-App install went via SMS direct to Bob already.

15. At this point, Bob's PC is now bound to his Azure login (he will not need to re-bind unless he uses a new Azure account, a new PC username, or a new PC). Binding need not reduce privacy (DS-Client does not leak identifying information nor unique codes that might allow "Bob Discovery" by 3rd parties.)

16. Azure checks Bob's account, sees that he has Drake's-Security enabled, and notifies the Drake's-Security security Appliance that a login for Bob (preferably protecting his identity as earlier described) is taking place. This initiates a PUSH notice to DS-App on Bob's phone, which opens (preferably immediately, wheresoever supported by the device O/S) to show Bob a grid of random photos. The PUSH notice contains nothing sensitive—it is merely a convenience feature that auto-opens the Azure token Bob is about to need. If the notice doesn't arrive, Bob can manually open the same token himself.

17. Having identified a Drake's-Security-protected login, Azure requests a photo-selection code, P-SEL, from the Drake's-Security Appliance. The request for this P-SEL code sends to the Drake's-Security Appliance the incoming B-TLS-ID from Bob, together with the A-TLS-ID from Azure (in the case of a direct un-attacked connection, A-TLS-ID and B-TLS-ID would contain much of the same information, excepting any IP address adjustments possibly inflicted by NAT in-between). The Drake's-Security Appliance remembers the *-TLS-ID connection data, selects one photo at random (the login-photo, LP—for the sake of example, let's assume this is a thumbnail photo of a close-up picture of a juicy red strawberry, and it's index happens to be the 42nd photo out of 30,000 that is stored in DS-Client). This photo is chosen randomly to be one that is known to be present on Bob's enrolled Drake's-Security token, which lets assume for the sake of example contains a selection of 10 different photos from the aforementioned 30,000, one such photo being the strawberry, photo 42. The Drake's-Security Appliance computes a selector P-SEL for this LP photo and encrypts this to the DS-Client public key, or similar mechanism, provided in B-TLS-ID. The selector is based on the index number of this LP photo (e.g. 42) as stored in DS-Client on Bob's PC, such that DS-Client can identify the actual LP Photo (index 42) from the output of a cryptographic operation based on A-TLS-ID and the LP photo selector P-SEL and the DS-Client public key (or similar) from B-TLS-ID. In other words, DS-Client knows how to turn P-SEL, when combined with A-TLS-ID and the cert from B-TLS-ID, into the index number 42. Mallory cannot determine the 42, because P-SEL is encrypted to DS-Clients public key (from B-TLS-ID). She could, if she wanted, attempt to substitute her own fake DS-Client keys into the transaction, but Mallory cannot control the B-TLS-ID that DS-Client is going to use to compute the LP photo index from, nor can she prevent the Drake's-Security Appliance from including the public key in the computation, so she has no better than 1 in 30,000 chance of succeeding with this attack (less, if you consider that Azure is already aware of Mallory, and so can take action to lower those odds if so desired, such as, for example, requiring two consecutive correct photo taps; that's odds of nearly one in a billion against now).

18. The LP-ID (random login photo ID) from the Drake's-Security Appliance is sent by Azure to Bob in his browser. Mallory is free to steal, change, or block this as she pleases of course, but Mallory does not have the DS-Client private key so one thing she cannot do, is decode the Index. The LP-ID contains is a photo-selector index that is provided by Bob's browser to the Drake's-Security client helper (DS-Client, see details next step) and used to select a random photograph to display (locally, thus, not steal-able by Mallory) to Bob in his browser (ideally, DS-Client is programmed to use video-passthrough or other techniques that prevent browser scripting from recording screen pixels etc. for theft). A-TLS-ID is used later, for the deep-inspection firewall case; see step 25. By way of example, the local photo displayed to Bob by his browser (which comes from DS-Client) in the case of an un-attacked connection is the close-up of the juicy red strawberry. The DS-Client preferably contains a large expandable library of free or licensed non-offensive, non-controversial thumbnail photographs. In a non-attacked scenario, Bob taps the matching strawberry on his phone to complete the login, but bob is under attack—so here's what instead happens:

19. The DS-Client receives LP-ID (the incoming photo index and A-TLS-ID), together with Bobs' browsers' TLS connection data (B-TLS-ID), locally from Bob's browser. The photo index is decrypted using the DS-Client private key, and hashed with B-TLS-ID to select a photograph for display. This is the equivalent (or reciprocal if encoded that way) operation the Drake's-Security server performed earlier, when it chose the red strawberry photo. Because the A-TLS-ID is different from the B-TLS-ID, this results in the display to bob of a different photo (there is a 30,000-to-1 (expandable if needed) chance against Bob seeing the strawberry). Because the Index is encrypted using asymmetric keys (or nonce equivalents), Mallory is unable to decode or choose this ID.

20. Mallory is blocked. She can't find out what Photo bob should see. If she wanted to trick Bob's PC into showing the correct photo (which may enable her to hijack his session), she would need to be able to control the B-TLS-I D. While she does know what B-TLS-ID is supposed to be (because she is connected to Azure herself with her A-TLS-ID), TLS does not let her pick the session key negotiated with Bob, so she is unable to trick bob's PC into showing the correct photo either. Depending on whether or not a key or nonce is used for DS-Client, Mallory may be able to substitute an earlier replay (Unlikely, since the TLS session is almost always going to be different now, to when the original (un-useful to Malloy anyhow) data was captured.), but this is pointless, as it merely would trigger the display of a different, still-wrong, photo. Notwithstanding that, Drake's-Security uses random (change after every successful use) photos to prevent other kinds of replay attacks as well.

21. Bob will see some other random photo from the library of 30,000. For the sake of example, let's say he sees a surfboard. Bob's phone is showing a small number of random photos, none of which is a surfboard, so Bob is blocked from proceeding. This is one important aspect of Drake's-Security. There is no possible way that Bob can continue at this point. He needs to tap on a photo to log in, but there is no match for the photo he needs. One of the greatest threats to authentication technology is user error. Drake's-Security protects Providers against careless users. Even if Bob was totally careless (or just unmotivated or unskilled), or he wanted to give someone else a way to attack him, at this point, he simply cannot.

22. The above was Bob's experience from home.

23. From work—Bob's experience is different. The deep-inspection-firewall sits in the middle. Let's first examine how he logs in despite this interference, but without Mallory in the picture:

24. From work, on the first use, Bob arrives at step 20 exactly as he would in the presence of Mallory. He (correctly) sees a wrong photo, because the firewall itself sits in-the-middle. If Bob's Azure token policy in his Drake's-Security app permits deep inspection firewalls, his Drake's-Security token will additionally display one extra option: "No Such Photo". This is the option Bob selects on his phone.

25. Mallory can now live in 2 different places: either between Bob and the Firewall (an Inside attack), or between the Firewall and Azure (an outside attack). Mallory could in principal live both inside and out, e.g. if someone at Bobs' work really messed up.

26. We are in the following situation: Bob's PC knows the B-TLS-ID (which includes the certificate information of the deep inspection firewall bob should be connected to. If he's connected to Mallory, it will be her certificate, not the firewall). Bob's PC also knows the A-TLS-ID, (communicated back earlier from Azure). B-TLS-ID has been communicated to Azure (signed by Bob's DS-Client key, thus untamperable by Mallory). Azure knows from where Bob is connected (the incoming IP address and A-TLS-ID of Bob's companies' firewall, or perhaps Mallory). Inside the B-TLS-ID is the firewall's certificate, or Mallory's forged certificate.

27. Bob's decision to tap the "No Such Photo" button triggers the Drake's-Security server to communicate an OOBA request to Bob, which displays to him the identity of the device he is connected to (the firewall certificate, from B-TLS-ID), and requests his permission to continue the connection, allowing the firewall access to his TLS traffic. Bob can choose to "Approve" or "Deny" this action (deny merely terminates). When bob taps "Approve", this triggers the Drake's-Security Appliance to generate a new P-SEL ID. This time, the ID makes use of both the A-TLS-ID and B-TLS-ID session data to construct an image selector for DS-Client to display. This new ID is sent to Bob's browser, and so long as Mallory is not "in the middle", Bob will now see the red strawberry photo at last (for the sake of this example, we again assume this photo is the one needed for a login.). If Mallory attacks from inside, Bob's OOBA will show a wrong certificate (not the real firewall). If any non-intercepted authentication has previously taken place from Bob's company to Azure, then Azure will also know what a real firewall certificate should look like. In these cases, Azure can make a policy decision on whether to block Bob entirely (not send the OOBA to permit the connection), and/or to send him a more dire warning over OOBA about the Mallory attack currently detected. If Mallory attacks from outside, Bob's DS-Client will detect this, since A-TLS-ID will not contain the expected outgoing connection from Bob's firewall. If again a previous non-attacked authentication from Bob's company to Azure has taken place, Azure itself will additionally be able to detect Mallory in the middle, and again can take appropriate action over OOBA.

Mitigation for the unlikely event that Mallory is attacking inside using a stolen firewall certificate is possible by introducing Drake's-Security firewall extensions which communicate B-TLS-ID data to the Appliance, thus revealing any mismatch in session keys that would be unavoidable by such a Mallory.

28. Ultimately, when Bob taps the strawberry photo on his phone, the Drake's-Security app communicates (securely) the code associated with said photo directly to the Drake's-Security Appliance, which tells Azure to allow Bob's login (Bob's browser auto-navigates at this point to the logged in resource, on account of using websockets or long-poll etc.). The Drake's-Security App uses its own public cryptography or the like over the top of its SSL, and so is itself protected against MitM attacks as well.

29. Future Bob logins go like this:
a) Bob loads Azure
b) Bob taps photo

That's fast: just "one tap" to log in, taking mere seconds.

In situations where MitM prevention is not required, it will be appreciated that, through the communication of photos over Bob's browser connection, Bob's login experience may be identical, or nearso, to this "one tap" authentication method.

Concept Summary.

The problem Bob faces, is how to prevent someone (Mallory Malicious) between him and Azure tricking him into a login. This needs to work too, when there is something else (legitimate) in the middle—e.g. his deep-inspection firewall (DPI).

Present invention discloses an elegant solution where Azure can (a) get Bob's PC to display something that Mallory is unable to determine, and/or (b) unable to emulate (preferably both), and which is useless if manipulated by Mallory. Since Azure has means (DS-App) to get an (c) unalterable message to Bob and (d) to get an uninterceptable reply back from him, we can defeat Mallory.

Mallory's defeat is made possible by Drake's-Security because we use Bob's PC username (unavailable to browsers, and thus not auto-discoverable by Mallory) for "(a)", and direct screen drawing (outside of the browser window and thus also outside of Mallory's control) for "(b)", and our out-of-band (OOBA) system on Bob's phone to send and receive Bob messages; "(c)+(d)"

Some Terms from the Concept Summary and Throughout:

DS-Client: This is a desktop and browser helper add-on that runs on Windows, Mac, Linux, iOS, Android and other O/S's, and Chrome, Safari, IE, and other browsers to provide cryptography and "outside browser" security context which defeat emulation-style in-the-middle attacks, e.g. screen-scraping.

DS-App: The mobile or other app component of Drake's-Security, which runs on the users' phone, watch, tablet, hardware or other device. This app contains one or more Drake's-Security tokens, mechanisms to enroll and manage tokens, facilities to communicate locally (in same device) with Drake's-Security protected resources, to receive PUSH or other out-of-band or similar message notifications, interact with the User, communicate with Appliances, manage updates, signing, cryptography, and other features.

DPI: Deep Packet Inspection (firewall). An "in the middle" network edge-device which proxies plain and SSL/TLS or similar traffic, usually using certificate substitution, usually in order to prevent incoming malware, and outgoing data exfiltration or enforce company IP/communications policy.

OOBA: Out-of-band real-time actioning. This is primarily when a user's mobile device responds to an incoming notification (e.g. PUSH, SMS, etc. message), and displays details of an intended action or transaction or other message, and contains a facility to request a user response and digitally sign it using keys associated with a token, and convey the signed response to an endpoint such as an authentication appliance of a Provider. Users can have more than one token, which can be present in more than one device, and no device fingerprinting or personal data or other privacy reducing identifiers are required. For example, Bobs use of present invention to protect himself with Provider X, and also to protect himself with Provider Y, does not facilitate a situation where one provider can, through collusion with the other provider, ascertain that Bob is a user of said other Provider. Secondary support for OOBA without using mobile devices or PUSH is accomplished via delivery over existent channel of action details by embedding them in image formats to hamper malware interference, and accepting human responses using click coordinates. OOBA messages can be programmed to rely on keys or session secrets established via an earlier mutually-authenticating login or similar step, thus extending the protection of mutual-authentication to out-of-band actions.

DS-Client digest: It is useful to server resources to re-identify User machines on subsequent accesses (or the corollary, to warn users when new machine accesses are encountered, since this is another way to help defeat in-the-middle and other attacks), but it is also desirable to prevent such re-identification from leaking User privacy information. See the case of example provider X and Y in the previous, and also another example, in the case of the User Bob who may wish to maintain two separate and different identities with one Provider, but not wish for that Provider to be able to determine he is one and the same user. Thus we program DS-Client to use all or some of the following items, depending on the level of privacy desired: the login identifier (e.g. username) of the User, the URI or similar identifier of the Provider resource, the account name by which the User is logged in to his local device with (e.g. if he's on an iPad, his account name might be "Bob's iPad", or if he's a child using his mother Nicole's PC, this account name might be "Nicole"), a universally unique identifier for the instance of DS-Client in use, a random or similar salt stored locally only and associated with one or more of the foregoing items (so as to prevent Provider dictionary attacks from ascertaining private information), a binding PIN. The foregoing items are used all or in part to produce a digest (for example, using a PBKDF (preferably) or a hash on them), and the digest included with zero of more of the foregoing to generate the DS-Client digest.

Long-Poll: This is where a browser makes a request to a server for some information, and the server accepts the incoming request thus opening a communications channel, but the server does not immediately return a response over this channel; instead, it waits for some other event to take place the completion of which feeds the server with a response allowing it to send back the information needed by the browser, at which point the server finally serves back a full or partial response to the browser. The effect of this mechanism provides a way for a server to feed real-time event-triggered data back to a web browser without making the web browser repeatedly issues multiple futile (on account of event response not yet being available) requests. This mechanism can be used to emulate, replace, or as a fallback to, modern websocket techniques, and long-poll can be effective both with or without scripting support by a browser, and across multiple different types and versions of browsers.

PBKDF: Password-Based Key Derivation Function; e.g. bcrypt. A method of generating an output key from an input value which makes it computationally difficult for a dictionary attacker to guess the input value from knowledge of the output key. PBKDF is usually far more computationally intensive and secure than salted hashing techniques.

PUSH: a mechanism to deliver a notice to a device not restricted specifically to incoming network-based events. Notices include but are not limited to incoming Windows Toast messaging, Apple Push Notification service (APNs), Google Cloud Messaging (CGM) or Cloud-to-Device Messaging C2DM, or any network originated data delivered in real or near real time to a portable device, or using sonic or ultrasonic audio with microphones, or QR or other barcodes or other detectable methods with cameras, or near-field-communications (NFC), or radio communications (e.g. Bluetooth or beacons), or infrared, or other device sensors for example magnetometers in conjunction with magnetic transmitters, or SMS Text messages, or synchronized accelerometer event pairing for example striking a physical "enter" key on a keyboard with a mobile phone, or other communications channels besides the foregoing. Messages can additionally be secured through the use of cryptography to ensure they cannot be acted upon by others or tampered with or replayed etc.

Video-passthrough: is when a screen region is chosen for displaying graphical elements, by drawing a blank box of a solid (but not actually made visible) color on the screen, and video hardware is told to overlay that blank box with the graphical elements for display (the intended purpose for this is to allow powerful video hardware to draw effects not ordinarily possible by a regular computer CPU, such as for 3D gaming applications); Malicious code which might wish to steal these graphical elements from the screen is prevented, because only the blank box is visible to said code—the actual graphic elements themselves being supplied transparently from video device hardware, which is out of reach of said code. Other similar techniques are available, such as many which are designed to preserve media copyright or others supporting rights-management protection, all of which serve to block code, e.g. scripts in browsers, from exfiltrating image data taken from a user's screen. This present invention introduces the concept of using Video-passthrough on security-related display elements to protect them from theft by malicious code.

A screen-scraping style of attack is one where Mallory performs all actions that Bob would normally perform, by stealing (in real time) everything she needs from Bob to do this, and where necessary, emulating what she experiences on her own computer/screen remotely into Bob's browser. It need not be a perfect attack, just good enough to trick Bob. Defeating this attack requires Drake's-Security to take some action on Bob's computer, that is impossible for a web browser (being how Mallory is attempting to dupe Bob) to do. For example; Drake's-Security accomplishes this task by using the DS-Client program running on Bob's computer, in conjunction with the DS-App running on Bob's phone [being outside the control of Mallory]. DS-Client makes use of one or more things any web browser cannot do; (a) Know the user's logged-in username, and (b) Manipulate Bob's whole PC screen, and draw a code onto it which is outside the web browser canvas. Azure uses OOBA to send an instruction, for example, "Enter the flashing code from the bottom leftmost corner of your PC screen that corresponds to your logged in computer username" to Bob's phone, and his phone contains an input box and submit button. The DS-Client freezes the entire PC display and optionally dims it, and displays 3 flashing random PIN numbers on the bottom left, over the top of the existing desktop view (that is to say, in Windows, it draws the codes over the top of, and partly obscuring, the windows "Start" button section. Random decoy names and PINs (to force Bob to think) are included along with the username of the logged in user and the binding PIN Bob needs to key into his DS-App.

Automated alternatives exist when technology environment permits; where Bob clicks his username (in DS-Client or DS-App) to trigger DS-App to auto-bind.

The problem Bob faces, is how to prevent someone between him and Azure tricking him into a login. Thus present invention presents a solution wherein Azure can get Bob's PC to display something that Mallory is unable to determine, and which is useless if manipulated by Mallory. Preferred Implementation Methods.

Some detail of assorted methods to help authors and others practicing the techniques taught herein to realize aspects of present invention follow. They are not exhaustive and are not limiting and should be read in conjunction with the entirety of this disclosure in whole, not alone.

1. Preventing in-the-Middle Attacks on a Communication Channel.

There are two main kinds of in-the-middle attack (they're technically the same, but humans tend to think of them differently); one where a machine operated by a Criminal attaches in-between a potential victim and their provider, and one where a victim is tricked into attaching to a Criminal, and that Criminal then connects, on behalf of the victim, out to the provider—this might be automated, or as simple as a human with 2 web browsers doing copy-paste or other another screen-scraping style attack. Either way, the victim thinks they connected to the provider. There's lots of different ways to establish an in-the-middle (e.g.: lookalike domains, rogue Wi-Fi, physical wire intercepts, etc.); the following solution blocks them all.

The user requires a custom security agent software program installed on their PC or browser. This agent is programmed to do things a normal web browser itself (or a remote provider via nearly any means) cannot do, like request elevated/Administration privileges, or draw directly on the screen outside of the browser, or read the User's environment to determine the name they used to log in to the computer with. The agent also has a pre-shared key (symmetric or asymmetric) where the counterpart is known only by the Provider, and the agent can read the SSL/TLS/etc. session key.

The web browser makes it's normal secure outgoing connection to what the User believes is the Provider (but which may be intercepted by a Criminal); this results in a session key (it's part of the TLS/SSL/etc. browser protocol).

at this point, both the server and the agent both take a hash (or encryption) of this session key with their pre-shared key, and each send the result to the other.

Each end can now compare what they got, with what they computed; a mismatch indicates that an attacker (or proxy) is in the middle. The "in the middle" person cannot simply send the answers to the other party, nor can they compute a correct answer themselves: yes, they know both of the 2 different session keys (the User-to-Criminal one, plus the different Criminal-to-Provider one), but since they don't know the pre-shared secret: they cannot hide.

2. Denying the Effects of an Attack.

Following from above, the Provider or the User's agent can be programmed to take action when the shared computation does not match. For example; the agent can be programmed to deny further access to the Criminal, and perhaps warn the user, or the Provider might block the incoming connection it has with the Criminal—either way, one end or the other is now programmed to deny the User from continuing with whatever attack the Criminal had planned.

3. Using Public and Private Keys to Block Man-in-the-Middle Attacks.

Again, agents are used but this time, in the past and prior to the connection, a pair of asymmetric keys have been generated and the public versions shared with one or the other or both of the User and the Provider. The safe exchange of these keys is taught.

Flow proceeds with the connection and session key establishment, but this time the User's machine encrypts the session key (or preferably a salted hash of it) and sends the encryption to the Provider. The provider uses the corresponding key to decrypt this, which reveals an attacker if it doesn't match their own, which allows the Provider to take action at this point if it wishes.

4. Provider taking Action when Attacks Detected.

Following from above, the Provider is again programmed to deny anything that it doesn't want the attacker to get involved with.

5. Provider or User Retaliation in Event of Attacks

It can be useful to track or disable attacking infrastructure or take other actions, so when either end detects a transformation (session key) mismatch this si where things that would ordinarily not take place get programmed, like warning a network-operations about the rouge endpoint, adjusting firewall rules to block the endpoint, examining endpoint traffic or logs for evidence of other victims, fingerprinting the endpoint to block it again in future should it turn up, and so forth 6. Mitigating in-the-Middle Attacks while in the Presence of a DPI Firewall Sometimes there is already something (good) "in the middle" which would interfere with each endpoint from using earlier methods to defeat an attacker, so to accommodate this, we add some more steps; it is programmed as follows:

The User connects securely to Provider (which in this case is intercepted by the DPI firewall or other content-inspection or intermediate device, so in reality, two connection get made; User to DPI, then DPI to Provider). The accepted way to do this is for the DPI root certificate to be present in the User browser, and to facilitate the connection, the DPI uses (or generates) a substitute certificate in place of the Providers real one. Symmetric session keys are established as usual (two this time—one for each connection).

A user helper agent computes a key transformation (e.g. salted/hashed or encrypted version of the session key) using a key for which the Provider has the counterpart, and securely exchanges it with the Provider (adequate knowledge of how to securely exchange information with a counterpart sharing a key is one of the prerequisites for using and understanding this invention; see "assumed skills". When a mismatch is revealed, the User (or a mechanism on his machine, e.g., a DPI-firewall vendors approval sub-mechanism or other automated genuine-certificate acceptance solution) is given the opportunity to peruse the certificate (that was used when establishing the connection and symmetric key for it in the first place) or info from it of the intermediate machine, and can choose to permit it in the middle, or "reject" it (e.g. discontinue with the connection, or block attackers, etc.).

7. Securing Users behind DPI Firewalls against MitM Attacks

When the intermediate server above is a DPI firewall, it can be itself programmed with an agent for performing anti-MitM as well; thus is can be seen that the User and Provider are protected against attacks on either of the 2 different connections established in this situation, e.g. between the User and DPI, and between the DPI and the Provider 8. Asymmetric Cryptography for 3-Party MitM Blocking A User and Provider can have public and Private key counterparts with one another, so that asymmetric cryptography can be used for transforming the session key for exchange, when the Provider and the User have pre-share knowledge of a key 9. Pre-Shared Keys for 3-Party MitM Blocking Both hash and symmetric cryptography can be used for transforming the session key for exchange, when the Provider and the User have pre-share knowledge of a key.

Combinations of asymmetric and/or symmetric allow for perfect-forward-secrecy should such protection be additionally required here.

10. Blocking Attackers in a DPI Environment

When a detected mismatch is blocked either by the User or the DPI firewall, connection or communication with the imposter machine can be rejected at this point (or any point thereafter if it's useful to continue a bit further for any reason; eg—hiding from the attacker the fact that they have been detected). It is advisable to reject feeding genuinely sensitive data to attackers, e.g. real usernames and passwords, but there can be many different processes for mitigating the attack)

11. Detecting Malware Attacks against Apps and Software Agents

Since Providers typically have many users, and since modern attacks nowadays regularly target the users and their systems and software, and in particular do this using viruses, APT's, trojans, spyware, and in general any malware, responsible Providers wishing to better protect their users against evil being perpetrated n the Users can elect to perform integrity checking of the security apps and agents in use by the Users as well as the environment they're running in, as a means to uncover this Criminal activity. "Agent" in this section includes Applications like smartphone Apps as well.

Agents of this invention are programmed to accept incoming request from a Provider where the request instructs the agent to perform an "integrity" check upon itself. It's not really a check—it's merely a digest or a hash (if it was a check, the malware would be able to simply disable the check). In a preferred mode, this digest includes the instructions that make up the agent that is performing the check, as well as environmental areas for this agent, such as variable storage memory areas, execution stack, and where read-access is permitted, operating system or other areas as well. It can be seen that since the Provider instructs the agent which parts to include in the digest, with the principal being that it's rarely ever the same portions (e.g. multiple different location and offsets of varying lengths are instructed) of those parts, it makes programming malware to emulate real agents very difficult.

The agent sends the digest (e.g. a hash, checksum, encrypted and/or salted version of those, or anything in general it has been instructed to check) back to the Provider. Thus the provider is able to "snapshot" arbitrary parts of remote agents and their environments in a reliably repeatable (if it so chooses) way, thus is can build up a database of "correct" digests from known authentic agents, or even just collect many digests and look out for uncommon ones, or look out for digests that change unexpectedly over time.

For example; imagine 2 people wanting to ascertain (over the phone, let's say, and without necessarily reading every single word to check) if they each have an identical copy of a book; one could ask the other to add up all the words, and if it's the same number, it's probably the same book, but an attacker knowing this, could remove a word for each new word he inserts, so imagine now, that these 2 people agree on which pages to use or to skip, and which sentences, and how many words into each sentence to start counting from, and for how many, and it's the number of vowels, not words, they're comparing. This now makes an attack impossible, because the attacker cannot know in advance (since exactly which bits will be checked changes each time a check is made) what bits will be looked up, which make any change to any bit likely to be discovered.

If a digest from an agent of unknown authenticity matches a digest of one known authentic, we can know with good confidence that the unknown one is probably authentic.

12. Remote agent Authenticity Checking, Absent Environmental Indicators

If for any reason environment cannot be used (e.g. is forbidden by device enforcement or policy or privacy reasons) a still-valuable digest is possible over just the remaining portions.

13. Remote Agent Authenticity Checking, Absent Code Integrity

Similarly, should it not be possible (or allowed) for an agent to digest its own instructions, a still valuable digest is calculable over the executing environment only.

14. Variable Technique Remote-Agent Authenticity Checking

It is also possible to construct some executable code, instead-of or as-well-as the portion indictors, for delivery to an agent. This provides a mechanism to defeat sophisticated emulation and virtualization attacks from finding ways to attempt to emulate the digest forming routines. Including processor flags, event timing, exception handling, and other anti-reverse-engineering techniques within the code sent to the agent, a very strong digest indicator of agent authenticity can be determined.

15. Rejecting Inauthentic Remote Software Agents and Apps

When digest mismatches are found, steps can be taken to mitigate the problems of rogue remote agents or environments, usually including at least rejecting or preventing at some operation that an authentic agent would otherwise be allowed to do (e.g. sending back an approval for a bank cash transfer for example)

16. Electronic Mutual-Authentication Security Tokens

As disclosed, tokens for use in apps include at least one randomly-selected photograph (it would normally be more than one, however, since blind people cannot see photographs, we use just one photograph for them, relying instead on the biometric device protection, second-device protection, and channel authenticity indicator of software agents to protect these people; because when only one photograph exists, it will always match for them, thus they do not need to see it to match it). Providers need to know what photos they gave out, so they normally maintain a large database of many different images for this purpose, and it's the provider which chooses these photos for the token—not the user (because users might pick photos that Criminals might be able to anticipate, which may slightly weaken the opportunity for otherwise blocking imposters).

Each photo has one or more (in this best more, each has two) random codes associated with it, one for the user to type in in the event the app for some reason cannot automatically provide it (e.g. refer FIG. 2.), and optionally a second much larger code which the app sends through one a photo-tap, usually also encrypted by the app when so sending.

Besides those minimally required pieces, ideally soft tokens additionally include, where possible, some of: encryption keys; encryption salts; authentication Appliance endpoint URIs; serial numbers; pairing-assistance URLs; QR codes; provider name; provider logos; provider support staff contact information; notes; policy rules; layout and formatting information.

They are also, where possible, encrypted by a password that the user knows or chose, or encrypted using keys generated or protected by biometrics, or if no biometrics key facilities exist in the device, using system protection, which is usually extra code which only runs when a correct biometric match is found. Note that usually when biometrics is used, encryption with a password is also used as well, as an alternative, in case the biometrics fail to function one day in future.

17. Automatic or Enhanced Mutual-Authentication Soft-Tokens

Selecting a combination of three or more of those optional components allows for soft-tokens to have robustly enhanced capabilities—for example—URI's allow them to function automatically with taps, QR codes allows fast and easy enrollments, and policy rules help enforce security, like the use of biometrics.

18. Encrypted or Protected Mutual-Authentication Soft-Tokens

All the parts making up a soft-token are encryptable digital assets, so it is preferable to encrypt them with a password and/or biometric key or to place them under control of a biometrics process to help stop them getting stolen or found. This is done under control of the app software, and when security operations require the token data, the app software is programmed to get the password or key or biometric permission in order to access the token components required.

19. Enhanced Mutual-Authentication Printed Security Tokens

Printed security tokens can be use instead of soft-tokens, and they can also be used to help with soft-token acquisition, and as spare or backup or alternative tokens and to safely get new tokens with. A preferred physical token has printed on it a serial number (e.g.: 3 groups of 4 numeric digits so they're easy for users to type in), and a barcode (e.g. those same 12 digits, in EAN format) or even better a QR code (which ideally encodes the serial number as a parameter to an https web URL). They also include random images (photos), like the soft-tokens do, but hard-tokens have only one random code per photo, each being fully and uniquely associated the photo it belongs to, such as by printing the code over the lower half of the photo itself (e.g. refer FIG. 4). The selection of images and codes is made by the Provider or (issuing entity for it) prior to creating the physical token to contain these images and codes etc. on it. It can be seen that positioning the code on the photo, and having just one code per photo, most users will be able to quickly understand how to use the code and which is the correct code with little or no training in almost all circumstances, and careful arrangement of the input screen for them so it matches the approximate layout location for this code further improves this understanding (e.g. refer FIG. 7).

A token admin screen is made available to the user (or provider admin) so they can enroll new tokens with the users account at a provider by simply typing or scanning the serial number or codes.

Facilities are also preferably made available in token-app software to scan or enter codes from physical tokens; this facilitates both adding physical tokens to existing accounts known by the token app software, as well as adding new soft tokens to the token app software on account of the physical token code facilitating a user and provider matchup that the app software can use.

Distributions of tokens to users who have just passed an identity proofing process thus now provides a reliable means to bind the newly proven identity to an existing (or new) account of the user.

The use of a URL in the QR code means that if a user scans the code with a wrong software (e.g.; not the token app software) the URL they inadvertently in this situation visit, is programmed to communicate the code or serial to the token app software, possibly even installing this software for the user first too.

20. Blocking Phishing with Visually-Enforced Image Matching

Since users are given tokens by Providers, and those tokens have photos on them, we can block users from accidentally giving their login credentials to imposters, by forcing the user to verify the Provider authenticity, by making them match a photo. Only the User and Provider know the photos on the Users token, so imposters cannot trick users, since they do not know user photos.

This is accomplished when a user who has one of these tokens wants to log in—they identify (e.g. by entering a username, or by the system checking their Cookies to remember who they are) and the Provider looks up one random photo on the token of the identified user, and shows it to the User. The user then looks up the matching photo on their token, and causes the code associated with it to be sent to the Provider (e.g. by typing in the code, or by tapping on the photo in the security app software which sends the code to the Provider automatically).

Phishing attacks (e.g. when Criminals try to steal user credentials and/or one-time access codes) are thus blocked, because if there's no matching photo, the user will be unable to supply the (missing) code, and if anyone tried to supply a wrong code (or no code) the imposter operation can be thus denied because the Provider checks the incoming code from the user, with the code it knows goes with the correct photo that it issued on the token.

21. Mutual Authentication Using Images

Building a safe login (authentication) mechanism for Users, which resists phishing and imposter and numerous other attacks, is done by distributing tokens to users (as mentioned) and at the point of the login, proving the server authenticity (mutually authenticating) by showing the user a photo on their token which only a genuine Provider could know. The true mutual aspect of this method is that the user is required to use this photo to locate a one time (usually) access code and supply it to the Provider. The authentication is permitted when the supplied code is matched as genuine by the Provider; thus implementing a genuine mutual-authentication of a User (not just his device) to a Provider; the user themselves becomes part of the protocol, manually performing the mutually-associated lookup part of the process.

It can be seen that this has additional uses for anti-robot purposes; since human photo recognition is superior to robot counterparts, and robotic interference is hampered by the anti-malware aspects of present invention. (e.g. see "11. Detecting malware attacks against Apps and software agents" et seq).

22. Biometrics Key Generation

Biometrics cannot be changed once stolen, so it is critically important to prevent their theft. We do this but not storing biometrics features, but instead, by using those features to create a key. This seems impossible, since almost all subsequent reading of features will not produce identical results, so to still come up with the correct key every time, we do as follows:

To create the key, we read the users biometric features. Preferably, we do this multiple times, so we can establish the statistical distribution of each feature among the set of all readings (e.g. if one feature includes the distance between user pupils relative to the distance between pupil and eyebrows, and we make 3 different recording of this feature—those 3 are combined statistically)

We are later going to attempt to "guess" the correct key, starting out from an approximate key based on a new feature reading set; and we wish for this to succeed (in the event of a correct user) in a reasonable amount of time (just a few seconds typically), but almost never to succeed for an imposter within any reasonable time, so we first build and optimize the key "guessing" algorithm and then determine how fast it can run on a proposed end user device. Old and slow devices will this become less secure than new and fast ones, since we will use less future variation for the older than newer in our quest to reconstitute the key.

Once we know how fast the user device is, we compute how many feature variation tests are achievable in the given reasonable amount of time.

We then take into account how much each feature is likely to vary between user readings (based either on the multiple readings we just made, or, on statistics about them from a population). Armed with these numbers, we work out the scale and together with the feature readings, we construct the key by combining all this into either the key itself, or a hash thereof, or some other result based on it.

23. Decrypting Data Previously Encrypted with a Biometrically-Generated Key

The point of the key is to encrypt something with, and not to store the key anywhere (since so doing would arm attackers with feature information they could use to reconstruct working biometrics from).

To decrypt later then, the key needs reconstituting from a new feature measurement as follows:

A new key is created following the same or similar procedure as the original key generation; owing to the normal approximate nature of biometrics, this will usually not be the right key yet (although in some rare situations, it may actually be so, and it's worth considering treating such situations with caution—if too many exact matches take place, there's a good chance the biometrics hardware is broken or Criminals are working to attack it or you). You next enter a loop, where you attempt to decrypt using the key, which should usally fail the first try—whereupon you make an adjustment (e.g.: "add one" to the first feature and try again, and if that fails again, undo the adjustment and try with the second feature, and if that fails, undo it and try with the thirds, and so on for all features; if you still have no match, try a second with different adjustments (e.g.: subtract one), and if still failing, retry them all, after having "locked in" one adjustment to each feature, and if still failing, "un do" the locked in one, and try "locking in" another, and so forth. This lends itself elegantly to a recursive implementation, and while it's cumbersome to explain and read, modern computing power in a new smartphone typically includes 8 processors capable of 16 billion instructions per second, so a great many tests of possibilities is achievable.

Once found—they key is then used for decrypting.

24. Safe Biometric Keys and Rejecting Fake Biometrics

As mentioned above, keys should not be stored; it's also worth subjecting them to PBKDF or salted hash, to guard against possible known plaintext attacks (although practitioners implementing these methods will understand cryptography, and should not build data structures with this weakness in the first place). Nevertheless, another layer of defense may be is worthwhile. Should no key match be found within a reasonable amount of time, the search should be terminated, so as not to inadvertently "brute force" the key by trying to long to guess it.

25. Securing Cloud Machines against Configuration and Environmental Threats

Since "Cloud" places trust in third party operators and environments, usually many of both being unknown, it's an advantage to eradicate as much as possible of what they may have done prior to you coming along, and to protect yourself against problems that might exist or arrive in future as well (which they may not have provisioned already for you). This is done as follows:

A bootable installation disk image is prepared with headless scripting included (many distributions allow you to build this by performing a test local installation and recording the steps as you go). The scripting it inserted into the boot environment image A cloud machine is started, and a setup script loaded on. The script will cause the server to erase itself fully and build a fresh clean trusted environment to work from; it does this by copying to boot image to the cloud disk, adjusting the boot parameters to load it, then restarting.

26. Self-Deploying Secure Cloud Servers Via Swap-File Deployment Method

One easy place where the boot image can be placed, is a servers swap area, since this is usually a disk partition already, and of sufficient size, and is usually not needed on a new cloud install. First, swap is disabled (e.g. with the "swapoff" command) then the image is written to it (e.g. with the "dd if=boot.img of=/dev/sd1" command).

27. Direct Disk Writing Secure Cloud Self-Deployment Method

If no swap exists or it cannot be used, we instead locate some other unused part of the disk, adjust the partition table to use it, write the image to it, and then reboot. If no obviously unused areas exists, an easy way to find them is to create a huge file on the target disk which contains known data, then to search through the disk sectors for this known data, whereupon you can direct-write the boot image to these sectors and adjust the disk partition table to turn these sectors (being now part of the file created) into a disk partition. Note that it is a little known, but acceptable, fact for a new disk partition to point into (overlap) with an existing one.

28. Initiating your Secure Installed Using GRUB Bootloader

To actually boot your new installer, you can either make a bootable installer and adjust the partition table to boot it directly, or, use an existing boot system to load your new partition instead. GRUB is one such existing system; to boot your installer, adjust the "/etc/grub/grub.conf" file to chainload it.

29. Blocking the Effects of Malware by Using Physical Printed Tokens.

Actions that users might wish to perform (e.g. sending money to family) can be at risk of malware interference (e.g. the malware changing the recipient of the money to someone else). To prevent malware from carrying out its activities, when users involved are not using a smartphone, a Provider first distributes tokens to users.

When an action arrives from a user, the provider builds an image-based representation (e.g. "You are sending $100 to Chris", but not in text, instead, in a graphics or video format like JPEG or MP4), and combines this with a photo from the users token. Preferably, the intent of the action is conveyed in non-repeating ways (e.g.: it's placed in random places in the images) and combined with the photograph (e.g.: like watermarking, embossing, or other ways of mixing up the text and the photo) so that any malware attempting to change the intent of the message will not find it easy to do so (computer algorithms to recognize instructions mixed in with photographs and then change them being especially difficult to construct).

This combined image and action intent is presented to the user, along with instructions (preferably also combined with the image) for them to check that the action they want is shown correctly, and if so, to enter the code matching the image. Since the user must see the photo to know which code to enter, this blocks malware from hiding it from the user, and since the merging of photo and action intent substantially hampers the malware from changing it, this makes it difficult for malware to carry out surreptitious actions.

If the user provides a correct code, this lets the provider know with reasonable confidence that the user is confirming the correct intended action.

30. Strong Anti-Malware Protection for Users without Smart Devices

To further hamper malware interference, ideally when the users code is communicated to the Provider, so too is the image they received, preferably via means other than simply "sending it back", for instance, HTML canvas facilities exist to capture parts of a user's screen programmatically, and this is the ideal way to return it to the Provider, since it makes the task of surreptitious alteration by malware even harder again. In the presence of security agent in users browsers, this return can be signed and further placed out-of-reach of malware interference, especially when said agent include its own anti-malware defense, as disclosed elsewhere herein.

The provider, checks the returned data matches what was sent, or the intent of the action, and does not perform the action if it's wrong.

31. Digitally Signed, Non-Repudiable, Out-of-Band Action Confirmations

Soft tokens allow for digital signatures to better protect both Users and Providers against both malware (and other attacks) and possible "dishonesty" of either party that may later dispute the confirmation. This is done by using token-app software with keypairs provisioned between token and provider.

PUSH is used to send the intended action to the user (or an instruction to tell app how to get the intended action), and their device to display the action and means to confirm it (e.g. refer FIG. 13).

The users response, and preferably the action they're responding too as well, is digitally signed and the signature communicated to the Provider. The provider checks for signature validity, and if valid, uses the Users response on the action (e.g. processes the action if they approve it, or perhaps processes only part of some action if user approves only part; the rich nature of this second factor allowing arbitrary actions and responses to be built and used)

32. Rejecting Malicious Alterations to User Confirmation Responses.

If a signature is invalid, the provider should reject whatever action might be found within the response, since it may have been interfered with maliciously.

33. Rejecting Malicious Alterations to Intended Transactions.

Similarly, the Provider should check that what the user confirmed, is for an action that was expected, since it's no use a Provider carrying out some action in response to a "Yes" from a User, when the integrity of the question the User answered "Yes" to is unknown.

34. Rejecting Mismatched Signatures

The provider should always check both the integrity of the question/answer as well as the validity of the signature too.

35. Improving Non-Repudiation Strength by Generating Keys Out-of-Reach of Provider In operations involving public and private keypairs, it is best if the private keys are generated by User computing devices, and not by Providers, since this eliminates the chance of rogue Providers or security problems at providers from have any opportunity to forge User signatures.

36. Better Keys, Regardless of Use

Even if non-repudiation is not a goal, it is still preferred for User private keys to be generated by User devices.

37. Multiple Channel Transport for Improved Action Signing

When seeking user confirmation on actions, the best mode is for the Provider to communicate the action (or how to retrieve it) to the token app software (e.g. via PUSH) in the users mobile device, since this may literally be a different channel (e.g.: a 3G cell network, when the operation was requested over a DSL connection), or it can be a virtually-enforced second channel by virtue of the token app software establishing its own connection with a security appliance using means that prevent attacks on the channel from subverting this connection (e.g. connecting only when the appliance presents a valid SSL certificate programmed into the token app software or token itself), this puts the message out-of-reach of potential in-the-middle attacker interference.

38. Multiparty Out-of-Band Digital Signatories

Some actions need approval from more than one person, like moving money on shared-bank-accounts, or varying scheduled activities of children in custody arrangements etc. Authorized parties may, or may not, always be present. Approving actions by two or more parties is done by deciding how many parties are needed to approve, provisioning each with the signature mechanisms described earlier, and getting each (or at least enough) of them the details of the action they're required to approve (e.g. via PUSH to their token-app software). Responses and signatures are collected and checked by the Provider (for each signatory, as also described earlier), and the action performed upon receipt of a sufficient number approvals.

39. Multiparty Out-of-Band Permission Denial Method

For some actions, more than just "Approval" might be useful, like for example "Denial". To cater for a wide range of possibilities, groups of authorized approvers and deniers (not necessarily the same) and number of each (again, not necessarily the same) are established, and appropriate messages delivered. So long as sufficient "deniers" disallow an action (or whatever other response makes sense for an arbitrary situation), it can be prevented (or whatever else makes sense). E.g. consider a bank requirement that all internal transfers exceeding $80M in aggregate be approve by at least 3 independent persons, from a pool of 5, with an additional requirement that a pool of 3 people (one of who has no permission to approve at all) each have permission to deny, with at least 2 of their denials being needed to prevent the action. This allows for protection against rogue staff as well as Criminals, against actions that may contravene policies, and other advantages, while additionally serving as a deterrent to rouge staff, since their approval is non-repudiable as well. For situations where no denial is needed, the same algorithm is usable by simple designing a group of "zero deniers".

40. Introducing Strong Privacy to Multifactor Authentication

This invention provides for the benefits of multifactor authentication, improved with mutual authentication as well, in a way that also protects user privacy. For example, 2FA based on SMS violates privacy, because typically the SMS phone number leaks a range information about the user, and to a wide number of different providers, and can be misused for user and personal linking and discovery.

Privacy is enforced by the Provider not sharing "plaintext" user information with the authentication subsystem (appliance and/or vendor thereof etc.), and the subsystem not using static identifiers on user or their devices. Instead—providers use a one-way-hash (preferably salted) on any ID or database key or other user identifier and the resulting digest is the means by which the Provider communicated authentication requirements to the Appliance. Since different Providers use different salts, and probably too different IDs, and since the same user with different IDs with one provider also has IDs that are different, strong privacy is thus supported.

41. Fast and Easy Security-App Provision

It can be important that onboarding users is fast and easy; if they can't "get started", they can't use it, and any system wishing to cater for a broad audience needs to make things as easy as possible, so the best number of users can succeed!

Because users can join from a variety of different devices, and because those devices can have a variety of different capabilities, the preferred embodiment of this invention is to present users with a comprehensive choice of enrollment options, each one being made as simple as possible, and being as automatic as possible where appropriate. This includes SMS text message, QR codes, typeable web URL displays, audiosonic transfers, deep links, customer URIs or handlers, emails and social message reception, clickable URLs, app-store downloads, or in general, anything that helps a user get their device to a web page for a Provider.

Whatever method gets used, identifying the user or establishing a means to re-identify this visitor again shortly in future is usually needed, like associating Cookies or app referrer IDs to the User. The app software is then installed, and upon first use, it is able to work (from the association) out which User/visitor installed it, and for what provider, by using established means, which allows it to automate most or all of the token provision or other preparatory processing needed to make this work for the user as soon and fast and easy as possible.

42. Reliably Retrieving Cookies via Apps

Association of users for later use by an App is a non-trivial problem. This invention solves it by using means (such as mentioned in app-provision) to direct a user to an enrollment URL, and this URL having the Cookie associated with it. Apps typically can't read web cookies, however, web browser can read web cookies, and apps can open web browsers, and web browser can talk to apps, so we program our app to open a browser to the enrollment URL, and the site at that URL to then communicate the Cookie (or essence thereof) to the app, which then allows the app to recover the User/Provider association for fast and easy enrollment to work. Since apps may not know which provider they just got installed to, one solution is to operate an enrollment association service for all providers, which the app uses to determine both which user, and what provider, it's been installed for.

43. Preventing Unauthorized Cash Withdrawals from ATM Skimming Victims

When provisioned token users perform ATM transactions, the processing network is adjusted to identify the user and trigger an out-of-band action request to confirm their intent to transact. Unless they approve, the money will not issue, thus preventing illegitimate use of the account because the user does not approve transactions they do not desire. This invention offers additional security, by offering potential users the additional option to report unexpected withdrawal requests the moment they occur, which provides the bank or card network with a real-time notification that illegal activity is underway (they can then, if they are fast enough, arrest or chase the Criminal too). To help reduce false-positives, Users are given multiple options when they elect not to continue with cash withdrawals—these could be anything, but this preferred invention uses "I changed my mind", "I made a mistake" and optionally other decoy questions, along with the main question: "I did not request this action"—this latter being the trigger for catching fraud while preventing an NOC from wasting investigative time on unimportant user actions.

44. Adding Convenience to other Skimming, ATM, and Transaction Fraud Prevention

When out-of-band requests makes use of apps in Users mobile phones (as opposed to other solutions they may be less likely to carry with them) they become more useful through this convenience.

45. App Updates.

Maintaining and enhancing a deployed application used across a variety of devices and operating systems by large numbers of users would be a big task, and doing so with a security application may make some updates especially important for users to adopt at earliest convenience. Also, the timing and choice of updating by users of apps is unpredictable and unreliable, as is the environment they may use to update through (e.g. some updates ordinarily do not proceed over cellular data connections).

To improve app and update security and consumption, reduce overall complexity of an app system deployed across multiple environment, and other benefits, an app constructed according to this invention is best built as follows:

For each app operating system requiring support, an outer native containing application is written. The main logic and user interface components are written in an inner general application, preferably using HTML and/or Javascript, on account of these being supported easily on most mobile platforms. Features that the resulting complete app and/or system require that would otherwise be unavailable to HTML or Javascript are written into the outer container, and preferably abstracted to appear as available common functions that the HTML or Javascript components can utilize, for example, PUSH handling, sensor operations, URI, deep linking, store, billing, and fast cryptography and biometrics.

The resulting complete app across multiple platforms thus comprises a different outer container on each, but substantially the same inner one across all. The inner components are managed by the outer ones, and the app can poll for updates each time it is used, or listen for PUSH updates at any time, and when such updates are available, new inner components can be downloaded to replace or augment the inner parts that require update. To ensure the update system is not abused, updates downloaded are integrity checked, such as by checking that have been signed by an approved key, before or during installation, to prevent inappropriate ones from being used.

One easy way to code this is to store the inner components within a signed ZIP file, and only to accept updates with a verified signature of the correct author (their public key being included or know to the running app). Other methods are possible, and it's possible for either the inner or outer containers to perform the updates.

One advantage of this mechanism, is that should a security flaw be discovered, the update system can ensure that as soon as an update is published, almost all users can be automatically updated via PUSH and remaining ones can be updated the next time they use the app, before opportunity for the flaw to be exploited on anyone.

46. Two Man Rule for Server Administration.

In situations where more than just trusting a single operator is needed, such as for example maintaining a security or authentication server, it is advantageous to require two or more operators to "concur" or collaborate before changes can be applied.

This is implemented by assigning one operator the right to make changes, but not permitting them to exercise those rights, and assigning a second operator who has no right to make changes, the facility to grant permission to the other operator to use operator rights.

47. Two Man Administrations of Linux Servers

On linux machines making one user "root" and the other "non root" serves to facilitate the operator rights distinction 48. Implementing Two-Man-Rule Protection on SELINUX On SELINUX equipped machines, activating "enforcing more" and establishing polices for the granting of rights serves to facilitate the permissioning. Paragraph
    et seq shows how.

49. Improving Trust in, and Quality of, Cryptographic Random Numbers

"Poor random" has unraveled many security systems, and deliberate subversion of "random" is an infamous yet efficient way to "backdoor" systems. We deliberately "damage" any existing backdoors of this nature in existing software products, without introducing more or different weaknesses, by employing another (one or more) independent stream(s) of random entropy, and XOR'ing it with the original. Note that XOR or equivalent is important; any existing stream, whether backdoored or not, should still contribute to the resulting random; infamous backdoors have been discovered purporting to "strengthen random" when in fact they did literally the opposite, by discarding (not using XOR) the existent, and replacing it with predictable entropy. So long as at least one new stream has good random, or so long as any "backdoored" streams can no longer function when XOR'd with others, we arrive at a new reliable and trustworthy random source.

50. Disabling Crypto Backdoors by Turning Off Random Seed Facilities

Disabling "true random" by seeding it with known or low-entropy seeds is another infamous way to backdoor systems. We remove seed functionality from existing programs to better secure them; there is no legitimate use for seeded entropy in secure systems. This is accomplished by changing the seed routines to simply ignore the request.

51. Reverse-Proxy Deployment for Rapidly/Easily Securing Legacy Servers

There are a staggering range of attacks that can be waged against systems, with new ones coming out regularly. Not all systems can easily be timely fixed. For example, you would think that banks are most in need of strong security, yet despite phishing ranking number-1 in the attacker arsenal for many years now, even today, more than two-thirds of all banks have no SSL security whatsoever on their web site home pages. Helping them protect our money would be a worthwhile thing to do!

We accomplish this as follows: we build a "reverse proxy", which is a secure server with mechanism inbuilt to detect and prevent a wide range of attacks, and with strong working SSL/TLS with secure ciphers and robust keys, and best-practice enhancements for ensuring security and privacy of connections. It is programmed to sit in-between the protected service, and the users. It accepts incoming connections on behalf of the service, and make outgoing connections to it (e.g. "proxies" them), but it's not a plain proxy. It can additionally detect unwanted incoming traffic, like SQL-injection attack data, and detect inappropriate outgoing traffic, like plaintext passwords, database files or large dumps of data.

We use as many as possible, no fewer than 4, of the following protections: Strong TLS or equivalent encryption, HSTS, HPKP, perfect forward secrecy (PFS), incoming content scanning and blocking, outgoing content scanning and blocking, and the use of security tokens for authentication and/or signing (note that the authentication and signing can be enforced entirely by the proxy, the underlying service need not necessarily already support such a feature).

When security-token protection is added at the proxy stage only, the proxy is built to recognize underlying server operations that require protection, like logins and transactions, and to make use of the token-based security systems disclosed herein to add protection to users. The proxy can detect missing security codes or broken signatures, and enhance the underlying server security by not-proxying traffic to it in these failed situations.

52. Strengthening Reverse-Proxy Protection.

Security works best when it's more utilized so in preference to four, at least six security-improving techniques are used.

53. Enforcing the Use of Security Tokens for Authentication and/or Signing Via Proxy.

When all techniques are used, this ensures fewest gaps in the coverage a proxy can give to its protected service.

54. Modern API Provision through Proxies to Enhance and Secure Legacy Systems.

Protected systems may have components difficult to secure or enhance, especially legacy ones which may be subject code-change moratoriums for stability or security or trust or other reasons.

The proxy is ideally suited to translate incoming request for formerly non-existent features or services, and to make use of the protected server (e.g. legacy) facilities to retrieve data to support those requests, then to format it and return it in new ways. For example; a bank with no web banking app, could deploy one by having a proxy translate account operations from existing HTML ones, to a JSON format understood by an off the shelf bank app.

55. Simplifying the Addition of Security into Existing Systems; Signing and Verification On most existing system not built with facilities to verify or sign actions, adding these facilities is quite hard. It requires substantial alteration to existing operating procedures, which can be time consuming and dangerous to implement. This invention overcomes this problem as follows:

The action to be protected is identified (e.g. a financial money-transfer action of a bank, or the instruction to erase a virtual machine instance at a cloud host, or the transfer of a domain name to a new owner, etc.). The place where this action is submitted [not processed; submitted] (e.g.: the transfer or erasure web pages) is located and modified by including in it some instructions to sign the request (or better—a small general-purpose script (e.g. javascript) capable of working out those instructions itself (e.g. by parsing the HTML form it finds itself running with); this script method facilitates adding protecting to existing actions with just one line—the script inclusion one).

The modification intercepts the submission for processing of the action request, and relays it (e.g.; to the users token-app software in their phone); and it awaits a signal that the action is approved before actually submitting the action to the original processing endpoint. The relayed transaction is formatted and display to the User for their approval, the user being generally given easy means to do this (e.g. a big green "Approve" button below the display of the action they're about to approve). Hitting "Approve" digitally signs the action by the user, and causes it to be relayed back to the web page awaiting, where it becomes the processing signal it was wainting for.

This signature is then combined with the awaiting form data, and finally submitted for processing. The processing system is modified to check that the signature on incoming data exists, is valid, and matches the data for the request, and not to process the action in not. Note that this will be a minor adjustment to the processing, since only one step is needed: the signature-checking. If some other means beside this were used, the modification would require complicated store-and-forward and later time-based checking and retrieval before actioning, which are the dramatic, potentially dangerous, changes this method allows us to avoid.

56. Enhancing Existing Actions with New Signed Features

Besides "Approve", other User indications are possible, for example, a "Deny" button, which allows users to explicitly block transactions—which can be important if the transaction is wrong, unexpected, altered, malicious, or the like. When users do "Deny" or equivalent in these situations, we can additionally enquire from the user the reason (it is especially handy to use the token-app software for this, since malware may be controlling their normal session and block such inquisition). If users indicate, in response to this inquiry, a situation that a Provider may wish to investigate, additional actions can be taken (such as, for example, to warn users that they are infected with malware, or to "take down" imposter or phishing web sites, etc.)

57. Easy Configuration of New Signing Features

Raw input form data will usually need formatting for display to users, and the addition of supported actions for them (e.g.: "Approve" and "Deny" etc.). Since most action pages are from their own base URL (or otherwise detectable), our script-based modification (or other) is capable (in conjunction with a server) of detecting that no formatting instructions have yet been provided for the action. For example; it might query a database with the URL as the key, to load formatting instructions, but find none).

The system at this point is programmed to use itself to help an operator define this formatting. Specifically, we send an authorization request to a predefined system operator, and when they approve, the modified page activates a configuration wizard, allowing them to arrange the layout and formatting etc. of the data for display to users, and save this in the database.

Thus an example completed security-addition would go like this: the operator adds a line including a script into the acquisition page, and a line of signature-checking into the processing code for the action. They then themselves load (or better; submit) the action page, which causes (after they authorize) an on-screen wizard to popup, whereupon they arrange the data available and save their arrangement.

Subsequent loads/submission of this action page will not re-invoke the wizard now, since the formatting exists in the database, instead, submissions will make use of the formatting to acquire from the User their signed permission/approval for the action.

58. Rapid Addition of Security Tokens to Existing User Accounts.

We program our token app software to scan codes. When it detects a new token has been scanned, it adds it to the users account; it knows how to do this on account of already having a token for a user of the Provider present in the app. If needed, users can also be required to confirm token-add intent through existing features of the app or Provider site or software. Usually a lookup service or other mechanism is made available to the app, so it can know of find out which provider is associated with the code it scanned.

59. Manual Addition of New Security Tokens to Existing User Accounts.

If users type in the token serial number, either to an app or the provider web site, it can similarly add this to their account at that time.

60. Preventing Malicious Addition of Unauthorized Security Tokens to User Accounts.

Preferably, when new tokens are added, the user is required to securely authorize this action, such as by having the user enter a code associated with a random photo upon it (thus preventing the secret addition of a token that is unknown to the user), or other approval means.

61. Digital Signature Means to Approve Addition of New Tokens to User Accounts.

By using existing token-app software to approve addition of new tokens, a very fast, convenient, and safe means for their addition is thus provided.

62. Useable Yet Strong Cryptographic Codes

For strong entropy in codes that are convenient for users to manually enter, it is desirable to use as many different characters as possible, but to avoid the use of unambiguous ones. For example, the lowercase "L" and an uppercase "I" and the numeral "1" all appear very similar: 1Il. It can also be an advantage for users if case-sensitivity of codes is ignored; many people have trouble differentiating or typing the same letter, represented in a different case. We choose a character set for representing random codes for users to type, by including only unambiguous characters in it. For example, we permit the use of "L" by using it's uppercase version, and the use if "i" by its lowercase, which then allows the number 1 to be used unambiguously.

63. Security Token Billing

Earning revenue may be a strong consideration for deployment to some providers. We accomplish this by having security tokens that users can pay for, such as by using in-app-purchase facilities of modern online app stores.

64. Increasing Convenience for Security System Users

The preferred embodiment of this invention includes many components. Their combination makes it possible to reliably detect when a user might be about to authenticate with a provider. For example; when a security agent in a browser recognizes a URL for which the user has an associated login. It also makes it possible to reliably get a message to the user at this time, for example, via PUSH. We can thus include in our token-app software the facility to store or access user credentials, and to quickly request from users, at the exact time needed, their permission to log in, or selection of login identifier, and the two-way feature of the app and our architecture permits the secure release of these credentials to the agent, such that it can then supply same to the site.

In other words; e.g. a user with just one facebook account, can log in to facebook with just one tap, simply by visiting the web site; and tapping on their phone when prompted. When facebook additionally adopt this invention, this one tap to login can be replaced with one tap to match photos, to create a near identical, yet significantly more secure logins solution for adopting users. Or a different example, a PayPal user a home and a work account, can log in to paypal also with one tap, by visiting the site, then tapping on the work or home username according to the account they wish to log into.

65. Happy Users

It is known in the medical field that users who are trained to look for "uplifting images", and who engage repeatedly in this activity, experience sometimes remarkable improvements in their life. By using visually uplifting photos in our matching process, we can provide this benefit to users. Happy users will usually be more likely to recommend a system to others when they are happy, and the happiness improvement aspect itself may be a useful system marketing tool too.

66. Happy Photos

The user of photos that Users would consider "Happy" can be even more useful than just plain visually-uplifting ones, as can be requiring them to use more mental process to actually locate the photo which is happy.

67. Automatically-Updating Security Token Images

When used-photos from the matching process are replaced with new ones, we experience an improvement in security and system entropy.

68. Automatically-Updating Security Token Codes

It can be advantageous to prevent downgrade attacks by replacing codes that get used for authentications, with new codes, such that the re-entry of a used (and possibly compromised) code in future is less likely possible.

69. Augmented and Virtual Reality Authentication

Users of augmented reality do not typically have easily accessible cellphones, keyboard, or the like. We extend our security to these users, by provisioning the photo-display and match process into the virtual experience for them, using a point-and-select means, which practically every such system supports "out of the box".

70. Extending Mutual-Authentication Protection to Out of Band Action Signing.

When we link a cryptographic indicator that a user has successfully mutually authenticated to that event, then require this indicator later for actions a Provider needs signatures on, we can thus cryptographically extend the earlier mutual strength to the present signing act.

71. Programming Token Policy Rules

Token-app software can be programmed to enforce rules (e.g. requiring fingerprint biometric encryption on token storage). These rules can then be provided to the software for enforcement. It is convenient (although not strictly required) for the rules themselves to be delivered as part of the token they apply to.

72. Authenticating other Things, like People during Phone Calls

Normal phone calls have little or no security or protection. While out-of-band actioning can be used to authenticate use of normal phones, the token-app software itself can be programmed to manage calling directly, and thus add encryption and strong authentication to the calls themselves as well. We use the keys of the token and endpoints in it to establish protected communications (e.g.: voice, videocalls, screensharing, etc.).

73. Securing Support Operations

A security app becomes the ideal mechanism to extend protection to other things as well. Here we use device sensors together with the secure communications facilities to give everyday people a means to get extraordinary support through the use of their mobile device (e.g.: gps, file sharing, camera for showing to support staff things that may be difficult to describe by voice, etc.)

74. Overcoming Scams and Social Engineering

Besides asking users for approval of actions they request, we can also use this opportunity to detect if they might be a potential victim of a scam (e.g.: if they're about to send money to a known scam account) and warn the user before they fall victim. We do this with messages added to the out of band action requests, and possibly also actions from users to confirm their true intent.

75. Identity Attribute Release and other Actions

Sometimes a Provider (e.g.: a road authority) is called on to release or verify information for others (e.g.: someone wishing to know if the person identified by the license is old enough to consume alcohol). We do this by providing the thirst party with an API or other means to request Provider data (or operations on that data, like "is this user old enough", without revealing their birth date), and the User with means (e.g. token=app software with action singing) to approve its release.

76. Persistent Data Access Request Permission Granting

If users wish to allow a third party with continuing access to their data, we do this by issuing the third party a key which the User authorized for such use (and optionally, my later revoke too if they like). For example; A patient may wish to let their doctor perpetually access their medical records, without having to approve it every time.

77. Identity Association

Taking real-world identity verification into a digital world can be tricky. We make this safe and reliable by having a trust broker issue tokens to users, and record user attributes and verifications at that time. The attribute release and privacy protection of this invention make this solution especially attractive.

78. Mutually Authentication Identity Association

The photo matching methods of this invention allow for strong mutual protection of the User even when their subsequent use of their token might be in places of unknown security strength. Using this inventions mutual authentication protects users against mistakes and bad sites.

79. Face to Face Identity or Attribute Release

This invention explains how to exchange rich out-of-band secure messages between a User and a Provider (at least). We can introduce a second user, and then use add into our token-app software the ability to scan codes or accept PUSH or other facilities to enable face-to-face attribute queries or release (without revealing identity if required) in a safe, easy, reliable and secure way.

80. Securing Photos and Images against Theft and Misuse

It is conceivable that attackers may try to subvert the image matching security of present invention, through image theft or other means. We detect this so mitigating steps can be taken by digitally signing images and placing the signatures into their EXIF metadata areas. By placing unique web domain names and/or URLs into EXIF metadata (e.g. the copyright or schema areas), we can caused popular software which processes images to trigger a web or domain lookup, which delivers to a waiting server we provision the indication we're on the lookout for that phots are being misused.

This present invention signs, timestamps, and assigns unique IDs to photos in real-time, thus making it possible to later determine the source and the user behind the misuse.

Best Mode for Carrying Out the Invention

The best mode contemplated of carrying out this invention as it pertains to authentication is set forth below. It will be appreciated by those skilled in the art as well as others, that individual elements of this invention are suitable for uses other than authentication, and this mode and parts thereof are thus not limited to authentication alone, and it will further be appreciated that protection significantly superior to the current are is still afforded even when not all aspects of the best mode are used.

An installation system collects or creates proposed environment information from or for a Provider including public WAN and private LAN IP addresses, domain name, SSL certificate files, admin passwords, disk size, disk device name and server name and generates an Appliance setup/installation script.

A real or virtual server is provisioned with linux and the Appliance setup/installation script executed on it.

The script erases the machine it's executed on and prepares an SELinux security-hardened server on it according to the installation system output.

An administrator accesses the Appliance and creates a profile for the resource needing protection, said profile including the name of the resource, the IP address of the web or similar server providing the resource, and configures policies for the tokens which will be issued for the resource, including whether or not tokens must be password protected, or biometric-protected, and whether or not users are allowed to override protection requirements.

The keys entered into or generated by the profile are inserted into the API or SDK functionality along with the name or IP of the Appliance, and integrated into the provider resource. Provider resource login functions are extended to query the Appliance and enforce photo-matching mutual second factor authentication for users with tokens activated. Provision policies are enforced as required, such as forcing users to obtain and activate tokens upon next login, where the functions providing the provision and activations are substantially provided by and carried out by the Appliance, through the provider's web pages.

Provider resource operations requiring out of band User actions or signatures such as the digital signature to verify transactions in order to prevent malware manipulation, are identified and API or SDK code wrapped around those operations.

An option to allow users to manage their security is added to the provider menu system, said management including facilities for obtaining new tokens, removing lost or old ones, and where allowed by policy, activating or deactivating protection.

Security promotion is applied to the provider resource informing and encouraging users to adopt.

When next users log in, they are guided through the steps to activate protection, by giving them a range of choices for how to obtain the tokens and/or app software to support soft-tokens on their mobile device, said app software auto-identifying the user and provisioning tokens and binding same to User's account with a minimal number of steps for the User.

When next a user performs their log in, they will see a random photo appear on their login screen as a new login step. To complete their login, they locate the matching photo on their token, which will normally be a smartphone which automatically displays a grid of photos when needed and the user taps on the matching one to complete the login. The act of tapping the photo transmits the one time login code to the authentication Appliance, which in turn informs the provider resource, which in turn auto-completes the user's login.

When next a user performs an operation requiring an action they need to confirm, they will see a confirmation message on their mobile device, usually containing action buttons including a green "Approve" and red "Deny" button, and they will need to tap the corresponding button to authorize the action, said tap communicating a digital signature of the essence of the transaction to the authentication Appliance, which in turn provides this to the provider, which in turn checks for a correct approval digital signature in order to perform the action.

Users can manage their security on the provided management page, and administrators can monitor and manage user and system security on the Appliance management pages.

App software includes protection against malware attack and other in-device issues, including storing tokens encrypted to passwords or biometrics, using device protected storage, preventing reverse engineering.

DS-Client software prevents in-the-middle attacks, both regular and sophisticated, thwarts screen-scraping style attacks, and assists with secure setup. It uses protocol and computed secrets, keys, and identities, supports local photo selection and display for mutual-authentication security support, supports local device read and write to protect and secure enrollments. It operates correctly through DPI firewalls.

The intricate details for performing each of the aspects of the best mode for carrying out this invention are outlined earlier in the detailed description.

Modes for Carrying Out the Invention

As for the best mode, replacing creation and usage of an Appliance with usage of a cloud service operated by a third party.

While it is preferred that as many aspects as possible of this invention are offered to Users, situations nevertheless exist which can benefit from the use of just one, or a few, of the improvements disclosed herein to offer improvements to Users in, but not limited to, the areas of security, usability, ease, convenience, speed, or other advantages disclosed herein.

INDUSTRIAL APPLICABILITY

Computers are used in almost every facet of modern life, across all fields and industries. Practically every computing system makes use of authentication, and thus stands to benefit from this present invention, and also disclosed herein are numerous other improvements with applicability to computing.

The current state of computer security is atrocious. A survey last year found 60% of businesses with online presence reported hacker break-ins, and a further 60% are forecast by reputable analysts to suffer break-ins again this year. It is abundantly clear that the current art piecemeal layered approach to security is fatally flawed. Security is not something that works properly by cobbling together legacy technologies or solving individual problems, or addressing individual threats. Every part of a strong secure system has to exist and work, otherwise the bits that are missing or don't work let the entire system down. Even the surprising parts that might not initially seem "security related", like ease and speed for example, are important to the overall strength. If it's not used, it protects nobody! An invention that does not address the complete picture is not going to solve the problem. This invention comprehensively addresses modern authentication and related threats and properly solves today's security problem.

The invention claimed is:

1. A method for a Provider to securely associate a User's proven identity with an authenticator, the method comprising:
   making available, by the Provider, an identity proofing enrollment service, wherein the identity proofing enrollment service is configured with one or more identity proofing procedures;
   receiving, by the Provider, a request to satisfy the Provider of the User's true identity;
   carrying out, by the identity proofing enrollment service, at least one identity proofing procedure of the one or more identity proofing procedures to satisfy the Provider of the User's true identity;
   recording, by the Provider, attributes of the User;
   recording, by the Provider, attributes of the at least one identity proofing procedure;
   generating, by the Provider, a persona for the User;
   issuing, by the Provider, a Token to the User; and
   establishing, by the Provider, an association between (i) the Token and (ii) the recorded attributes of the User and the recorded attributes of the at least one identity proofing procedure, wherein, based on the association, the issued Token becomes the authenticator of the persona for the User.

2. The method of claim 1 wherein the Token comprises an assortment of random images selected from a large collection of many images, each image in the assortment of random images having random codes associated therewith.

3. The method of claim 2, wherein the Token is embedded on a computing device, and wherein the Provider is configured to communicate with the computing device to facilitate authentication.

4. The method of claim 3, wherein the Provider selects the assortment of random images, and wherein, upon issuing the Token, the Provider provides the User a particular image from the assortment of random images for the User to verify the Token as the authenticator, wherein verifying the Token as the authenticator comprises the User selecting a corresponding image to the particular image from the Token on the computing device.

5. The method of claim 1, wherein receiving the request to satisfy the Provider of the User's true identity comprises:
   receiving, at the Provider, an authentication request from the User,
   interrupting, by the Provider, the authentication request; and
   transmitting, from the Provider to the identity proofing enrollment service, a request to carry out the at least one identity proofing procedure.

6. The method of claim 1, wherein receiving the request to satisfy the Provider of the User's true identity comprises:
   detecting, by the Provider, that the User has yet to be issued any Token; and transmitting, from the Provider to the identity proofing enrollment service, a request to carry out the at least one identity proofing procedure.

7. The method of claim 1, wherein recording the attributes of the User comprise recording an activation option, and wherein issuing the Token comprises the Provider determining, based on the activation option, whether future authentications with the Provider will require use of the Token by the User.

8. The method of claim 1, wherein the one or more identity proofing procedures comprise a document-verification-service, and wherein carrying out the at least one identity proofing procedure comprises applying the document-verification-service on identity-document-data provided by the User.

9. The method of claim 1, further comprising:
recording, by the Provider, second attributes of the User;
recording, by the Provider, second attributes of the at least one identity proofing procedure;
generating, by the Provider, a second persona for the User;
issuing, by the Provider, a second Token to the User; and
establishing, by the Provider, a second association between (i) the second Token and (ii) the recorded second attributes of the User and the recorded second attributes of the at least one identity proofing procedure, wherein based on the second association, the issued second Token becomes an authenticator of the second persona for the User.

10. The method of claim 9, wherein persona is different from the second persona, and wherein the Token and the second Token are located on a same physical device.

11. The method of claim 1, further comprising:
making available, by a second Provider, a second identity proofing enrollment service, wherein the second identity proofing enrollment service is configured with one or more second identity proofing procedures;
receiving, by the second Provider, a request to satisfy the second Provider of the User's true identity;
carrying out, by the second identity proofing enrollment service, at least one second identity proofing procedure of the one or more second identity proofing procedures to satisfy the second Provider of the User's true identity;
recording, by the second Provider, second attributes of the User;
recording, by the second Provider, second attributes of the at least one second identity proofing procedure;
generating, by the second Provider, a second persona for the User; and
establishing, by the second Provider, a second association between (i) the second Token and (ii) the recorded second attributes of the User and the recorded second attributes of the at least one second identity proofing procedure, wherein based on the second association, the issued second Token becomes an authenticator of the second persona for the User.

12. The method of claim 11, wherein the identity proofing enrollment service is identical to the second identify proofing enrollment service, and wherein the one or more identity proofing procedures are identical to the one or more second identity proofing procedures.

13. The method of claim 11, wherein the persona is different from the second persona, wherein the Provider is different from the second Provider, and wherein the Token and the second Token are located on a same physical device.

14. The method of claim 1, wherein the attributes of the User comprise a username for the User.

15. The method of claim 1, wherein the identity proofing enrolment service is physically distinct from the Provider.

16. The method of claim 1, wherein the persona comprises an account for the User at the Provider.

* * * * *